United States Patent
Bi et al.

(10) Patent No.: US 6,952,504 B2
(45) Date of Patent: Oct. 4, 2005

(54) THREE DIMENSIONAL ENGINEERING OF PLANAR OPTICAL STRUCTURES

(75) Inventors: Xiangxin Bi, San Ramon, CA (US); Elizabeth Anne Nevis, Sunnyvale, CA (US); Ronald J. Mosso, Fremont, CA (US); Michael Edward Chapin, Sunnyvale, CA (US); Shivkumar Chiruvolu, Sunnyvale, CA (US); Sardar Hyat Khan, San Diego, CA (US); Sujeet Kumar, Newark, CA (US); Herman Adrian Lopez, Sunnyvale, CA (US); Nguyen Tran The Huy, Fremont, CA (US); Craig Richard Horne, Fremont, CA (US); Michael A. Bryan, Los Gatos, CA (US); Eric Euvrard, Mountain View, CA (US)

(73) Assignee: NeoPhotonics Corporation, San Jose, CA (US)

( * ) Notice: Subject to any disclaimer, the term of this patent is extended or adjusted under 35 U.S.C. 154(b) by 118 days.

(21) Appl. No.: 10/027,906

(22) Filed: Dec. 21, 2001

(65) Prior Publication Data

US 2003/0117691 A1 Jun. 26, 2003

(51) Int. Cl.$^7$ .............................. H01S 3/00; G02F 1/295
(52) U.S. Cl. .............................. 385/9; 385/14; 359/333; 359/245
(58) Field of Search ................................. 385/130, 132, 385/9, 14; 359/333, 245

(56) References Cited

U.S. PATENT DOCUMENTS

| | | |
|---|---|---|
| 3,806,570 A | 4/1974 | Flamenbaum et al. |
| 3,883,336 A | 5/1975 | Randall |
| 3,923,484 A | 12/1975 | Randall |
| 3,932,162 A | 1/1976 | Blankenship |

(Continued)

FOREIGN PATENT DOCUMENTS

| | | |
|---|---|---|
| WO | WO 99/23189 | 5/1999 |
| WO | WO 99/31532 | 6/1999 |
| WO | WO 99/61244 | 12/1999 |
| WO | WO 00/24093 | 4/2000 |
| WO | WO 01/07155 | 2/2001 |
| WO | WO 01/22542 | 3/2001 |
| WO | WO 01/77732 | 10/2001 |
| WO | WO 02/32588 | 4/2002 |
| WO | WO 02/44765 | 6/2002 |

OTHER PUBLICATIONS

Rabii et al., "Recent advances in the fabrication of hollow glass waveguides", SPIE vol. 3262, pp. 103–107, 1998.

Liang et al., "Laser synthesize silicon–based and ferro–based nano powders", SPIE vol. 3862, pp. 17–21, 1999.

Barbarossa et al., "Effect of temperature gradient on sintering kinetics of doped silica waveguides by flame hydrolysis deposition", SPIE vol. 1794 Integrated Optical Circuits II, pp. 191–197, 1992.

Lebedev et al., "Laser distillation–deposition synthesis of silica glasses with variable concentrations of oxygen deficient centers", SPIE vol. 2498, pp. 65–71, 1995.

(Continued)

Primary Examiner—Mark Hellner
(74) Attorney, Agent, or Firm—Patterson, Thuente, Skaar & Christensen, P.A.; Peter S. Dardi

(57) ABSTRACT

Three dimensional optical structures are described that can have various integrations between optical devices within and between layers of the optical structure. Optical turning elements can provide optical pathways between layers of optical devices. Methods are described that provide for great versatility on contouring optical materials throughout the optical structure. Various new optical devices are enabled by the improved optical processing approaches.

77 Claims, 24 Drawing Sheets

U.S. PATENT DOCUMENTS

| | | |
|---|---|---|
| 3,934,061 A | 1/1976 | Keck et al. |
| 4,038,370 A | 7/1977 | Tokimoto et al. |
| 4,113,844 A | 9/1978 | Tokimoto et al. |
| 4,619,680 A | 10/1986 | Nourshargh et al. |
| 4,735,677 A | 4/1988 | Kawachi et al. |
| 4,791,648 A | 12/1988 | Vojak et al. |
| 4,814,289 A | 3/1989 | Baeuerle |
| 4,868,005 A | 9/1989 | Ehrlich et al. |
| 4,881,791 A | 11/1989 | Mallinson et al. |
| 4,933,262 A | 6/1990 | Beguin |
| 5,060,595 A | 10/1991 | Ziv et al. |
| 5,108,952 A | 4/1992 | Matsuhashi |
| 5,119,460 A | 6/1992 | Bruce et al. |
| 5,141,549 A | 8/1992 | Tumminelli |
| 5,195,161 A | 3/1993 | Adar et al. |
| 5,200,029 A | 4/1993 | Bruce et al. |
| 5,276,012 A | 1/1994 | Ushida et al. |
| 5,296,072 A | 3/1994 | Dannoux et al. |
| 5,317,576 A | 5/1994 | Leonberger et al. |
| 5,318,614 A | 6/1994 | Beguin |
| 5,385,594 A | 1/1995 | Kanamori et al. |
| 5,396,507 A | 3/1995 | Kaminow et al. |
| 5,447,585 A | 9/1995 | Dannoux et al. |
| 5,448,586 A | 9/1995 | Shmulovich et al. |
| 5,551,966 A | 9/1996 | Hirose et al. |
| 5,556,442 A | 9/1996 | Kanamori et al. |
| 5,622,750 A | 4/1997 | Kilian et al. |
| 5,666,372 A | 9/1997 | Ball et al. |
| 5,729,642 A | 3/1998 | Thaniyavarn |
| 5,757,989 A | 5/1998 | Yoshimura et al. |
| 5,790,730 A | 8/1998 | Kravitz et al. |
| 5,863,604 A | 1/1999 | Hunt et al. |
| 5,870,417 A | 2/1999 | Verdiell et al. |
| 5,874,134 A | 2/1999 | Rao et al. |
| 5,885,904 A | 3/1999 | Mehta et al. |
| 5,930,439 A | 7/1999 | Ojha et al. |
| 5,958,348 A | 9/1999 | Bi et al. |
| 5,966,478 A | 10/1999 | Marcuse et al. |
| 5,997,956 A | 12/1999 | Hunt et al. |
| 6,011,981 A | 1/2000 | Alvarez et al. |
| 6,032,871 A | 3/2000 | Börner et al. |
| 6,074,888 A | 6/2000 | Tran et al. |
| 6,097,144 A | 8/2000 | Lehman |
| 6,137,933 A | 10/2000 | Hunter et al. |
| 6,154,479 A * | 11/2000 | Yoshikawa et al. ............ 372/96 |
| 6,160,830 A | 12/2000 | Kiely et al. |
| 6,177,290 B1 | 1/2001 | Jang et al. |
| 6,193,936 B1 | 2/2001 | Gardner et al. |
| 6,215,585 B1 * | 4/2001 | Yoshimura et al. ......... 359/344 |
| 6,227,722 B1 | 5/2001 | Kropp |
| 6,254,928 B1 | 7/2001 | Doan |
| 6,256,442 B1 | 7/2001 | Nolan et al. |
| 6,280,802 B1 | 8/2001 | Akedo et al. |
| 6,289,032 B1 | 9/2001 | Fay et al. |
| 6,293,688 B1 | 9/2001 | Deacon |
| 6,307,995 B1 | 10/2001 | Veligdan |
| 6,690,845 B1 * | 2/2004 | Yoshimura et al. ............ 385/14 |
| 6,768,856 B2 * | 7/2004 | Akwani et al. .............. 385/129 |
| 6,790,502 B1 * | 9/2004 | Yamamoto et al. ......... 428/64.1 |

OTHER PUBLICATIONS

Barbarossa et al., "High–silica cascaded three–waveguide couplers for wideband filtering by Flam Hydrolysis on Si", SPIE vol. 1583 Integrated Optical Circuits, pp. 122–128, 1991.

Barbarossa et al., "Optical damage threshold of $P_2O_5$ and $GeO_2$–$P_2O_5$–doped silica waveguides", SPIE vol. 1794 Integrated Optical Circuits II, pp. 185–190, 1992.

Barbarossa et al., "High–silica low–loss three waveguide couplers on Si by Flame Hydrolysis Deposition", SPIE vol. 1513 Glasses for Optoelectronics II, pp. 37–43, 1991.

Maxwell, "Photosensitivity & rare–earth doping in flame hydrolysis deposited planar silica waveguides", SPIE vol. 2695, pp. 16–29, 1996.

Sun et al., "Building passive components with silica waveguides", SPIE vol. 3795, pp. 313–319, 1999.

Center for Nano Particle Control, Website Mansoo CHOI, Associate Professor of Mechanized Engineering, Seoul National University, Jun. 2000.

Saini et al., "Passive Active Resonant Coupler (PARC) Platform with Tapered Passive Waveguide", Proceedings of SPIE, vol. 4087, pp. 254–255, 2000.

Teloptics Corp. Technology Overview, Website Teloptics, 3 pages, 2001.

Bryan, "Layer Materials and Planar Optical Devices", U.S. Appl. No. 09/931,977, filed Aug. 17, 2001, 62 pages.

Bryan, "Reactive Deposition for the Formation of Chip Capacitors", U.S. Appl. No. 60/312,234, filed Aug. 14, 2001, 42 pages.

Horne et al., "Doped Glass Materials", U.S. Appl. No. 60/313,588, filed Aug. 17, 2001, 35 pages.

* cited by examiner

THREE DIMENSIONAL ENGINEERING OF PLANAR OPTICAL STRUCTURES

FIELD OF THE INVENTION

The invention relates to optical materials and planar optical structures. The planar optical structures, comprising multilayered structures, can comprise planar optical devices, comprising integrated optical devices. The optical properties within the planar optical structures can vary within the plane and perpendicular to the plane to achieve desired optical properties and integration. Specific optical devices can take advantage of the three dimensional engineering of the optical structure.

BACKGROUND

Presently used optical communication light wavelengths are from 1.3 to 1.6 microns. Optical waveguides, in fiber or planar form, generally have dimensions many times the wavelength. Thus, optical structures can have dimensions from a few microns to about 100 microns depending on optical mode requirements and other factors. Optical transmission generally is based on transmission through a higher index-of-refraction material in a core that is surrounded by a lower index-of-refraction called the cladding. Light is confined within the core material in appropriate geometries by total internal reflection at the dielectric interface for light propagating through the core. Long range optical communications generally are carried on optical fibers. However, manipulation of the optical signals involves optical devices that connect with the optical fibers. Planar structures can present optical devices in a more compact format.

An explosion of communication and information technologies comprising Internet based systems has motivated a worldwide effort to implement optical communication networks to take advantage of a large bandwidth available with optical communication. The capacity of optical fiber technology can be expanded further with implementation of Wavelength Division Multiplexing technology. With increasing demands, more channels are needed to fulfill the system functions.

Basic characteristics of optical materials comprise surface quality, uniformity and optical quality. Optical quality refers to small enough absorption and scattering loss to achieve desired levels of transmission. Optical quality also comprises the uniformity of optical properties, such as index-of-refraction, and bi-refringence properties. In addition, optical quality is affected by interface quality, such as the interface between the core layers and cladding layers. For silica ($SiO_2$) and several other materials, preferred forms for optical transmission are a glass, while for some other materials single crystal or polycrystalline forms may have the highest quality optical transmission.

Several approaches have been used and/or suggested for the deposition of the optical materials. These approaches comprise, for example, flame hydrolysis deposition, chemical vapor deposition, physical vapor deposition, sol-gel chemical deposition and ion implantation. Flame hydrolysis deposition involves the use of a hydrogen-oxygen flame to react gaseous precursors to form particles of the optical material as a coating on the surface of the substrate. Subsequent heat treatment of the coating can result in the formation of a uniform optical material, which generally is a glass material. Flame hydrolysis and forms of chemical vapor deposition have been successful in the production of glass for use as fiber optic elements and planar waveguides.

The introduction of different elements, either dopants or stoichiometric components, into desired compositions can be difficult. In particular, blending elements to form complex compositions for optical materials can be challenging. Further challenges can result if particular complex compositions are to be located at particular locations within a structure. In particular, coating approaches generally cover the entire layer with a specific composition.

Approaches have been developed for the production of highly uniform submicron and nanoscale particles by laser pyrolysis. Highly uniform particles are desirable for the fabrication of a variety of devices comprising, for example, batteries, polishing compositions, catalysts, and phosphors for optical displays. Laser pyrolysis involves an intense light beam that drives the chemical reaction of a reactant stream to form highly uniform particles following the rapid quench of the stream after leaving the laser beam. Laser pyrolysis has the advantage that a variety of different elements can be incorporated into the particle compositions.

SUMMARY OF THE INVENTION

In a first aspect, the invention pertains to an optical structure comprising a plurality of layers. At least two layers have composition variation within each layer and comprise a first layer and a second layer. The plurality of layers comprises a first turning element that is at least partially located within the first layer and the second layer. The first turning element reflects light between a confined optical pathway within the plane of the first layer and a confined optical pathway within the plane of the second layer.

In another aspect, the invention pertains to an optical structure comprising a plurality of layers. At least two layers have composition variation within each layer and comprise a first layer and a second layer. The plurality of layers comprises a turning element being at least partially located within the first layer. The turning element comprises an optical taper forming an optical pathway of a higher index-of-refraction materials surrounded by a cladding material with a lower index-of-refraction. The optical pathway involves a gradual turn from the first layer out of the plane of the first layer.

In a further aspect, the invention pertains to a method for forming a patterned coating on a surface. The method comprises reacting a reactant flow to form product particles in a product stream and directing the product particle stream through a first discrete mask at a surface to form the patterned coating on the surface. The first discrete mask is not bonded to the surface.

In an additional aspect, the invention pertains to a method for forming coating(s) comprising a first coating on a surface with varying composition at different locations along the surface. The method comprises reacting a reactant flow to form a product particle stream and directing the product particle stream at a surface to form each of the coating(s). The first coating is formed over at least about 5 square centimeters. The first coating forms a pattern of different compositions at different locations, and is formed in less than about 5 minutes.

In addition, the invention pertains to a method for forming at least one coating on a surface with composition areas at different locations along the surface. The method comprising reacting a reactant flow to form a product particle stream and directing the product particle stream at a surface. The product particle stream sequentially coats portions of the surface, and the product particle stream is altered during the coating process to deposit different product particle compositions at different locations along the surface.

Furthermore, the invention pertains to an optical material comprising an optical transition material having a thickness no more than about 300 microns. The optical transition material comprises a gradual composition transition from a first composition and a second composition.

Also, the invention pertains to an optical waveguide comprising a first cladding layer of optical material, a second cladding layer of optical material and a core of optical material. The core is adjacent to the first cladding layer and the second cladding layer and has a higher index-of-refraction than each of the cladding layers. At least one of the cladding layers has a lower index-of-refraction region adjacent the core layer. The lower index-of-refraction layer has an average index-of-refraction lower than the average index-of-refraction of the at least one of the cladding layers.

In other aspects, the invention pertains to a method of forming an optical structure with an optical transition material comprising a gradual composition transition at a location on a substrate from a first composition and a second composition. The method comprises reacting a reactant flow to form a product particle stream, and directing the product particle stream at a surface. The product particle stream is altered during the coating process to form a material with the gradual composition transition.

In further aspects, the invention pertains to a coating apparatus comprising a plurality of elongated reactant inlets, optical elements and a substrate. The plurality of reactant inlets defines a plurality of reactant stream paths. The optical elements form one or more light paths intersecting the reactant stream paths at a plurality of reaction zones with a product stream path continuing from the reaction zones. The substrate intersects the product stream paths with each product stream paths directed to separate locations on the substrate.

Moreover, the invention pertains to a method for coating the surface of a substrate. The method comprises reacting a plurality of reactant flows to form a plurality of product particle streams, with at least two of the plurality of product particle streams having different particle compositions from each other and simultaneously depositing the at least two of the plurality of product particle streams on a surface. The product particle streams are directed to different locations on the substrate surface.

Additionally, the invention pertains to a coating apparatus comprising a reactant inlet defining a reactant stream path, optical elements, a substrate and a shutter. The optical elements forms a light path intersecting the reactant stream paths at a reaction zone with a product stream path continuing from the reaction zone. The substrate intersects the product stream path directed to a substrate. The shutter can be selectively close to block the product stream path from reaching the substrate.

In addition, the invention pertains to a method for coating the surface of a substrate. The method comprises reacting a reactant flow to form a product particle stream directed toward a substrate surface, blocking the product particle stream with a shutter to prevent coating of the substrate surface, and opening the shutter a first period of time to deposit the product particle stream on a surface of the substrate.

Also, the invention pertains to an optical device comprising a first cladding layer of optical material, a second cladding layer of optical material and a core of optical material. The core is adjacent to the first cladding layer and the second cladding layer and has a higher index-of-refraction than the cladding layers. One of the cladding layers has a localized band of tap material having an index-of-refraction intermediate between the core layer and the average index-of-refraction of the cladding layer with the localized band intersecting the core material. The tap material provides for the leakage of some light intensity into the tap material when light is transmitted through the core.

Moreover, the invention pertains to an integrated optical circuit comprising a vertical cavity surface emitting laser, a planar waveguide and a turning element optically connecting the planar waveguide and the vertical cavity surface emitting laser. Emissions are directed approximately perpendicular to the plane of the waveguide.

In other embodiments, the invention pertains to a planar optical amplifier comprising an under-cladding layer, a mid-cladding layer and over-cladding layer, a signal core between the under-cladding layer and the mid-cladding layer and pump-guide core between the mid-cladding layer and the over cladding layer. The signal core has a higher average index-of-refraction than the under-cladding layer and the mid-cladding layer and comprising a gain region with a composition that absorbs light in a selected region of the electromagnetic spectrum. The pump-guide core has a higher average index-of-refraction than the mid-cladding layer and the over-cladding layer, and the mid-cladding layer has a transmission region overlapping the gain region along a direction perpendicular to a plane orienting the amplifier. The transmission region has an index-of-refraction higher than the average index-of-refraction of the mid-cladding layer.

In further embodiments, the invention pertains to a continuously variable optical attenuator comprising a first cladding layer, a second cladding layer that is thermally conductive, a third cladding layer, a pump-core between the second cladding layer and the third cladding layer having an index-of-refraction higher than the second cladding layer and the third cladding layer, and an active-core adjacent to the first cladding layer and the second cladding layer. The pump-core comprises an absorption region that absorbs a selected region of the electromagnetic spectrum. The active core comprises a thermally sensitive region adjacent at least a portion of the absorption region. The thermally sensitive region comprises a material having an index-of-refraction that varies with temperature. The optical attenuator can be used to form a continuously variable optical switch.

Also, the invention pertains to a monolithic planar optical circuit comprising a first planar optical waveguide, a second optical waveguide and a mirror optically connecting the first planar waveguide and the second planar waveguide. The mirror comprises an elemental metal forming a mirror surface positioned to reflect light between the first planar waveguide and the second planar waveguide.

In other embodiments, the invention pertains to a planar optical circuit comprising a monolithic optical structure having a first optical device and a second optical device. The first optical device and second optical device are optically connected by a free space optical element embedded within the monolithic optical structure.

In another aspect, the invention pertains to a method for forming a coated substrate with the coating comprising a doped material. The method comprises forming a powder coating within a reaction chamber and heat treating the powder coating. The powder is deposited from a stream of product particles formed within the reactor. The heat treatment is performed by flowing a fuel and oxygen source within the reactor such that the reactant stream does not produce particles.

Moreover, the invention pertains to a coated substrate comprising a powder coating on the substrate. The powder has a larger average particle size along a cross section a first distance from the substrate relative to the average particle size along a cross section a second distance from the substrate. The second distance is larger than the first distance.

DETAILED DESCRIPTION OF THE INVENTION

Figure 1:
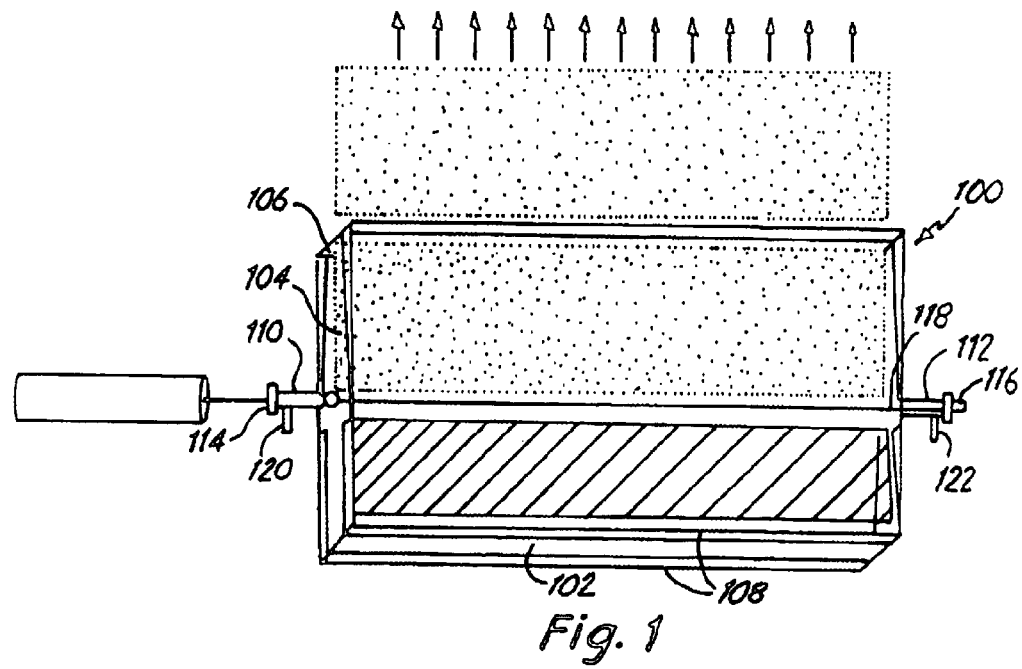
FIG. 1 is a side perspective view of a reaction chamber for performing laser pyrolysis synthesis of powders at high production rates.

Complex optical structures incorporate controlled variation in composition and/or other physical properties affecting optical properties across the three dimensions of the structure. Generally, the optical structure has a planar extent orienting the structure and layers within the structure. The variation in optical properties can be along planes oriented along the planar extent of the structure and/or in direction(s) perpendicular to the plane(s). Thus, three dimensional variations in the optical properties can be achieved to create optical properties at selected locations to achieve desired optical responses. In particular, planar optical devices can be formed that are integrated in one, two or all three dimensions such that more complex integrated optical structures are possible. Also, composition gradients can be formed to provide transitions in the optical and/or the mechanical properties of the material.

In some embodiments, improved control over the placement of optical materials is achieved by depositing particles onto a substrate from a flow in which the particles are formed in the flow through a chemical reaction. The reactant flow can involve a radiation beam to drive the reaction and to provide more precise control over the reaction. The deposited particles can be heated to densify the particles into an optical material. By adapting the particle deposition for high production rates, multiple coatings can be applied rapidly. Furthermore, through more precise control of the deposition, more complex optical structures can be formed, in particular planar optical devices that are integrated between layers as well as within layers. Improved optical devices are described that incorporate composition variations in the three dimensions of the optical structure.

Fiber optic communication networks provide broadband communication channels. However, manipulation of the optical signals requires the interface of the fiber optical pathways with appropriate optical devices and electro-optical devices. The formation of planar optical devices on a substrate surface has been used to decrease the size of the optical devices. The formation of planar optical devices involves the manipulation of optical materials to form structures with dimension on the order of a micron to tens or hundreds of microns in layers. Improved processes for the deposition of optical materials and/or the manipulation of optical materials in the formation of optical devices introduces the capability of producing more complex optical devices and integrated structures in more compact configurations.

Central to the formation of optical devices is the variation of the optical properties at different physical locations. For example, variation in index-of-refraction generally is used to confine light along a particular path or waveguide. Optical properties can be varied by changes in chemical composition and/or by changes in physical properties, such as density. As described herein, complex optical structures are described that involve composition variations in three dimensions organized within a plurality of layers. By stacking many layers with a plurality of layers having composition variation within appropriate plane(s), optical structures can be formed with a plurality of planes comprising integrated optical devices and/or with integration between different layers of the stack structure. Thus, a monolithic optical structure can be formed with full integration within one or more layers and between layers to form a highly compact optical structure with the capability of complex functionality.

Optical integration involves a plurality of planar optical devices within a monolithic optical structure in which the optical devices are optically connected. Thus, a single light path leads through a plurality of isolated regions with varying optical properties. Planar optical structures involve layers with a spatial extent that is much larger than the thickness of the layer. Thus, a sequence of parallel planes through the structure generally orients the structure in space and provides a reference frame for evaluating positions within the structure. The formation of planar optical devices requires a plurality of layers with varying optical properties. Beam splitters, dividers and the like can be used to form complex networks of integrated optical features within a monolithic optical structure with planar devices.

In general, integrated planar optical devices within a layer involve the patterning of optical material within a layer. Generally, the patterning involves varying the composition within the layer. However, optical properties can also be varied by changing the physical properties. For example, the optical properties of some material can be varied by irradiating the material with ultraviolet light. The patterned optical material generally forms one or more light pathways through the layer. The light can be confined within the pathway by having a higher index-of-refraction within the pathway compared with the index-of-refraction of the surrounding material. Similarly, to confine the light within the pathway, the material above and below the pathway generally has a lower index-of-refraction. Thus, an under-cladding layer of optical material with appropriate index-of-refraction can be placed below the patterned layer. Similarly, an over-cladding layer with an appropriate index-of-refraction can be placed above the patterned layer.

To form certain optical devices, the cladding layers can be patterned also to form a connection to the optical device layer. For example, optical amplifiers can comprise waveguides and/or gratings within the cladding layers that are oriented to transmit or otherwise manipulate light perpendicular to the plane of the integrated planar devices. Thus, pumping light for amplification can be introduced to the active plane from outside of the plane. However, only limited types of out-of-plane functionalities have been coupled into the integrated planar optical devices. In contrast, as described herein, a wider range of out-of-plane devices can be coupled into the integrated planar optical devices, and planar optical devices within different layers can be integrated together.

A new process has been developed, reactive deposition driven by a radiation beam (e.g., a light beam), to form coatings with optical characteristics that are tightly controlled and corresponding devices from the coatings. In one embodiment, reactive deposition driven by a radiation beam (e.g., a light beam) involves a reactor with a flowing reactant stream that intersects a radiation beam proximate a reaction zone to form a product stream configured for the deposition of product particles onto a surface following formation of the particles in the flow. Radiation-based reactive deposition incorporates features of a radiation-based process for driving the reaction of a flowing reactant stream to form submicron powders into a direct coating process. When it incorporates an intense light beam as the radiation source, the radiation-based process for the production of submicron powders in a flow is known as laser pyrolysis. In particular, a wide range of reaction precursors can be used to generate a reactant stream with compositions in gas, vapor and/or aerosol form, and a wide range of highly uniform product particles can be efficiently produced. Reactant delivery approaches developed for laser pyrolysis can be adapted for radiation-based reactive deposition. For convenience, this application refers to radiation-based pyrolysis and laser pyrolysis interchangeably and to radiation-based reactive deposition and light reactive deposition interchangeably.

In laser pyrolysis, the reactant stream is reacted by an intense light beam, such as a laser beam, which heats the reactants at a very rapid rate. While a laser beam is a convenient energy source, other intense radiation (e.g., light) sources can be used in laser pyrolysis. Laser pyrolysis provides for formation of phases of materials that are difficult to form under thermodynamic equilibrium conditions. As the reactant stream leaves the light beam, the product particles are rapidly quenched. The reaction takes place in a confined reaction zone at the intersection of the light beam and the reactant stream. For the production of doped materials and other complex optical materials, the present approaches have the advantage that the composition of the materials can be adjusted over desirable ranges.

Submicron inorganic particles with various stoichiometries, non-stoichiometric compositions and crystal structures, comprising amorphous structures, have been produced by laser pyrolysis, alone or with additional processing. Specifically, amorphous and crystalline submicron and nanoscale particles can be produced with complex compositions using laser pyrolysis. Similarly, using light driven reaction approaches a variety of new materials can be produced. Light reactive deposition can be used to form highly uniform coatings of glasses, i.e., amorphous materials, and crystalline materials (either single crystalline or polycrystalline), optionally with dopants comprising, for example, complex blends of stoichiometric and/or dopant components. Suitable optical materials comprise, for example, silicon oxide, aluminum oxide, titanium oxide, telluride glasses, phosphate ($P_2O_5$) glass, InP, lithium niobate, combinations thereof and doped compositions thereof.

A basic feature of successful application of laser pyrolysis/light reactive deposition for the production of particles and corresponding coatings with desired compositions is generation of a reactant stream containing an appropriate precursor composition. In particular, for the formation of doped materials by light reactive deposition, the reactant stream can comprise host glass or crystal precursors and, optionally, dopant precursors. The composition of the product optical materials can be adjusted to the desired stoichiometries and dopant compositions by varying the composition of the reactant stream. Similarly, unless the precursors are an appropriate radiation absorber, an additional radiation absorber is added to the reactant stream to absorb radiation/light energy for transfer to other compounds in the reactant stream. Other additional reactants can be used to adjust the oxidizing/reducing environment in the reactant stream.

Common commercial approaches for the introduction of dopants, especially rare earth dopants, into glass materials involve initial formation of the glass and subsequent introduction of the dopants into the glass from a vapor or liquid state. The glass can be made porous to facilitate the introduction of dopants into the glass. These approaches generally require multiple steps to produce the porous glass. In addition, it may be difficult to obtain desired dopant concentrations and uniform distribution of the dopants. In contrast, the flowing reaction approaches described herein directly incorporate the dopants directly into the glass materials. Thus, there is no need to make glass porous, and the number of steps can be reduced with generally no additional steps needed to alter the chemical composition.

By adapting the properties of laser pyrolysis, light reactive deposition is able to deposit highly uniform, very small particles in a coating. Due to the uniformity and small size of the powders, light reactive deposition can be used to form uniform and smooth coating surfaces. The desirable qualities of the particles is a result of driving the reaction with an intense light beam, which results in the extremely rapid heating and cooling. Using light reactive deposition, silicon oxide glass coatings following heating have been formed that have a root mean square surface roughness, as measured by atomic force microscopy, of about 0.25 to about 0.5 nm. Thus, the surfaces are smoother than are thought to be obtained by flame hydrolysis deposition and roughly comparable to smoothness obtainable by chemical vapor deposition. These smooth glass coating applied by light reactive deposition were deposited at relatively high deposition rates by moving the substrate through the product stream. Light reactive deposition is able to produce quality coating at much higher rates than previously available. At the same time, light reactive deposition is able to generate coatings with an extremely broad range of compositions by controlling reactant composition, reaction chemistry and reaction conditions, such as light intensity which can be used to continuously control effective temperatures in the reaction zone over a wide range, such as in the range(s) from about room temperature (e.g., 20° C.) to about 3000° C. Thus, light reactive deposition has already demonstrated the ability to be an efficient and effective approach for the formation of very high quality glass coatings.

Multiple layers can be formed by additional sweeps of the substrate through the product particle stream. Since each coating layer has high uniformity and smoothness, a large number of layers can be stacked while maintaining appropriate control on the layered structure such that optical devices can be formed throughout the layered structure without structural variation adversely affecting the ability to form optical devices. Composition can be varied between layers, i.e., perpendicular to the plane of the structure, and/or portions of layers, within the plane of the structure, to form desired optical structures. Thus, using light reactive deposition possibly with other patterning approaches, it is possible to form complex structures with intricate variation of materials with selectively varying compositions. Furthermore, by adapting laser pyrolysis techniques for the production of commercial quantities of powders, light reactive deposition can form high quality coatings at very rapid rates.

The formation of the three dimensional optical materials described herein generally is based on the deposition of a plurality of layers, each of which may or may not be contoured or patterned to form a particular structure within a specific layer. The ability to form three dimensional optical structures opens the possibility for forming optical materials with greater transmission capability in a significantly smaller volume. For example, a plurality of optical channels, i.e., pathways, along different layers can be incorporated into a single structure, for example, by varying deposited material in the z-plane, i.e., the plane perpendicular to the coated substrate plane. Alternatively or in addition, a plurality of structures can be formed over a single layer to form adjacent optical channels along a layer by selectively depositing desired optical materials over only a portion of a layer or by appropriately etching or otherwise contouring the materials to form isolated domains within the layer, i.e., within the x-y plane of the substrate. The single monolithic structures with a plurality of optical channels provide for the simultaneous transmission of a corresponding plurality of independent optical signals with each optical signal having a full bandwidth according to the material(s) within the specific optical channel. Due to the optical separation of the optical channels within the monolithic structure, the signals can remain independent even though the spatial separation may be small. In addition, layered structures of stacked integrated optical devices can be formed.

In general, the composition along the x-y plane at a particular level or layer within the three dimensional structure can be varied during the deposition process or following deposition by patterning the materials, either before, during or after consolidation. To form patterned structures following deposition, patterning approaches, such as lithography and photolithography, along with etching, such as chemical etching or radiation-based etching, can be used to form desired patterns in one or more layers. This patterning generally is performed on a structure prior to deposition of additional material.

Using the deposition approaches described herein, the composition of product particles deposited on the substrate can be changed during the deposition process to deposit particles with a particular composition at selected locations on the substrate to vary the resulting composition of the optical material along the x-y plane. Using light reactive deposition, the product composition can be varied by adjusting the reactants that react to form the product particle or by varying the reaction conditions. The reactant flow can comprise vapor and/or aerosol reactants, which can be varied to alter the composition of the products. In particular, dopant concentrations can be changed by varying the composition and/or quantity of dopant elements in the flow. The reaction conditions can also affect the resulting product particles. For example, the reaction chamber pressure, flow rates, radiation intensity, radiation energy/wavelength, concentration of inert diluent gas in the reaction stream, temperature of the reactant flow can affect the composition and other properties of the product particles.

While product particle composition changes can be introduced by changing the reactant flow composition or the reaction conditions while sweeping a substrate through the product stream, it may be desirable, especially when more significant compositional changes are imposed to stop the deposition between the different deposition steps involving the different compositions. For example, to coat one portion of a substrate with a first composition and the remaining portions with another composition, the substrate can be swept through the product stream to deposit the first composition to a specified point at which the deposition is terminated. The substrate is then translated the remaining distance without any coating being performed. The composition of the product is then changed, by changing the reactant flow or reaction conditions, and the substrate is swept, after a short period of time for the product flow to stabilize, in the opposite direction to coat the second composition in a complementary pattern to the first composition. A small gap can be left between the coatings of the first composition and the second composition to reduce the presence of a boundary zone with a mixed composition. The small gap can fill in during the consolidation step to form a smooth surface with a relatively sharp boundary between the two materials.

This process can be generalized for the deposition of more than two compositions and/or more elaborate patterns on the substrate. In the more elaborate processes, a shutter can be used to block deposition while the product flow is stabilized and/or while the substrate is being positioned. A precision controlled stage/conveyor can precisely position and sweep the substrate for the deposition of a particular composition. The shutter can be rapidly opened and closed to control the deposition. Gaps may or may not be used to slightly space the different location of the compositions within the pattern.

In other embodiments, a discrete mask is used to control the deposition of particles. A discrete mask can provide an efficient and precise approach for the patterning of particles. With chemical vapor deposition and physical vapor deposition, a layer of material is built up from an atomic or molecular level, which requires binding of the mask at an atomic or molecular level to prevent migration of the material being deposited under the mask to blocked regions. Thus, the "masks" are a coating on the surface without an independent, self-supporting structure corresponding to the mask, and the "mask" is chemically or physically bonded to the surface with atomic level contact along the "mask". In contrast, with particle deposition, the particles generally can be at least macromolecular in size with diameters of about 3 nanometers (nm) or more such that a mask with a flat surface placed against another flat surface provides sufficient contact to prevent significant particle migration past the mask. The discrete masks have an intact self-supporting structure that is not bonded to the surface such that the mask can be removed intact from the surface that is coated. Therefore, the discrete mask approach herein is different from previous masking approaches adapted from photolithography for vapor deposition approaches.

The formation of the particle coating involves directing a product particle stream at the substrate shielded with the discrete mask. The discrete mask has a planar surface with openings at selected locations. The discrete mask blocks the surface except at the openings such that particles can deposit on the surface through the openings. Thus, the mask provides for patterning compositions on the surface by the selected placement of the openings. Suitable discrete masks comprise a mask with a slit that is narrower than the product particle flow such that the deposition process can be very precisely controlled. Movement of the slit can form a desired, precisely controlled pattern with one or more compositions. After use of a discrete mask, it can be removed and reused.

In some embodiments, a plurality of masks is used to deposit particles along a single layer. For example, following deposition of a pattern through a first mask, a second complementary mask can be used to deposit material over at least a portion of the surface left uncovered during deposition with the first mask. Further complementary masks can be used to form complex patterns while completing a single layer or portion thereof with a coating having varying chemical composition over the layer.

Thus, light reactive deposition provides a range of approaches for adjusting the product composition in a controllable and reproducible way. Specifically, the deposition process itself can be controlled to deposit a range of materials at selected locations along a surface to form a pattern of compositions within a layer and/or a mask, e.g. a discrete mask, can be used to form elaborate patterning of compositions along a substrate surface layer. While light reactive deposition provides an efficient, rapid and highly controllable approach for material deposition, other reaction based approaches such as flame hydrolysis can be adapted for some of the improved processing approaches described herein.

To form optical devices, optical properties generally also vary out of the plane orienting the optical structure. In some embodiments, for example, an under-cladding layer and an over-cladding layer are adjacent to an optical transmission layer with one or more cores that provide optical pathways through the optical transmission layer. The optical transmission layer comprises at least one material with different optical properties from the material in the cladding layers. For example, the under-cladding can be applied to a substrate. A core material can be applied over the under-cladding layer. The core material can be selectively deposited and/or etched or otherwise patterned after deposition to form desired core structures of a desired pattern for optical transmission. The over-cladding layer can then be applied over the patterned core layer. The over-cladding material can fill-in with cladding material portions of the optical transmission layer that does not comprise core material. The optical transmission layers can also comprise active optical materials patterned to introduce functional elements to the layer along with passive optical transmission. Optical transmission elements generally have a higher index-of-refraction than cladding material in the same layer or adjacent layers.

Layers generally can be applied sequentially, although near-simultaneous or ever simultaneous application can also occur. With embodiments based on particle deposition, one or several passes of the product particle stream over the substrate surface can be used to form a single layer. The composition of the product particles may or may not be varied within a single pass or between passes. Generally, particle compositions vary at least between portions of adjacent layers, although significant sections of adjacent layers can have identical compositions. By depositing layers with uniform structures and desired composition variation, complex optical structures spanning many layers can be formed.

Light reactive deposition provides a rapid approach for the formation of very smooth layers of optical material. In addition, using light reactive deposition, patterning of a layer can be performed during the deposition process to produce a patterned layer without significant voids such that a smooth surface is formed upon which a subsequent layer is applied. By assembling an optical structure in this way, a plurality of layers can be stacked without significant discontinuities within or between layers in the layered structure. With this capability, a larger number of layers can be stacked and patterned to introduce functionality. The result is a monolithic fully engineered three dimensional optical structure. This increased functionality can comprise more complex multiple layer devices and integration between stacks of layers. In contrast, with these approaches, lithographic techniques combined with etching generally present a discontinuous surface for the deposition of the next layer. While the subsequent application of a uniform layer can smooth out some of the discontinuities, the resulting overcoat layer generally has some contouring reflecting the underlying surface. Vapor deposition approaches generally are very slow such that the production of certain structures is prohibitively time consuming.

The rapid rate of deposition using light reactive deposition provides considerable flexibility for the formation of complex structures. In particular, gradient transition layers can be formed that provide for gradual changes in mechanical and/or optical properties. For example, gradual changes in mechanical properties can provide reduction in stress within the monolithic optical structure. This can be particular useful between a substrate and an under-cladding layer, which can have more significant compositional differences than generally found between optical materials within the optical structure. For example, a gradual composition change can be introduced in a gradient layer between a silicon substrate and a silica-based glass. A gradient in optical properties can reduce transmission loss by placing a larger step in index-of-refraction at an interface without altering the basic nature of the light transmission. In addition, gradients can also be used to provide transitions in physical properties, such as thermal conductivity. For example, a gradient in composition can be used as a transition from a silicon oxide material to silicon nitride. The gradual change in composition results in a structure without abrupt changes in mechanical properties. Silicon nitride has increased thermal conductivity relative to silicon oxide. The composition gradient provides for good thermal conductivity between the silicon oxide and the silicon nitride. The placement of the silicon nitride material adjacent the substrate or along the top of the optical structure can improve dissipation of heat from the optical structure.

A gradient transition layer can be formed as a plurality of thin layers with a step-wise composition change or as a layer with a continuous composition change. The step-wise composition change generally involves two or more layers that have sequential variation in composition from a first composition in a first layer adjacent the gradient transition layer to a second composition in a second layer adjacent the gradient transition layer opposite the first layer. A continuous change in composition can be accomplished in embodiments in which a layer or desired portion thereof is deposited at once with a defocused product stream and the composition of the product stream is changed continuously in time to form the composition gradient in the deposited layer.

By heating the substrate and/or by placing the substrate close to the reaction zone, softened particles can somewhat densify during the deposition process. However, to form the optical layers, particle coated substrates generally are heated to generate uniform optical materials with acceptable optical properties. Consolidation of the layers into densified optical materials, either glasses or crystalline materials (single crystalline or polycrystalline), can be performed at various stages in the layer formation. For example, this heating step can be performed after the deposition of each layer, after the deposition of several layers or after the deposition of all the layers. One or more layers for consolidation can be patterned to locate particular optical materials at portions of a layer. By selectively heating a substrate over only a portion of a substrate, only a portion of a layer may be consolidated during a particular heating step. In general, providing more heating steps improves the quality of the glass layers but requires more processing effort. Light reactive deposition can produce very high quality layers that allow heat processing after many layers are deposited without sacrificing the resulting quality of the composite structure.

Selected dopants can be used to alter the flow temperatures, i.e., glass transition temperatures, for silica glasses and generally for any optical materials. By adjusting the compositions, lower melting compositions can be placed at lower stack positions such that damage can be avoided of the lower materials upon the deposition and consolidation of the subsequent layers of material in the stack. Temperature variations of at least 500° C. are achievable with existing materials for doped silicon dioxide glasses. Also, smaller sized particles generally have lower melting/flow temperatures relative to bulk materials. Thus, to control the flow/melting temperatures as a function of position in the stack, larger particles can be deposited lower in the stack and smaller particles can be deposited higher in the stack. Such a configuration may be useful to reduce the risk of damage to lower layers in the stack in subsequent processing.

To form a uniform optical layer, a layer of amorphous particles deposited by light reactive deposition can be consolidated/densified. To consolidate the optical materials, the powders are heated to a temperature above their flow temperature. At these temperatures, the powders density and upon cooling form a uniform layer of optical material. Substantially uniform optical materials have an optical quality that permits transmission of light. Incorporation of desired composition and/or dopants into the particles results in an optical material with a desired composition/dopants through the resulting densified optical material directly as a result of the powder deposition. Generally, amorphous particles can be consolidated to form a glass material, and crystalline particles, such as aluminum oxide, can be consolidated to form a crystalline material, such as sapphire. However, in some embodiments, appropriate heating and quenching rates can be used to consolidate an amorphous material into a crystalline layer, either single crystalline or polycrystalline, (generally slow quenching rates) and a crystalline powder into a glass layer (generally a rapid quench).

Using three dimensional optical structures, planar optical devices can be formed with individual layers involving optical circuits with optical waveguides and, in general, a plurality of additional integrated optical devices, such as couplers, amplifiers and the like. Thus, a stacked structure with a plurality of integrated optical circuits can be formed within a monolithic form. In this way, a large number of optical devices can be situated within a small volume. In some embodiments, with layer-based stacking of integrated optical circuits, a qualitative jump in packing capability is achievable to fit a very large number of integrated optical circuits along a planar surface, generally on a planar substrate.

Due to the small thickness of the layers, the presence of additional layers each having integrated optical circuits and/or other optical devices can be added without significantly altering the overall space occupied by the monolithic form. The single monolithic structures with a plurality of optical channels provide for the simultaneous transmission of a corresponding plurality of independent optical signals with each optical signal having a full bandwidth according to the material(s) within the specific optical channel. Due to the optical separation of the optical channels within the monolithic structure, the signals can remain independent even though the spatial separation may be small. Thus, a large increase in optical processing capability can easily be added in the same footprint as previous devices.

Furthermore, the three dimensional optical structures can comprise integration of optical devices between different layers of the structure. Based on the complex variation in optical materials achievable with the processing approaches herein, the three dimensional optical structure can comprise intricate variation in optical materials through the structure comprising devices that span several layers. Through the use of turning devices, light in a pathway on a particular layer is conveyed to a pathway within another layer thereby integrating optical devices between different layers. Turning elements, such as a gradient taper or a turning mirror as described in detail below, reflect light from planar devices within a layer out of the plane of the layer optionally into a waveguide or the like, and, in some embodiments, the turning elements also reflect the light back into another planar layer of the structure into a light pathway/waveguide or other desired optical transmitting device. The ability to integrate optical devices between layers in a planar optical structure expands enormously the ability to form compact and complex optical networks of integrated optical devices within a planar framework with a corresponding small footprint.

The ability to engineer optical properties at different layers along a multilayer optical structure in three dimensions provides the capability to form devices with multiple layers having intricate interactions between the layers. In some embodiments, the interactions between the layers are passive. For example, the cladding layer can have a gradient in composition with a lower index adjacent the core material. This gradient in cladding index-of-refraction can lead to a reduced loss for transmission through the core while not changing the single mode character of the core. In another passive embodiment, a cladding layer can comprise a moderate index-of-refraction material intersecting a core layer. This moderate index-of-refraction material functions as a tap that intercepts a small but reproducible portion of the transmission through the core layer such that calculations of the transmission intensity through the core layer can be performed by measuring the intensity in the tap material.

An example of an embodiment with active interaction between the layers involves a pump core separated from an amplification core by a cladding layer. The amplification core is a portion of a waveguide core with an absorbing element/compound within the optical material. For example, in some embodiments, rare earth ions within the amplification core can be excited with energy from pump core, which generally involves light that is absorbed by the rare earth ions. The cladding layer has a transmission region overlapping with the amplification core such that light in the pump core is transmitted through the transmission region to the amplification region. The transmission region has a higher index-of-refraction than the other portions of the cladding layer. The pump core and the transmission region, however, have a lower index-of-refraction than the amplification core such that the amplified signal core is confined to the amplification core. Therefore, light of an appropriate wavelength transmitted within the pump core passes through the transmission region to the amplification core where it is absorbed. Signal light transmitted through the amplification core is amplified by stimulated emission in the amplification region due to the pump light entering the amplification core and producing an excited state of the absorbing element/compound, e.g., rare-earth dopant. The excited state of the absorbing element/compound can emit photons at the signal wavelength.

In addition, a thermally activated continuous switch can be formed from an interferometer. The interferometer comprises a beam splitter that splits a waveguide into two optical paths. The split optical path is recoupled such that any delay in one path will result in interference between the signals if coherent light is transmitted down the optical path. Coherence of the light in both arms of the interferometer is assured by designing the waveguides with a geometry capable of supporting only a single mode of the operating wavelength. The paths can be set up such that the two split paths are equal in distance and have equivalent nominal optical properties. However, one branch of the interferometer is adjacent to another path having an absorption region that is illuminated by a control light source independent of the signal source. A thermally conductive cladding layer is placed between the branch path and the absorbing region of the adjacent path. The absorption of light in the absorbing region creates heat that is transmitted through the cladding layer to the adjacent branch path. The branch path comprises an optical material that has an index-of-refraction that is sensitive to temperature in a predictable way. By adjusting the intensity of light in the absorbing region the thermal heating of the branch pathway can be controlled. The heating causes a predictable change in index-of-refraction that translates into phase shifts of the light relative to transmission through the nominal index-of-refraction material. The phase shift results in a predictable degree of interference between coherent light in the two branches that modulates the resulting signal at in the recombined portions of the pathway. This modulation can function as a switch or as a continuously variable attenuator for the remaining path.

Particle Deposition

In embodiments of particular interest, the optical layers are formed by light reactive deposition. A highly uniform flow of product particles are formed that are directed toward a substrate to be coated. The resulting particle coating can be formed into an optical material, such as a glass or crystal.

Light reactive deposition is a coating approach that uses an intense radiation source, e.g., light source, to drive synthesis of desired compositions from a flowing reactant stream. Light reactive deposition generally results in deposition of powders, although hot particles deposited on the surface can partly fuse during the deposition process due to their temperature. Generally, particles in a product flow, as described herein, can be solid particles, liquid particles and softened particles that have not cooled sufficiently to completely solidify. Light reactive deposition has similarities with laser pyrolysis for powder synthesis in that an intense radiation beam (e.g., a light beam) drives the reaction. Laser pyrolysis involves a flowing reactant stream that intersects with the radiation beam at a reaction zone where reaction products form particles. The reaction zone intersects the flow such that the reaction zone does not surround the reactant stream. Rather, the radiation beam is at an angle to the flow, for example, perpendicular to the flow or about parallel to the surface. While the particles produced in laser pyrolysis are collected for subsequent use, in light reactive deposition, the resulting compositions are directed to a substrate surface where a coating is formed. The characteristics of laser pyrolysis that can lead to the production of highly uniform particles can be correspondingly implemented in the production of coatings with high uniformity.

In light reactive deposition, the coating of the substrate can be performed in a coating chamber separate from the reaction chamber or the coating can be performed within the reaction chamber. In either of these configurations, the reactant delivery system can be configured similarly to a reactant delivery system for a laser pyrolysis apparatus for the production of particles with various compositions. Thus, a wide range of coatings can be formed for further processing into optical materials.

If the coating is performed in a coating chamber separate from the reaction chamber, the reaction chamber is essentially the same as the reaction chamber for performing laser pyrolysis, although the reactant throughput and the reactant stream size may be designed to be appropriate for the coating process. For these embodiments, the coating chamber and a conduit connecting the coating chamber with the reaction chamber replace the collection system of the laser pyrolysis system. If the coating is performed within the reaction chamber, a substrate intercepts flow from the reaction zone, directly capturing the particles onto its surface.

A laser pyrolysis apparatus design incorporating an elongated reactant inlet has been developed that facilitates production of commercial quantities of particles. Specifically, the reaction chamber and reactant inlet are elongated significantly along the light beam to provide for an increase in the throughput of reactants and products. By orienting the light beam along the elongated reactant stream, a sheet of product particles is generated. This design has been described in U.S. Pat. No. 5,958,348 to Bi et al., entitled "Efficient Production of Particles by Chemical Reaction," incorporated herein by reference.

Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference. The delivery of gaseous/vapor reactants and/or aerosol reactants, as described further below, can be adapted for the elongated reaction chamber design. These designs for commercial production of powders by laser pyrolysis can be adapted for rapid coating of high quality optical materials by light reactive deposition. The size of the elongated reactant inlet can be selected based on the size of the substrate to be coated.

In general, the particle production apparatus with the elongated reaction chamber and reactant inlet is designed to reduce contamination of the chamber walls, to increase the production capacity and to make efficient use of resources. Due to the chamber design, the elongated reaction chamber can provide for an increased throughput of reactants and products without a corresponding increase in the dead volume of the chamber. The dead volume of the chamber can become contaminated with unreacted compounds and/or reaction products. Furthermore, an appropriate flow of shielding gas can confine the reactants and products within a flow stream through the reaction chamber. The high throughput of reactants makes efficient use of the radiation (e.g., light) energy.

With light reactive deposition, the rate of particle production for rapid coating can vary in the range(s) from about 1 gram per hour of reaction product to about 10 kilograms per hour of desired reaction product, although clearly lower rates are obtainable if desired. Specifically, using apparatuses described herein, coating can be accomplished at particle production rates of up to at least about 5 grams per hour (g/hr), in other embodiments at least about 25 g/hr, in further embodiments at least about 1 kilograms per hour (kg/hr) and in additional embodiments at least about 10 kg/r. Exemplary rates of particle production (in units of grams produced per hour) comprise not less than about 5, 10, 50, 100, 250, 500, 1000, 2500, 5000, or 10000. A person of ordinary skill in the art will recognize that production rates intermediate between these explicit production rates are contemplated and are within the present disclosure.

Not all of the particles generated are deposited on the substrate. In general the deposition efficiency depends on several factors comprising the relative speed of the substrate through the product stream with the particles, for embodiments based on moving the substrate through a sheet of product particles. Other factors affecting deposition efficiency comprise, for example, the particle composition, particle temperature and substrate temperature. At moderate relative rates of substrate motion, coating efficiencies of about 15 to about 20 percent have been achieved, i.e. about 15 to about 20 percent of the produced particles are deposited on the substrate surface. Routine optimization can increase this deposition efficiency further. At slower relative motion of the substrate through the product particle stream, deposition efficiencies of at least about 40% have been achieved and can be as high as 80% or more. In some embodiments, based on achievable rates of particle production and coating efficiency, deposition rates can be obtained of at least about 5 grams per hour (g/hr) of reaction product are deposited on the substrate, in other embodiments at least about 25 g/hr, in further embodiments at least from about 100 g/hr to about 5 kg/hr and in still other embodiment from about 250 g/hr to about 2.5 kg/hr of product particles are deposited on the substrate. Exemplary rates of particle deposition (in units of grams deposited per hour) comprise not less than about 5, 10, 25, 50, 100, 250, 500, 1000, 2500, or 5000. A person of ordinary skill in the art will recognize that deposition rates between these explicit rates are contemplated and are within the present disclosure.

Alternatively or in addition, the invention provides that the rate of the movement of the substrate and the particle flow relative to each other can vary substantially, depending on the desired specifications for the coated substrate. Thus, in one embodiment, the rate can be measured on an absolute scale, and can vary in the range(s) of at least about 0.001 inches per second, in other embodiments at least about 0.05 inches per second, in further embodiments, from about 1 inch per second to about 12 inches per second, or even more. Further, in another embodiment, the rate can be measured on a scale relative to the substrate being coated, and can vary in the range(s) of at least about 1 substrate per 5 minutes and in other embodiments from about 1 substrate per minute to about 1 substrate per second or shorter period of time. A person of ordinary skill in the art will recognize that substrate coating rates between these explicit rates are contemplated and are within the present disclosure.

For appropriate embodiments using a sheet of product particles, the rate of relative substrate motion generally is a function of the selected deposition rate and the desired coating thickness as limited by the movement the substrate at the desired rate while obtaining desired coating uniformity. In embodiments in which the substrate is swept through the product particle stream, the substrate can be moved relative to a fixed nozzle, or the nozzle can be moved relative to a fixed substrate. Due to the high deposition rates achievable with light reactive deposition, extremely fast coating rates are easily achievable. These coating rates by light reactive deposition are dramatically faster than rates that are achievable by competing methods. For example, at particle production rates of about 10 kg/hr, an eight-inch wafer can be coated with a thickness of about 10 microns of powder in approximately one second even at a deposition efficiency of only about 2.5 percent, assuming a powder density of about 10% of the bulk density. A person of ordinary skill in the art can calculate with simple geometric principles a particular coating rate based on the deposition rate, the desired thickness and the density of powder on the substrate.

Furthermore, the rapid production rate can be advantageously used to form a plurality of particles coatings with or without consolidation between coatings. Each coating can cover an entire layer or a portion of a layer. Compositions can be changed within a layer or between layers. When changing compositions significantly between layers, it may be desirable to wait a few seconds for the product stream to stabilize. In general, reasonably sized substrates described herein can be coated with three particle coatings in less than about 1 minute, in other embodiments less than about 15 seconds, and in other embodiments within range(s) from about 9 seconds to about 3 seconds. Similarly, reasonably sized substrates described herein can be coated with five particle coatings in less than about 1 minute, in other embodiments less than about 25 seconds, and in other embodiments within range(s) from about 15 seconds to about 5 seconds. A person of ordinary skill in the art will recognize that ranges and subranges within these explicit ranges are contemplated and are within the present disclosure.

The design of the elongated reaction chamber 100 for generating a sheet of product particles is shown schematically in FIG. 1. A reactant inlet 102 leads to main chamber 104. Reactant inlet 102 conforms generally to the shape of main chamber 104. Main chamber 104 comprises an outlet 106 along the reactant/product stream for removal of particulate products, any unreacted gases and inert gases. Shielding gas inlets 108 are located on both sides of reactant inlet 102. Shielding gas inlets are used to form a blanket of inert gases on the sides of the reactant stream to inhibit contact between the chamber walls and the reactants or products. The dimensions of elongated reaction chamber 104 and reactant inlet 102 can be designed for high efficiency particle production. Reasonable dimensions for reactant inlet 102 for the production of nanoparticles, when used with a $CO_2$ laser with a power in the several kilowatt range, are from about 5 mm to about 1 meter.

Tubular sections 110, 112 extend from the main chamber 104. Tubular sections 110, 112 hold windows 114, 116, respectively, to define a light beam path 118 through the reaction chamber 100. Tubular sections 110, 112 can comprise inert gas inlets 120, 122 for the introduction of inert gas into tubular sections 110, 112.

Outlet 106 can lead to a conduit directed to a coating chamber. A change in dimension does not necessarily demarcate a transition from the reaction chamber to a conduit to the coating chamber. The reaction zone is located within the reaction chamber. The conduit can but does not necessarily involve a change in direction of the flow. Alternatively or additionally, a substrate can intercept the product flow to coat the substrate within the reactant chamber.

Figure 2:
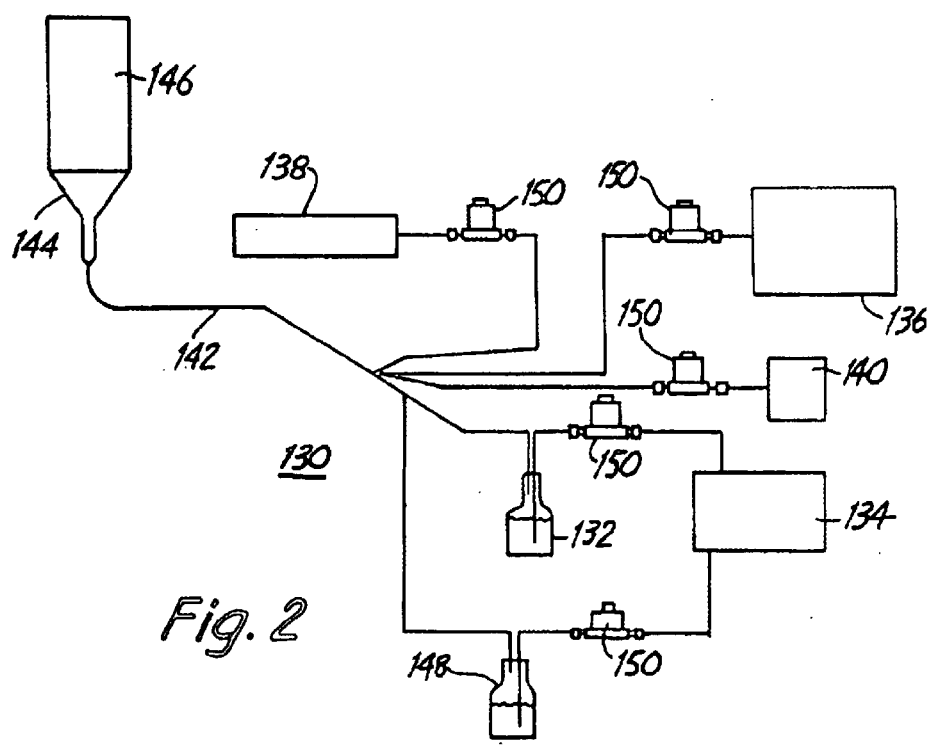
FIG. 2 is a schematic representation of a reactant delivery system for the delivery of vapor/gas reactants to a flowing reaction system, such as the laser pyrolysis reactor of FIG. 1.

Reactant inlet 102 is generally connected to a reactant delivery system. Referring to FIG. 2, an embodiment 130 of a reactant delivery apparatus comprises a source 132 of a precursor compound, which can be a liquid, solid or gas. For liquid or solid reactants, an optional carrier gas from one or more carrier gas sources 134 can be introduced into precursor source 132 to facilitate delivery of the reactant. Precursor source 132 can be a liquid holding container, a solid precursor delivery apparatus or other suitable container. The carrier gas from carrier gas source 134 can be, for example, either an infrared absorber, an inert gas or mixtures thereof.

The gases/vapors from precursor source 132 can be mixed with gases from infrared absorber source 136, inert gas source 138 and/or gaseous reactant source 140 by combining the gases/vapors in a single portion of tubing 142. The gases/vapors are combined a sufficient distance from the reaction chamber such that the gases/vapors become well mixed prior to their entrance into the reaction chamber. The combined gas/vapor in tube 142 passes through a duct 144 into channel 146, which is in fluid communication with a reactant inlet, such as 102 in FIG. 1.

An additional reactant precursor can be supplied as a vapor/gas from second reactant source 148, which can be a liquid reactant delivery apparatus, a solid reactant delivery apparatus, a gas cylinder or other suitable container or containers. As shown in FIG. 2, second reactant source 148 delivers an additional reactant to duct 144 by way of tube 142. Alternatively, second reactant source can deliver the second reactant into a second duct such that the two reactants are delivered separately into the reaction chamber where the reactants combine at or near the reaction zone. Thus, for the formation of complex materials and/or doped materials, a significant number of reactant sources and, optionally, separate reactant ducts can be used for reactant/precursor delivery. For example, as many as 25 reactant sources and/or ducts are contemplated, although in principle, even larger numbers could be used. Mass flow controllers 150 can be used to regulate the flow of gases/vapors within the reactant delivery system of FIG. 2. Additional reactants/precursors can be provided similarly for the synthesis of complex materials.

As noted above, the reactant stream can comprise one or more aerosols. The aerosols can be formed within the reaction chamber or outside of the reaction chamber prior to injection into the reaction chamber. If the aerosols are produced prior to injection into the reaction chamber, the aerosols can be introduced through reactant inlets comparable to those used for gaseous reactants, such as reactant inlet 102 in FIG. 1. For the formation of complex material, additional aerosol generators and/or vapor/gas sources can be combined to supply the desired composition within the reactant stream.

Figure 3:
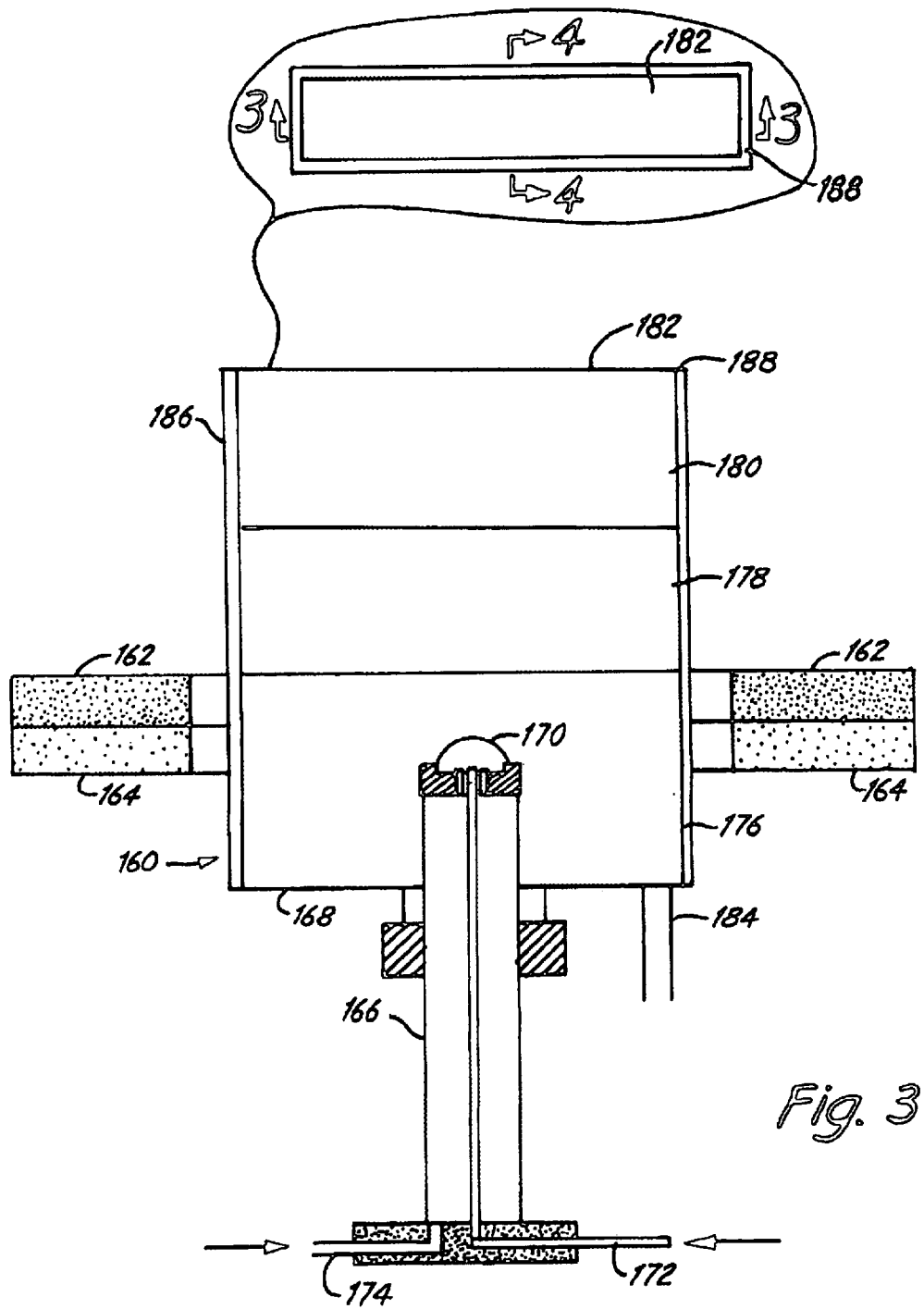
FIG. 3 is a sectional side view of a reactant inlet nozzle with an aerosol generator for the delivery of aerosol and gas/vapor compositions into a reaction chamber, wherein the cross section is taken along line 3—3 of the insert. The insert shows a top view of an elongated reactant inlet.
Figure 4:
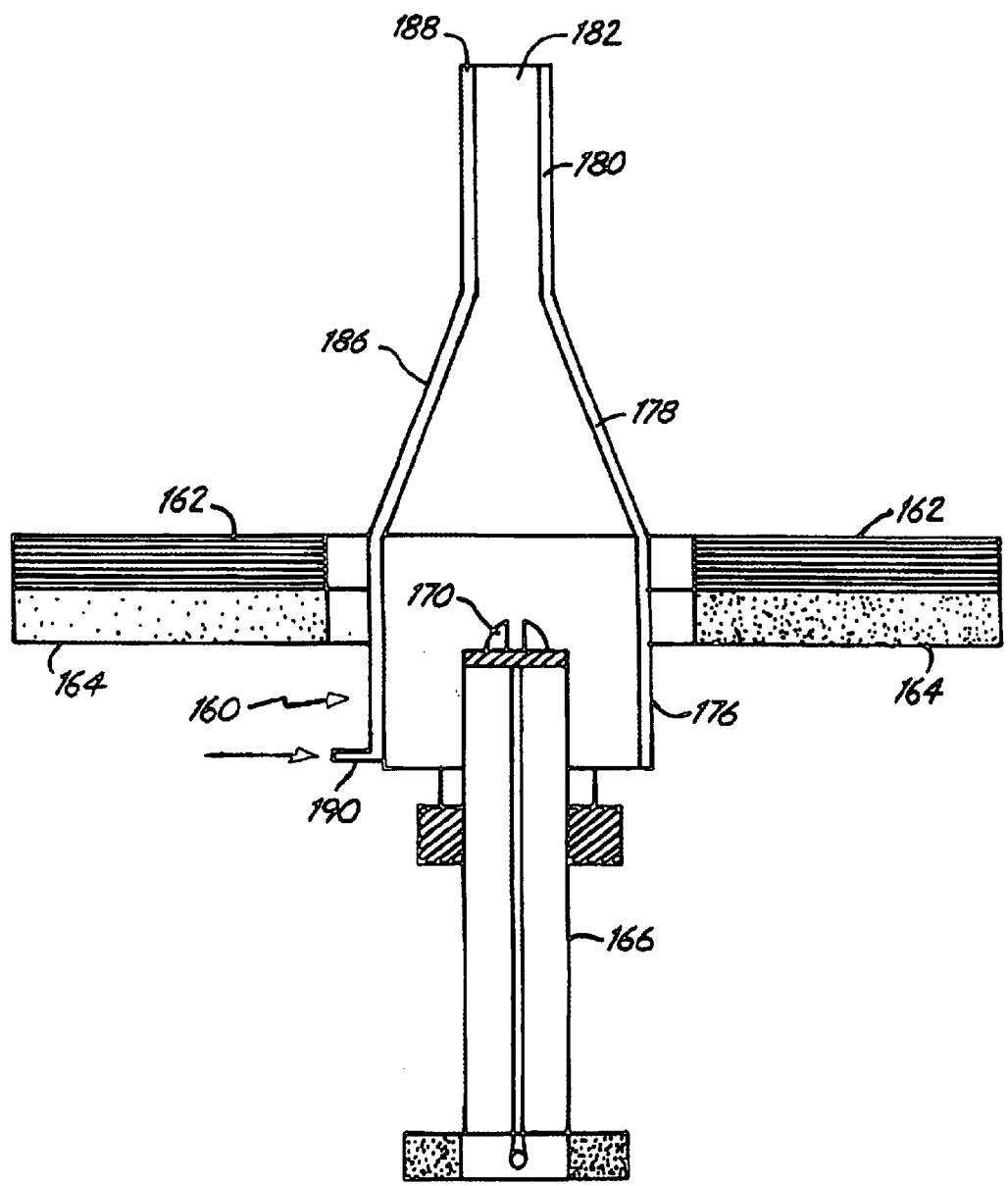
FIG. 4 is a sectional side view of the reactant inlet nozzle of FIG. 3 taken along the line 4—4 of the insert in FIG. 3.

An embodiment of a reactant delivery nozzle configured to deliver an aerosol reactant is shown in FIGS. 3 and 4. Inlet nozzle 160 connects with a reaction chamber at its lower surface 162. Inlet nozzle 160 comprises a plate 164 that bolts into lower surface 162 to secure inlet nozzle 160 to the reaction chamber. Inlet nozzle 160 comprises an inner nozzle 166 and an outer nozzle 168. Inner nozzle 166 can have, for example, a twin orifice internal mix atomizer 170 at the top of the nozzle. Suitable gas atomizers are available from Spraying Systems, Wheaton, Ill. The twin orifice internal mix atomizer 170 has a fan shape to produce a thin sheet of aerosol and gaseous compositions. Liquid is fed to the atomizer through tube 172, and gases for introduction into the reaction chamber are fed to the atomizer through tube 174. Interaction of the gas with the liquid assists with droplet formation.

Outer nozzle 168 comprises a chamber section 176, a funnel section 178 and a delivery section 180. Chamber section 176 holds the atomizer of inner nozzle 166. Funnel section 178 directs the aerosol and gaseous compositions into delivery section 180. Delivery section 180 leads to a rectangular reactant opening 182, shown in the insert of FIG. 3. Reactant opening 182 forms a reactant inlet into a reaction chamber for laser pyrolysis or light reactive deposition. Outer nozzle 168 comprises a drain 184 to remove any liquid that collects in the outer nozzle. Outer nozzle 168 is covered by an outer wall 186 that forms a shielding gas opening 188 surrounding reactant opening 182. Inert shielding gas is introduced through tube 190. Additional embodiments for the introduction of an aerosol with one or more aerosol generators into an elongated reaction chamber is described in U.S. Pat. No. 6,193,936 to Gardner et al., entitled "Reactant Delivery Apparatuses," incorporated herein by reference.

For the formation of oxides, suitable secondary reactants serving as an oxygen source comprise, for example, $O_2$, CO, $N_2O$, $H_2O$, $CO_2$, $O_3$ and mixtures thereof. Molecular oxygen can be supplied as air. Alternatively, oxygen can be provided in a metal/metalloid precursor compound, such as a carbonyl. Some sources of carbon for carbides, nitrogen for nitrides and sulfur for sulfides are described further below.

A secondary reactant compound, if present, should not react significantly with the metal precursor prior to entering the reaction zone since this generally would result in the formation of large particles. However, reacting precursors can be delivered into the reactant chamber through separate nozzles such that the reactant do not combine until they are near the reaction zone.

Laser pyrolysis/light reactive deposition can be performed with a variety of optical frequencies, using either a laser or other strong focused light source, such as an arc lamp. Some desirable light sources operate in the infrared portion of the electromagnetic spectrum. $CO_2$ lasers are particularly convenient sources of light. Infrared absorbers for inclusion in the reactant stream comprise, for example, $C_2H_4$, water, isopropyl alcohol, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the reaction.

Generally, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. In light reactive deposition, the reaction process is qualitatively different from the process in a combustion reactor where an energy source initiates a reaction, but the reaction is driven by energy given off by an exothermic reaction. In a combustion reactor, there is generally no well-defined reaction zone with a boundary. The reaction zone is large and the residence time of the reactants is long. Lower thermal gradients are generally present in the combustion reactor.

In contrast, the laser/light driven reactions have extremely high heating and quenching rates. The product compositions and particle properties generally depend on the laser power in the reactions zone and the quantity of radiation absorbers in the flow. By controlling the composition of the reactant flow and the light intensity in the reaction zone, the reaction product can be reproducibly controlled. The effective temperature in the reaction zone can be controlled over a wide range, for example, in the range(s) from about room temperature (e.g., 20° C.) to about 3000° C. In light reactive deposition, the reaction zone is primarily at the overlap of the light beam and the reactant stream, although the reaction zone may extend a few millimeters beyond the light beam, depending on the precise character of the reaction. After leaving the reaction zone in a radiation/light driven reactor, the particles may still be somewhat fluid/soft due to their temperature even if the reaction has terminated.

An inert shielding gas can be used to reduce the amount of reactant and product molecules contacting the reactant chamber components. Inert gases can also be introduced into the reactant stream as a carrier gas and/or as a reaction moderator. Appropriate inert shielding gases comprise, for example, Ar, He and $N_2$.

Laser pyrolysis apparatuses can be adapted for light reactive deposition. The nature of the adaptation depends on whether or not the coating is performed in the reaction chamber or within a separate coating chamber. In any of the embodiments, the reactant delivery inlet into the reaction chamber generally is configured to deliver a reactant stream with dimensions that results in a product stream with desired dimensions for the deposition process. For example, in some embodiments, the reactant inlet has a length approximately the same size or slightly larger than the diameter of a substrate such that the substrate can be coated along an entire dimension of the substrate with one pass through the product stream without wasting excessive amount of product.

Figure 5:
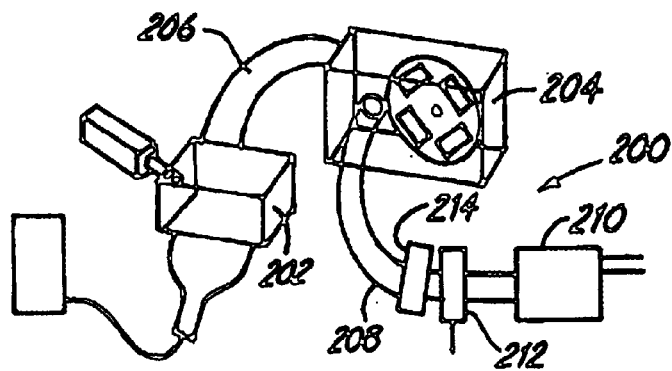
FIG. 5 is a schematic diagram of a light reactive deposition apparatus formed with a particle production apparatus connected to a separate coating chamber through a conduit.

The outlet of a laser pyrolysis apparatus can be adapted for the coating of substrates within a separate coating chamber. A coating apparatus with separate reaction chamber and coating chamber is shown schematically in FIG. 5. The coating apparatus 200 comprises a reaction chamber 202, a coating chamber 204, a conduit 206 connecting reaction chamber 202 with coating chamber 204, an exhaust conduit 208 leading from coating chamber 204 and a pump 210 connected to exhaust conduit 208. A valve 212 can be used to control the flow to pump 210. Valve 212 can be, for example, a manual needle valve or an automatic throttle valve. Valve 212 can be used to control the pumping rate and the corresponding chamber pressures. A collection system, filter, scrubber or the like 214 can be placed between the coating chamber 204 and pump 210 to remove particles that did not get coated onto the substrate surface.

Figure 6:
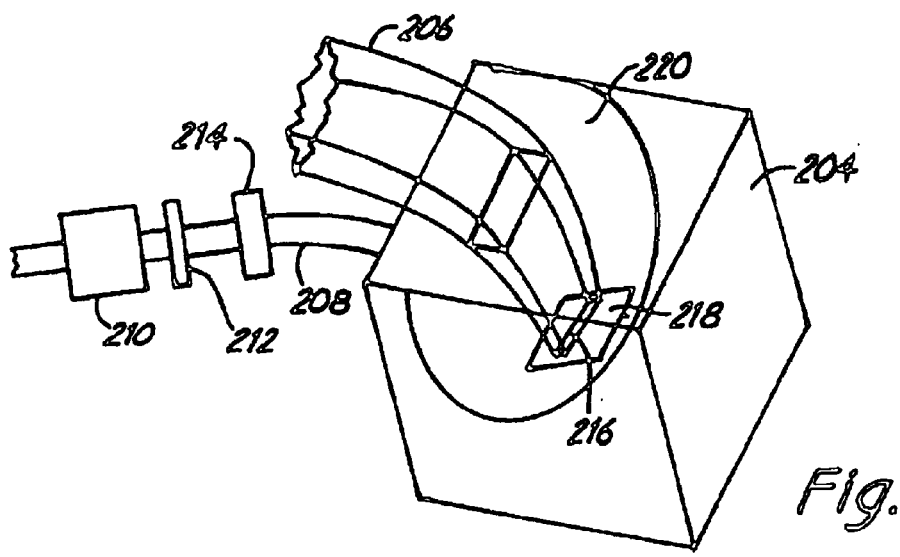
FIG. 6 is a perspective view of a coating chamber where the walls of the chamber are transparent to permit viewing of the internal components.

Referring to FIG. 6, conduit 206 from the particle production apparatus 202 leads to coating chamber 204. Conduit 206 terminates at opening 216 within chamber 204. In some embodiments, conduit opening 216 is located near the surface of substrate 218 such that the momentum of the particle stream directs the particles directly onto the surface of substrate 218. Substrate 218 can be mounted on a stage or other platform 220 to position substrate 218 relative to opening 216.

Figure 7:
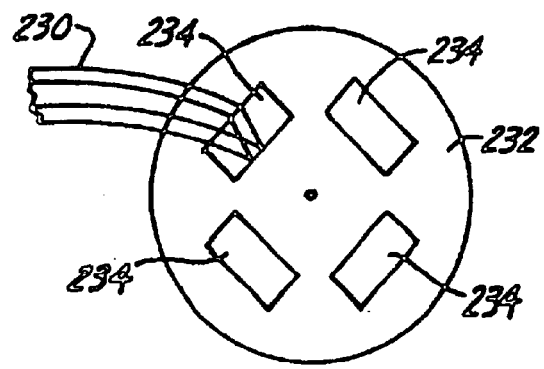
FIG. 7 is perspective view of a particle nozzle directed at a substrate mounted on a rotating stage.

An embodiment of a stage to position a substrate relative to the conduit from the particle production apparatus is shown in FIG. 7. A particle nozzle 230 directs particles toward a rotating stage 232. As shown in FIG. 7, four substrates 234 are mounted on stage 232. More or fewer substrates can be mounted on a moveable stage with corresponding modifications to the stage and size of the chamber. A motor is used to rotate stage 232. Other designs for a stage, conveyor or the like can be used to sweep the substrate through the product particle flow.

Movement of stage 232 sweeps the particle stream across a surface of one particular substrate 234 within the path of nozzle 230. Stage 232 can be used to pass sequential substrates through the product stream for one or more coating applications to each substrate. Stage 232 can comprise thermal control features that provide for the control of the temperature of the substrates on stage 232. Alternative designs involve the linear movement of a stage or other motions. In other embodiments, the particle stream is unfocused such that an entire substrate or the desired portions thereof is simultaneously coated without moving the substrate relative to the product flow.

If the coating is performed within the reaction chamber, the substrate is mounted to receive product compositions flowing from the reaction zone. The compositions may not be fully solidified into solid particles, although quenching may be fast enough to form solid particles. Whether or not the compositions are solidified into solid particles, the particles can be highly uniform. The distance from the reaction zone to the substrate can be selected to yield desired coating results.

Figure 8:
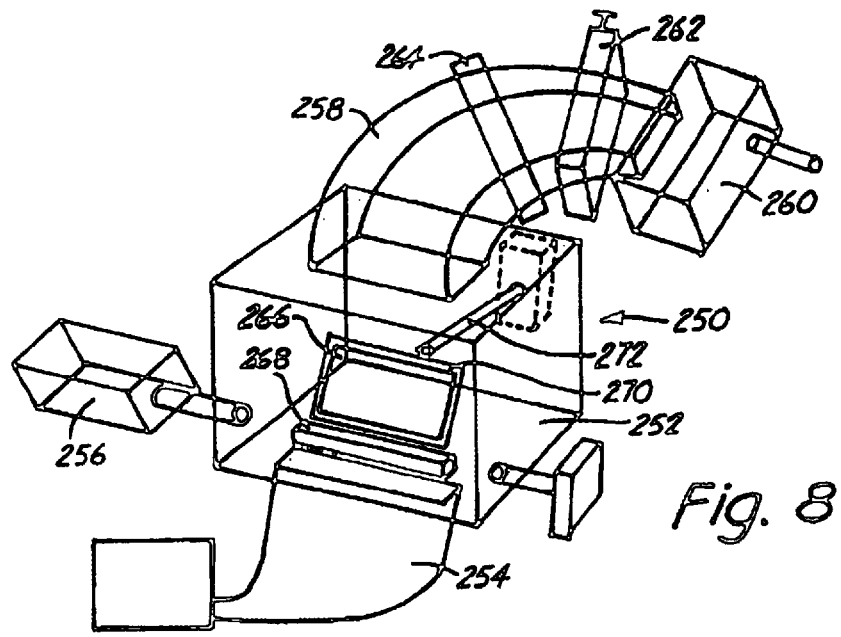
FIG. 8 is a schematic diagram of a light reactive deposition apparatus in which a particle coating is applied to a substrate within the particle production chamber.

An apparatus 250 to perform substrate coating within the reaction chamber is shown schematically in FIG. 8. The reaction/coating chamber 252 is connected to a reactant supply system 254, a radiation source 256 and an exhaust 258. Exhaust 258 can be connected to a pump 260, although the pressure from the reactant stream itself can maintain flow through the system. A valve 262 can be used to control the flow to pump 260. Valve 262 can be used to adjust the pumping rate and the corresponding chamber pressures. A collection system, filter, scrubber or the like 264 can be placed between chamber 252 and pump 260 to remove particles that did not get coated onto the substrate surface.

Substrate 266 can contact flow from a reaction zone 268 to coat the substrate with product particles/powders. Substrate 266 can be mounted on a stage, conveyor, or the like 270 to sweep substrate 266 through the flow. Stage 270 can be connected to an actuator arm 272 or other motorized apparatus to move stage 270 to sweep the substrate through the product stream. Various configurations can be used to sweep the coating across the substrate surface as the product leaves the reaction zone. A shown in FIG. 8, actuator arm 272 translates stage 270 to sweep substrate 266 through the product stream.

Figure 9:
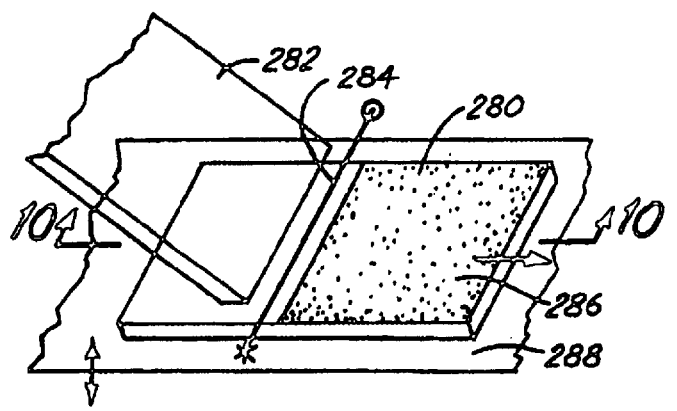
FIG. 9 is a perspective view of a reactant nozzle delivering reactants to a reaction zone positioned near a substrate.
Figure 10:
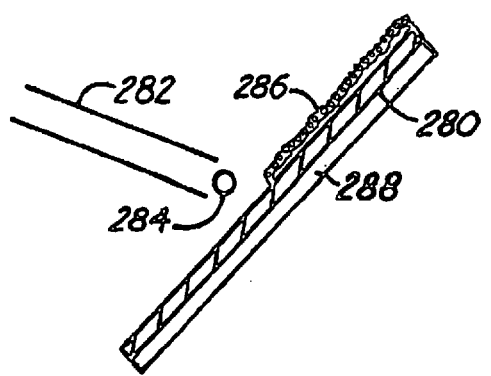
FIG. 10 is a sectional view of the apparatus of FIG. 9 taken along line 10—10.

A similar embodiment is shown in an expanded view in FIGS. 9 and 10. A substrate 280 moves relative to a reactant nozzle 282, as indicated by the right directed arrow. Reactant nozzle 282 is located just above substrate 280. An optical path 284 is defined by suitable optical elements that direct a light beam along path 284. Optical path 284 is located between nozzle 282 and substrate 280 to define a reaction zone just above the surface of substrate 280. The hot particles tend to attract to the cooler substrate surface.

Referring to FIGS. 9 and 10, a particle coating 286 is formed as the substrate is scanned past the reaction zone. In general, substrate 280 can be carried on a conveyor/stage 288. Conveyor/stage 288 can be connected to an actuator arm, as shown in FIG. 8. In alternative embodiments, rollers and a motor, a continuous belt conveyor, or any of a variety of design, comprising known designs, for translating a substrate can be used to carry the substrate.

In some embodiments, the position of conveyor 288 can be adjusted to alter the distance from substrate 286 to the reaction zone. Changes in the distance from substrate to the reaction zone correspondingly alter the temperature of the particles striking the substrate. The temperature of the particles striking the substrate generally alters the properties of the resulting coating and the requirements for subsequent processing, such as a subsequent heat processing consolidation of the coating. The distance between the substrate and the reaction zone can be adjusted empirically to produce desired coating properties. In addition, the stage/conveyor supporting the substrate can comprise thermal control features such that the temperature of the substrate can be adjusted to higher or lower temperatures, as desired.

Figure 11:
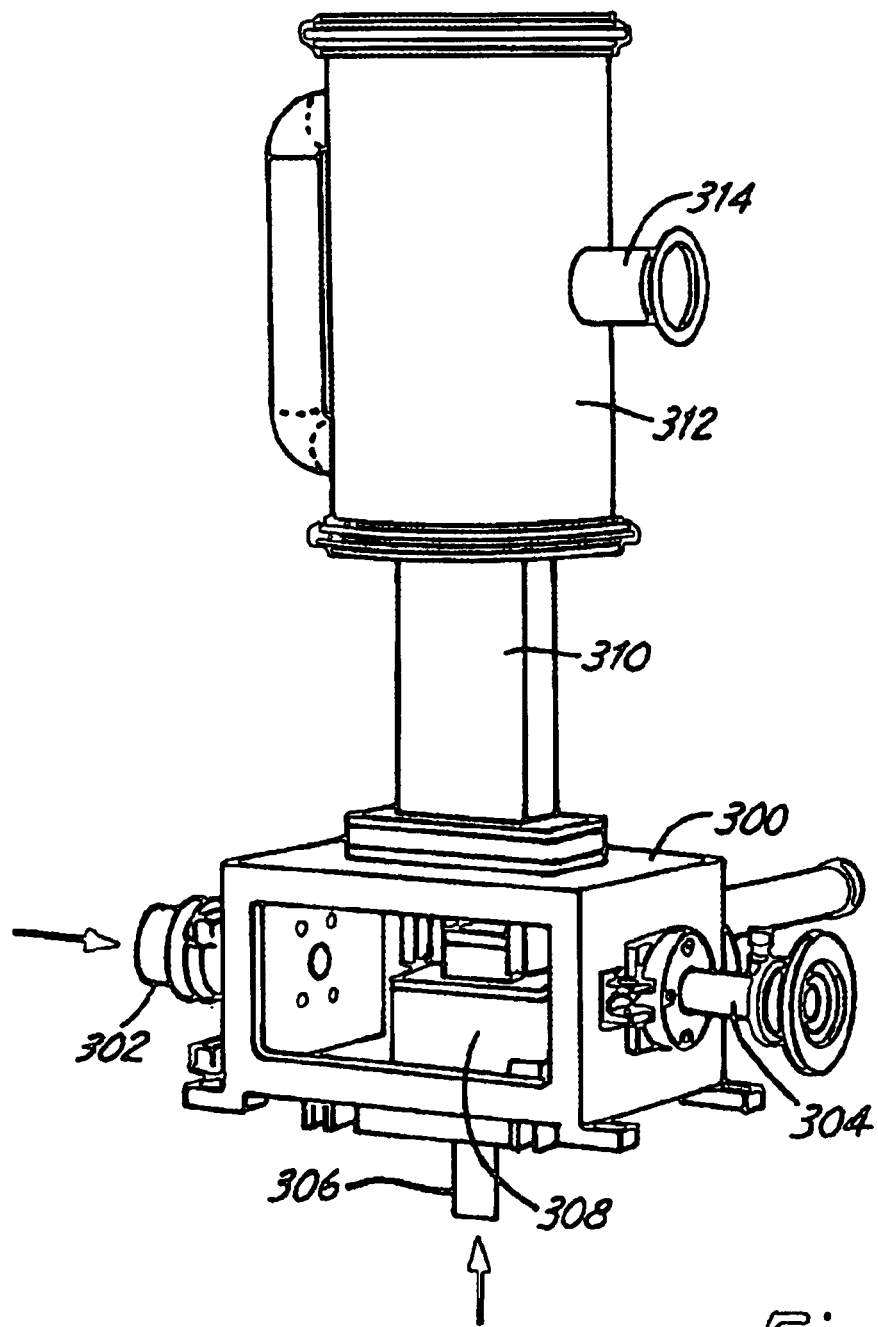
FIG. 11 is a perspective view of an embodiment of a light reactive deposition chamber.
Figure 12:
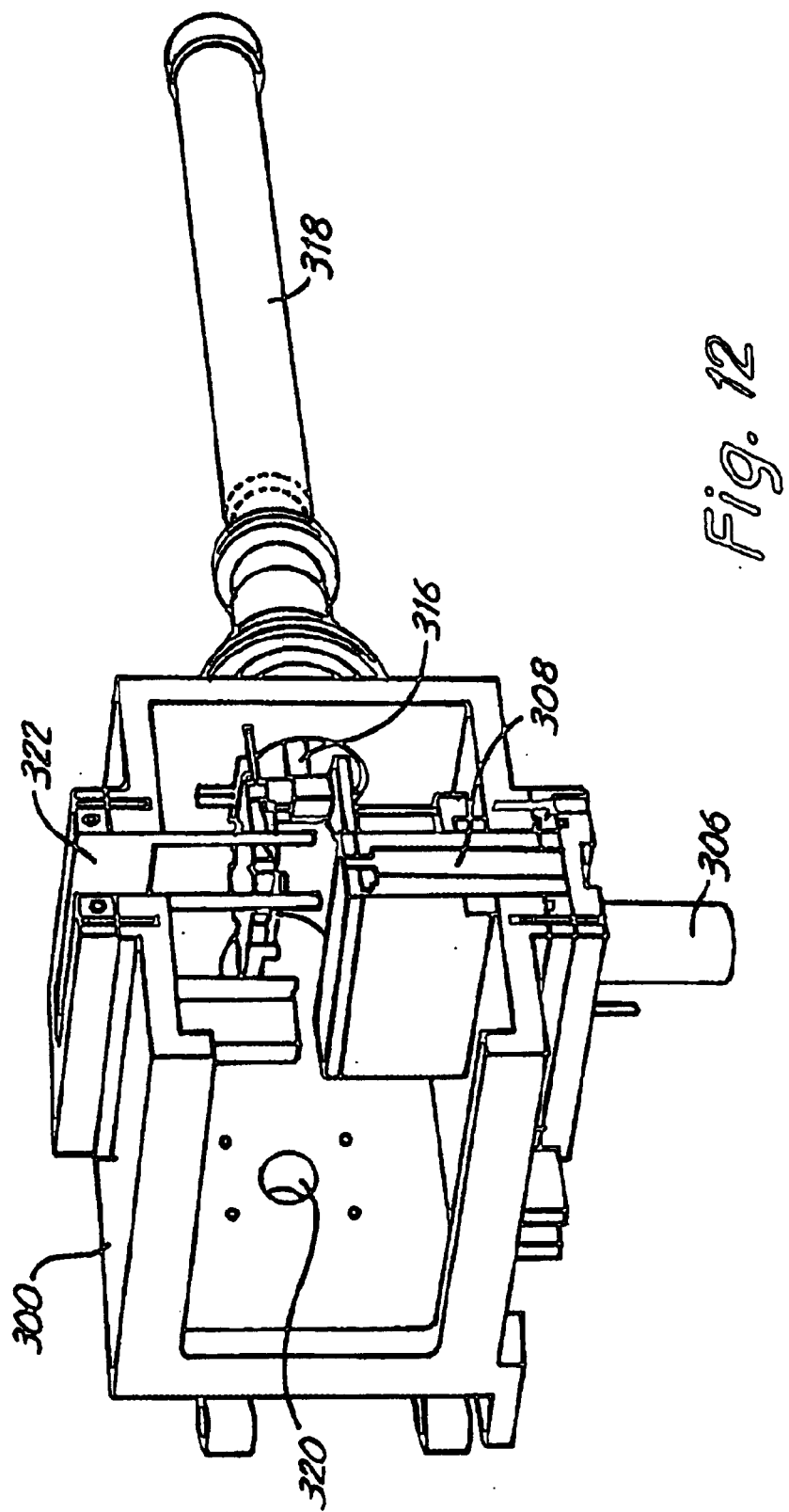
FIG. 12 is an expanded view of the reaction chamber of the light reactive deposition chamber of FIG. 11.
Figure 13:
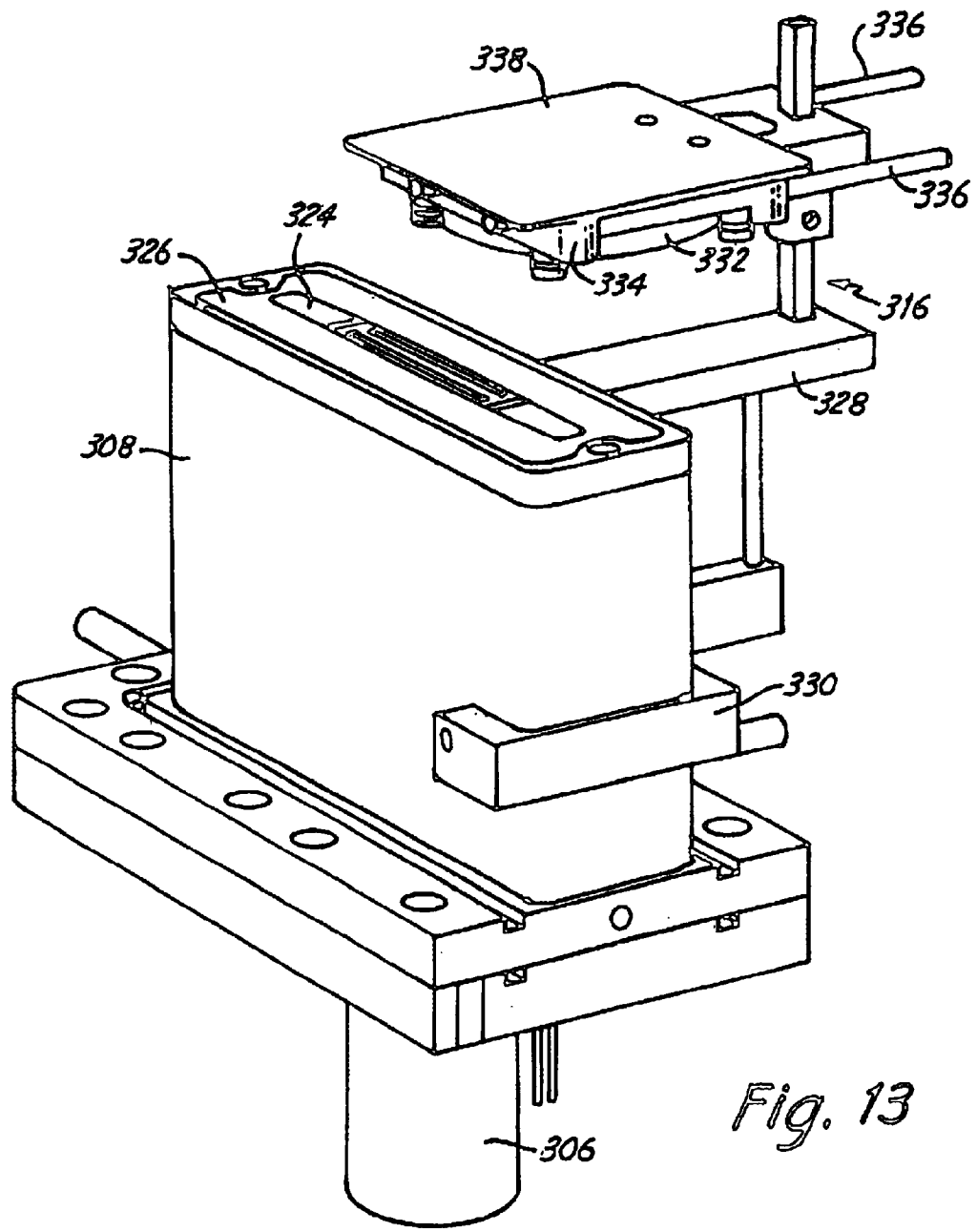
FIG. 13 is an expanded view of the substrate support of the reaction chamber of FIG. 12.

A particular embodiment of a light reactive deposition apparatus is shown in FIGS. 11–13. Referring to FIG. 11, process chamber 300 comprises a light tube 302 connected to a $CO_2$ laser (not shown) and a light tube 304 connected to a beam dump (not shown). An inlet tube 306 connects with a precursor delivery system that delivers vapor reactants and carrier gases. Inlet tube 306 leads to process nozzle 308. An exhaust tube 310 connects to process chamber 300 along the flow direction from process nozzle 308. Exhaust tube 310 leads to a particle filtration chamber 312. Particle filtration chamber 312 connects to a pump at pump connector 314.

An expanded view of process chamber 300 is shown in FIG. 12. A wafer carrier 316 supports a wafer above process nozzle 308. Wafer carrier 316 is connected with an arm 318, which translates the wafer carrier to move the wafer through the particle stream emanating from the reaction zone where the laser beam intersects the precursor stream from process nozzle 308. Arm 318 comprises a linear translator that is shielded with a tube. A laser entry port 320 is used to direct a laser beam between process nozzle 308 and the wafer. Unobstructed flow from process nozzle would proceed directly to exhaust nozzle 322, which leads to particle transport tube 310.

An expanded view of wafer carrier 316 and process nozzle 308 is shown in FIG. 13. The end of process nozzle 308 has an opening for precursor delivery 324 and a shielding gas opening 326 around precursor opening to confine the spread of precursor and product particles. Wafer carrier 316 comprises a support 328 that connects to process nozzle 308 with a bracket 330. A circular wafer 332 is held in a mount 334 such that wafer 332 slides within mount 334 along tracks 336 to move wafer 332 into the flow from the reaction zone. Backside shield 338 prevents uncontrolled deposition of particles on the back of wafer 332. Tracks 336 connect to arm 318.

The temperature of the substrate during the deposition process can be adjusted to achieve particular objectives. For example, the substrate can be cooled during the deposition process since a relatively cool substrate can attract the particles to its surface. However, in some embodiments, the substrate is heated, for example to about 500° C., during the deposition process. Particles stick better to a heated substrate. In addition, the particles tend to compact and fuse on a heated substrate such that a subsequent consolidation of the coating into a fused glass or other material is facilitated if the coating were formed initially on a heated substrate.

The formation of coatings by light reactive deposition, silicon glass deposition and optical devices in general are described further in copending and commonly assigned U.S. patent application Ser. No. 09/715,935 to Bi et at, entitled "Coating Formation By Reactive Deposition," incorporated herein by reference, and in copending and commonly assigned PCT application designating the U.S. Ser. No. PCT/US01/32413 to Bi at al. filed on Oct. 16, 2001, entitled "Coating Formation By Reactive Deposition," incorporated herein by reference.

For the production of discrete optical devices or other structures on a substrate surface formed by the coating process, the deposition process can be designed to only coat a portion of the substrate and/or to deposit different compositions at different locations within a layer. For example, masking can be used during the coating process to limit the coating to a selected portion of the substrate, and/or reactant composition or reaction properties can be adjusted to vary the composition of the coating at selected locations along the substrate as the substrate is moved through the product stream. For example, through the control of product particle composition as a function of time, the deposition of stripes or a grid of material can be used to construct corresponding devices that can take advantage of the variation in composition. Similarly, layers with a gradient in composition can be generated. Thus, the deposition process itself can be manipulated to produce specific structures. Alternatively, various patterning approaches can be used following the deposition, as described further below.

Formation of desired patterns can comprise rotation of the substrate to change the orientation of the substrate relative to the product particle stream. Rotation of the substrate by 180 degree can be used to decrease the horizontal translation path by approximately one half. Rotations by 90 degrees can be used to form desired patterns on the substrate and in particular a tapered composition profile. Rotation can be performed with a rotating substrate holder within the coating apparatus. Incremental rotations can be used to form a radiating pattern from the center of the substrate, for example for the formation of a radiating array of waveguides connected to a source at the center. Rotation of the substrate can be combined with the use of a discrete mask to form the waveguides with appropriate dimensions. Through the use of a discrete mask while rotating the substrate, the coating can be formed such that it is not formed thicker at the rotation center. A light source, such as a laser or a turning element that reflects light into the plane from above or below, can be used to direct light into the radiating array of waveguides. Rotation can also be used to form curved optical elements, such as a curved waveguide or curved amplifier, to reduce the extent of the device across the plane. Such a waveguide array and curved amplifier is described further below.

During the deposition of a particle layer, the composition of the reactant stream can be varied at selected times to alter the chemical composition of the particles. In particular, the variation in dopant compositions and/or concentrations can be performed without significant modification of the nature of the reactant flow. For either vapor or aerosol dopant precursors, the dopant concentrations in the reactant stream can be adjusted without significantly changing the total flow or other reaction properties, for example, by compensating with other inert components if necessary. In addition, product particle composition can be sensitive to reaction conditions, such as pressure, diluent gas concentration, radiation absorbing gas concentration, radiation intensity and flow rate. The reaction conditions can be reproducibly controlled to select desired product particle composition as a function of time during the deposition process. Variation in the product particle composition as a function of time corresponds with spatial variation on the substrate surface with varying composition if the substrate is moved relative to the product particle stream during the deposition process.

Figure 14:
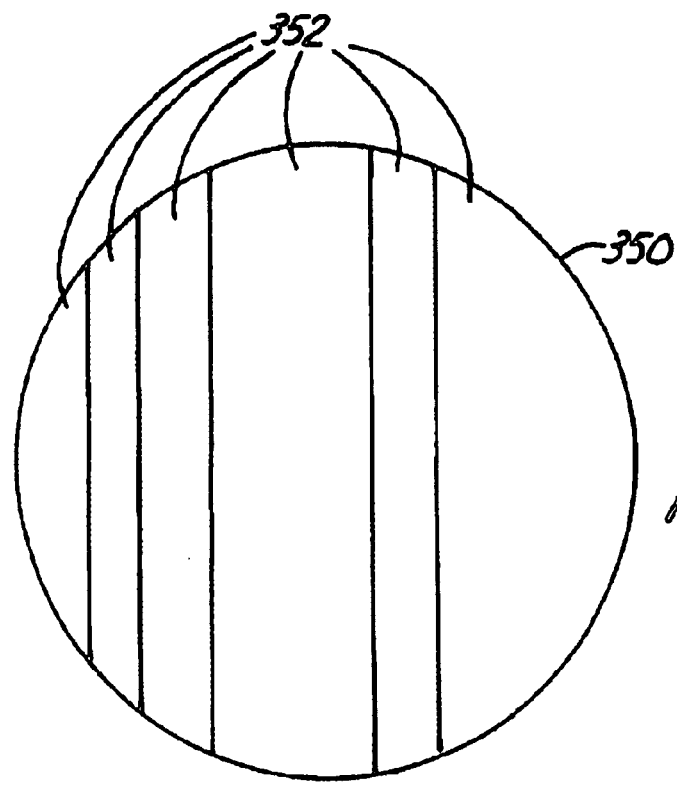
FIG. 14 is a top view of a substrate with a coating with composition variation localized within stripes.

If the reactant inlet nozzle is selected to have a dimension such that the nozzle produces a product stream that coats simultaneously a linear dimension of the substrate, variation in composition in the reactant stream or reaction conditions can result in deposited particles with composition variation in stripes on the substrate. Referring to FIG. 14, an example is shown with a circular substrate 350 with six stripes 352 of varying composition. The size and number of stripes is selected by the timing of the composition change of the product particles in the flow. In principle, a particular stripe can be made as thin as desired if the reaction parameters, such as reactant composition adjusted with mass flow controllers controlling the feed to the inlet nozzle, are changed appropriately rapidly, and the rate of substrate motion through the product particle stream can also be selected in conjunction with the change in reaction parameters to obtain the desired stripe size. The selection of stripe location, size and composition is guided by the intended use of the coating with respect to device formation and the like.

Figure 15:
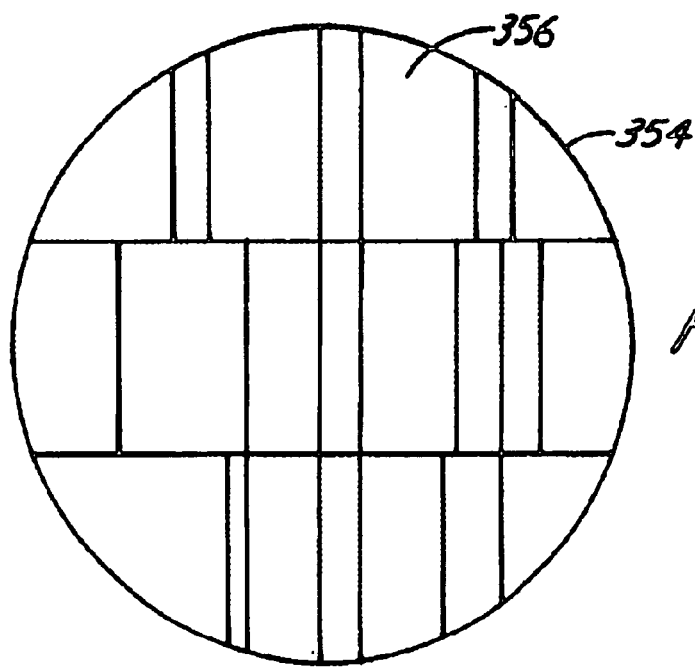
FIG. 15 is a top view of a substrate with a coating with composition variation in a grid.

If the elongated dimension of the reactant inlet nozzle is smaller than the linear dimension of the substrate, a grid of composition variation can be applied to the substrate surface by an appropriate number of sweeps of the substrate to through the product particle stream with an appropriate displacement of the substrate between sweeps. Referring to FIG. 15, substrate 354 is coated with a grid 356 of varying compositions of particles formed by three sweeps of the substrate through the product particle stream.

Figure 16:
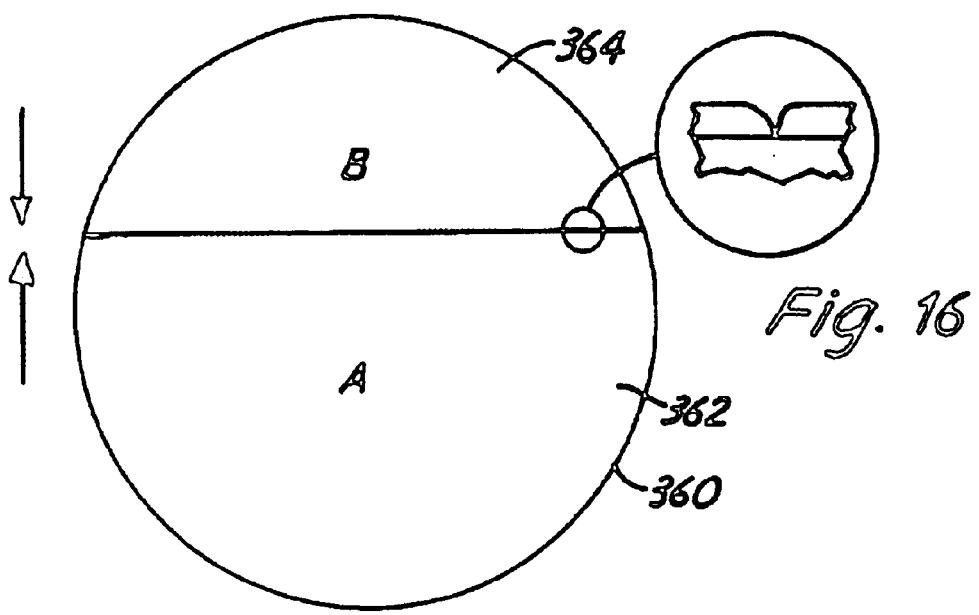
FIG. 16 is a top view of a substrate coated from opposite edges of the substrate with compositions A and B with the insert showing an expanded view of the edge at which the two positions meet.

It may be desirable, especially with significant compositional changes to the product stream, to terminate deposition between production of the different composition such that the product stream with the new composition can stabilize prior to initiating the deposition of the new composition. Thus, there is a short period of time during which no deposition takes place as the product stream stabilizes. Deposition can be stopped during the composition change by moving the substrate away from the product stream or by using a shutter. Movement of the substrate away from the product flow is effective if the substrate is coated with two compositions along a particular diameter. Referring to FIG. 16, a substrate 360 is shown with two compositions A and B deposited over two sections 362, 364, respectively, of substrate 360. Each composition is deposed from an edge as indicated by the arrows such that the separate compositions are deposited during movement of the substrate in different directions. An expanded sectional view of the edge at which the two compositions join is shown in the insert with a very small gap between the two compositions.

Figure 17:
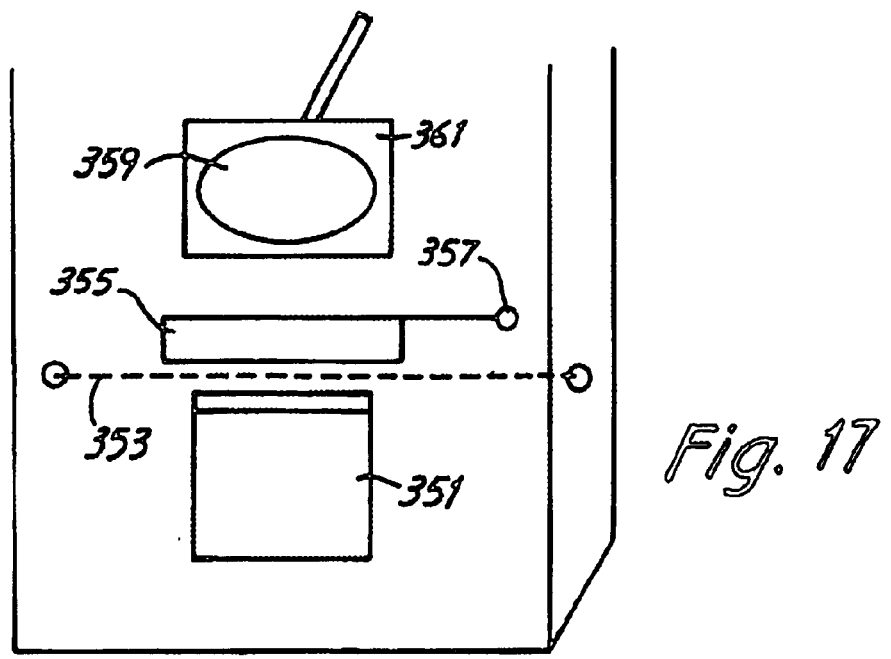
FIG. 17 is a perspective view of a reaction chamber with a shutter to control the flow from the reaction zone to the substrate wherein the walls of the reaction chamber are shown as transparent to expose the components within the chamber.

A shutter can be used to form more elaborate patterning as shown in FIGS. 14 and 15 while still providing a period of time with no deposition for the product stream to stabilize. The shutter blocks and/or deflects the product particle stream. Referring to FIG. 17, reactant nozzle 351 directs a reactant stream toward a radiation beam path 353, which intersect at or near a reaction zone. Shutter 355 is connected to pivot 357. Shutter 355 can be placed to block product flow the reaction zone or it can be rotated away such that the product flow can continue it path to the substrate 359. Pivot is connected to an appropriate motor that can rapidly move the shutter to its desired position. Substrate 359 is mounted on stage/conveyor 361 that positions and/or sweeps substrate 359 appropriately.

Striped patterns with different compositions, such as those shown in FIGS. 14 and 15, can be formed with a plurality of aligned reactant nozzles. Two, three or more nozzles can be aligned. Each nozzle directs reactants to a separate reaction zone. The reactant precursors can be vapor/gas, aerosol or combinations thereof By directly different reactant stream compositions or using different reaction conditions, such as radiation intensity, product streams with different product compositions can flow from the different reactant stream. The alignment of the nozzles can be set to deposit adjacent stripes on the substrate. In some embodiments, the nozzles are angled such that the reaction zones are spaced far enough apart that the reactions are isolated from each other, but the product streams are directed to close adjacent stripes on the substrate surface.

In other embodiments, the nozzles are adjacent each other and may or may not have shielding gas between the two reactant flows. Some mixing of the precursors can result in the deposition of an overlap region with a gradient in composition intermediate between the compositions of the separate stripes. It may be desirable to have an intermediate gradient composition to produce a gradient in optical properties, assuming that the compositions are compatible. The width of the transition region can be controlled generally by the flow conditions and the nozzle design. In other embodiments, the transition region in composition may be undesirable. The composition transition region can be eliminated using shielding gas to isolate the reactions or removed following deposition by etching. More than two nozzles can be similarly aligned.

Figure 18A:
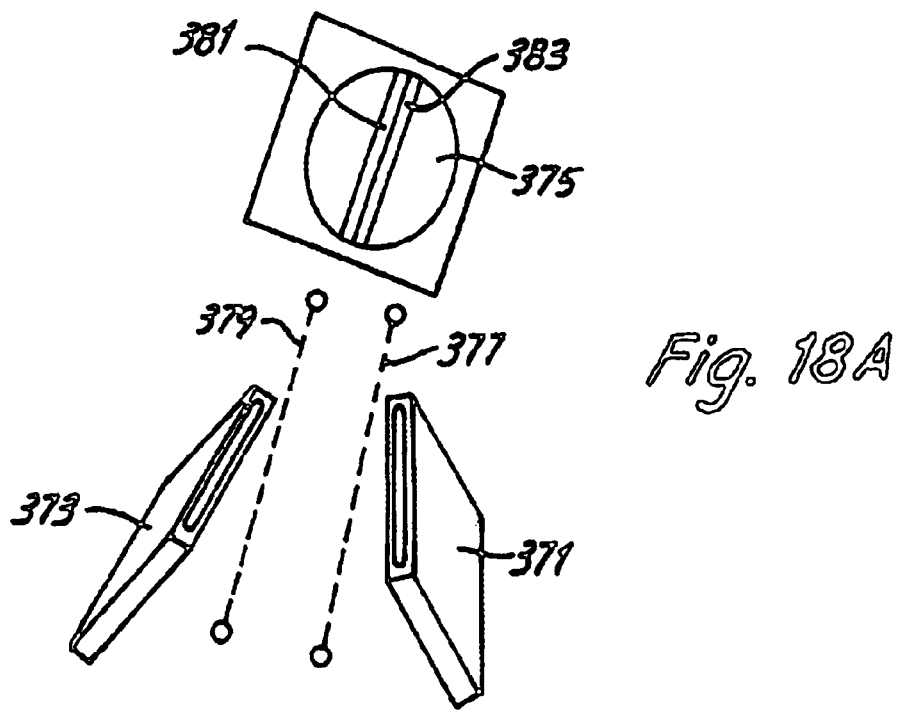
FIG. 18A is a perspective view of the interior of a deposition chamber with two angled reactant nozzles directed to two independent reaction zones to form two stripes on the substrate, with the substrate being depicted as transparent such that the coatings can be observed.

Referring to FIG. 18A, two nozzles 371, 373 are shown that are oriented at an angle relative to each other and the substrate 375. Flow from nozzles 371, 373 intercept radiation beam paths 377, 379, respectively. Each nozzle is supplied with a separate precursor composition. Nozzles 371, 373 each comprise a reactant opening surrounded by a shielding gas opening. Nozzles 371, 373 are oriented to produce adjacent stripes 381, 383 on substrate 375. In other embodiments, the reactor can comprise more than two nozzles oriented to produce adjacent stripes. Embodiments with multiple nozzles can be particularly effective in combination with a shutter, as shown in FIG. 17. For example, following the deposition of stripes, the shutter can be closed and the substrate moved in preparation for the deposition of additional stripes from flow from one or all the nozzles. Once the substrate is repositioned, the shutter can be opened to deposit the subsequent stripes. The process can be repeated to apply as many stripes or sets of stripes as appropriate. More nozzles can be added to produce more than two stripes at a time.

Figure 18B:
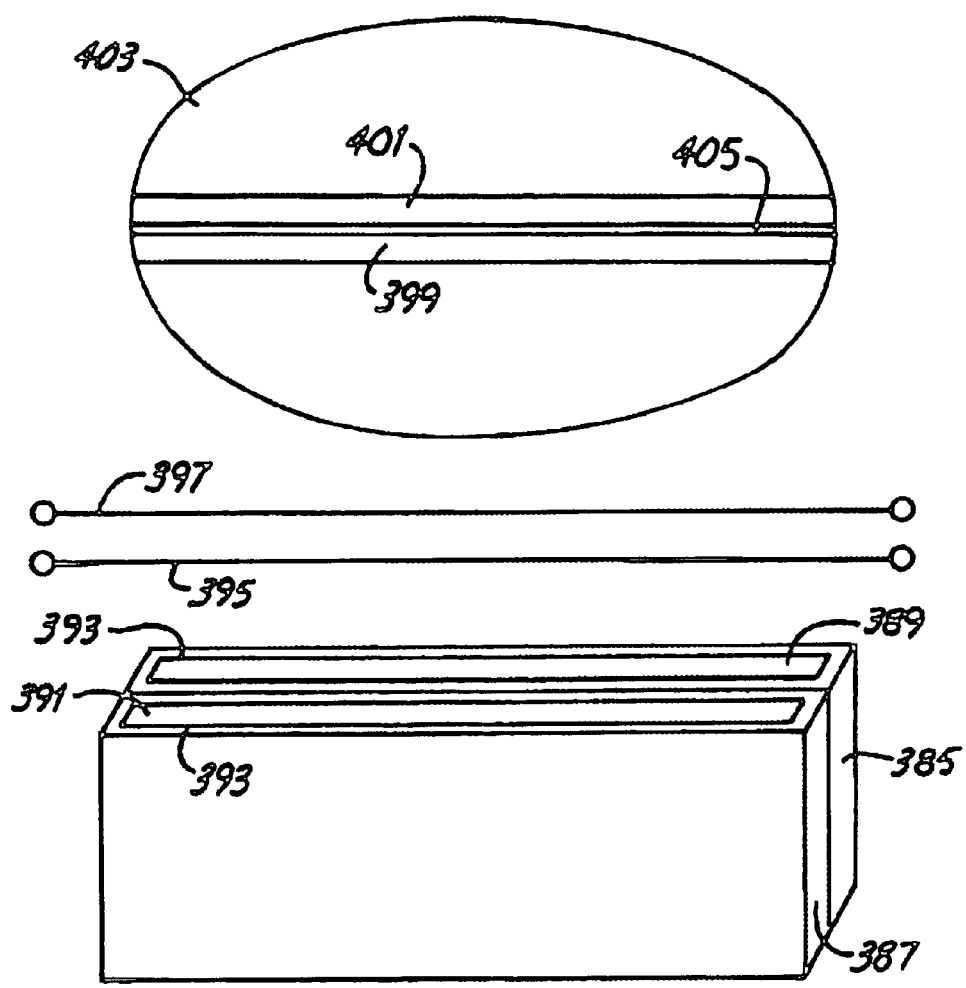
FIG. 18B is a perspective view of the interior of a deposition chamber with two adjacent reactant nozzles directed to two independent reaction zones to form two stripes on the substrate, with the substrate being depicted as transparent such that the coatings can be observed.

An embodiment with multiple aligned nozzles is shown in FIG. 18B. Nozzles 385, 387 provide reactant delivery openings 389, 391, which can be similarly assembled into a single nozzle structure. Each reactant delivery opening is supplied with an independent reactant precursor composition. The distance between the reactant openings and the flow conditions can be set to yield a desired configuration of the product flow striking the substrate. Shielding gas openings 393 are placed about the reactant delivery openings, and may or may not be located between the reactant delivery openings. Reactant delivery openings direct flow to radiation beam paths 395, 397 to form reaction zones overlapping with the intersection of the flows with the radiation beam paths. A single radiation beam path can be used if the radiation beam has an appropriate width. Product powders/particles form stripe coatings 399, 401 on substrate 403. A transition band 405 is formed with a composition blend of the compositions in stripes 399, 401. The dimensions of the transition band 405 can be manipulated as described above. Additional adjacent nozzles/reactant delivery openings can be used to form additional composition stripes with simultaneous deposition. In principle, an entire substrate can be patterned with sufficient nozzles aligned adjacent each other.

The well-defined reactant stream as a sheet of flow leading into the reaction zone tends to spread after the reaction zone due to heat from the reaction. If the substrate is swept through the reaction zone near the reaction zone, the spreading of the flow may not be significant. In some embodiments, it may be desirable to sweep the substrate through the flow farther away from the reaction zone such that the flow has spread significantly and the entire substrate or desired portion thereof can be coated simultaneously without moving the substrate. The appropriate distance to obtain a uniform coating of particles depends on the substrate size and the reaction conditions. A typical distance of about 15 centimeters would be suitable for a wafer with a 4 inch diameter. Then, when the composition of the product particle flow is changed in time during the deposition process, the composition of the particles changes through the thickness of the coating. If the composition is changed continuously, a continuous composition gradient through the layer results. For optical materials, generally a continuous composition gradient layer having a continuous composition change from a first composition to a second composition has a thickness of no more than about 300 microns, in other embodiments no more than about 150 microns, in further embodiments, in the range(s) from about 500 nm to about 100 microns and in still other embodiments in the range(s) from about 1 micron to about 50 microns. A person of ordinary skill in the art will recognize that other range(s) within the explicit ranges are contemplated and are within the present disclosure.

Alternatively, the composition can be changed incrementally or discretely to produce layers with varying composition, which can involve a gradual change in composition between two compositions or discrete layers with discrete composition differences. The resulting transition material has a step-wise change in composition from a first composition to a second composition. Generally, the first composition and second composition are the compositions of the adjacent layers such that the transition material provides a gradual transition in composition between the two adjacent layers. While an optical transition material can have two layers, the transition material generally has at least three layers, in other embodiments at least 4 layers and in further embodiments in the range(s) from 5 layers to 100 layers. A person of ordinary skill in the art will recognize that additional range(s) within these specific ranges are contemplated and are within the present disclosure. The total thickness generally is similar to the continuous gradient layers described in the previous paragraph. Each layer within the step-wise transition material generally has a thickness less than about 100 microns, in other embodiments less than about 25 microns, in further embodiments in the range(s) from about 500 nm to about 20 microns and in additional embodiments in the range(s) from about 1 micron to about 10 microns. The layers within the step-wise transition material may or may not have approximately equal thickness. Similarly, the step-wise change in composition may or may not take equivalent steps between layers of the transition material.

An alternative approach to patterning a layer during deposition involves the use of a mask. Surface masks can be deposited and patterned by photolithography and the like based on approaches, comprising for example well-known processes, developed for the electronics industry. In traditional electronics applications, photolithography involves the application of a mask that is chemically or physically bonded to the surface. Chemical bonding implies in a broad sense atomic level associations which may or may not involve covalent bonds, ionic bonds, metal-ligand bonds, hydrogen bonds, van der Waals interactions and the like that provide an intimate association between the mask and the substrate such that the mask does not have an independent structure separate from the substrate. The mask is applied and removed by chemical and/or physical processes that assemble and disassemble the mask constituents.

While these surface masks can be used for the particle deposition approaches described herein, discrete masks provide potentially significant processing improvements. In particular, discrete masks may lead to dramatic improvements in processing efficiency since the discrete masks can be applied quickly without the need for a series of complex processing steps and potentially can be reused. The discrete masks, in contrast with the surface masks, have a separate structure independent from the surface. The masks preferably have a flat surface, such that they can be applied in close contact with the surface to be coated. The composition of the surface of the mask should be selected such that the discrete mask can be subsequently removed from the substrate without damaging either the mask or the coated surface. For example, the mask can have a polymer surface, a metal surface or a ceramic surface. Some polymers have clinging properties that might bind too strongly due to surface properties of the polymers. However, other polymers, such as polytetrafluoroethylene and the like, have non-stick properties. Ceramic and metal discrete masks are suitable since they are very inert yet can be formed with very flat surfaces through polishing.

The masks can be cut from a sheet of material, for example using a laser. A laser can be used to make precise cuts in the material. The laser can be precision guided with robotic control to perform the cuts or the laser can be used in combination with a surface mask or other discrete mask that blocks the laser except at desired locations. Generally, sections of the sheet of material are removed to form openings. The openings can correspond to locations at which the particles will be deposited. The discrete masks can have one or more openings with sizes and shapes selected from any reasonable shape to achieve desired deposition based on the intended use of the coating. Examples of geometric shapes comprise rectangles, curved areas, "Y" shapes, various more complex shapes and the like. The perimeter of the mask may or may not correspond to the perimeter of the corresponding substrate. As an example, referring to FIG. 19, a rectangular discrete mask 366 is shown for a circular substrate 368, the outline of which is shown in phantom lines. Discrete mask 366 comprises openings 370, 372.

A particular mask with a desired pattern can be moved to coat selected sections of the substrate with the desired pattern. The mask can be mounted on an appropriate translator. The mask can be formed with precisely placed markings and/or mirrors for the precise alignment of the mask using reflective light beams and detectors such that precise alignment between different masks can be obtained. The mask can be moved a desired number of times to coat a layer or portion of a layer with a plurality of locations with the desired pattern. The product particle composition may or may not be changed between the different locations.

Figure 19:
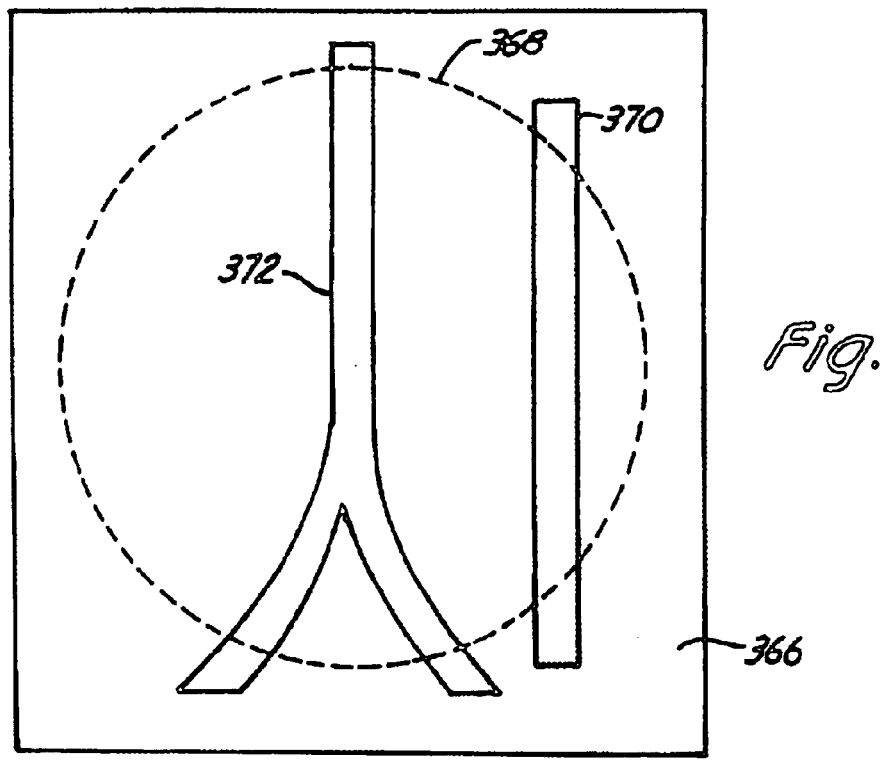
FIG. 19 is a top view of a discrete mask with two openings with the outline of a substrate shown in phantom lines.
Figure 20:
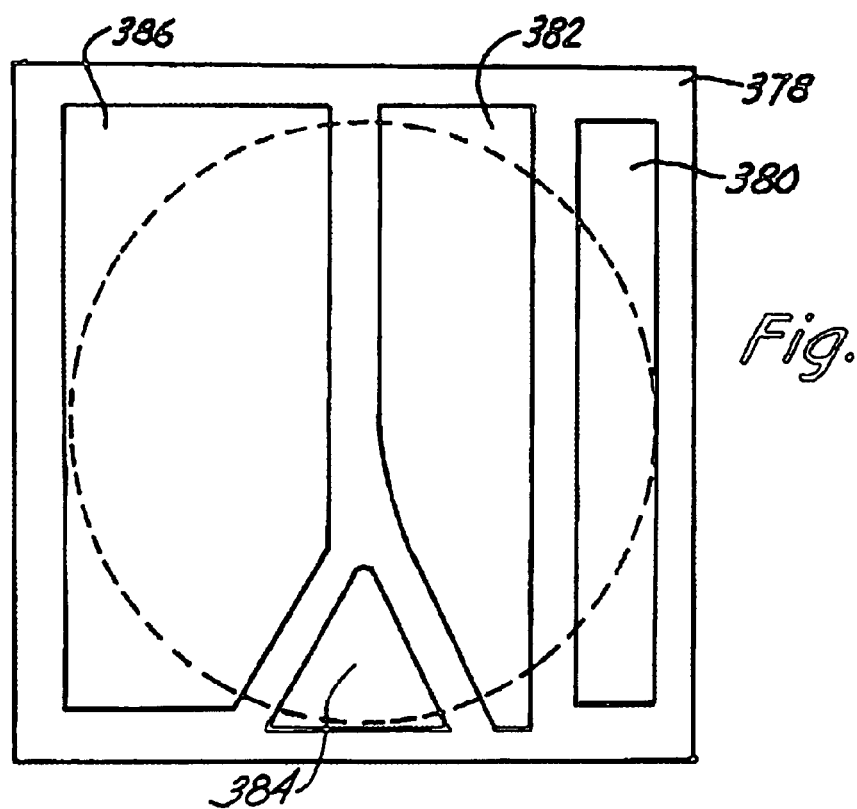
FIG. 20 is a top view of a discrete mask complementary with the discrete mask of FIG. 19.
Figure 21:
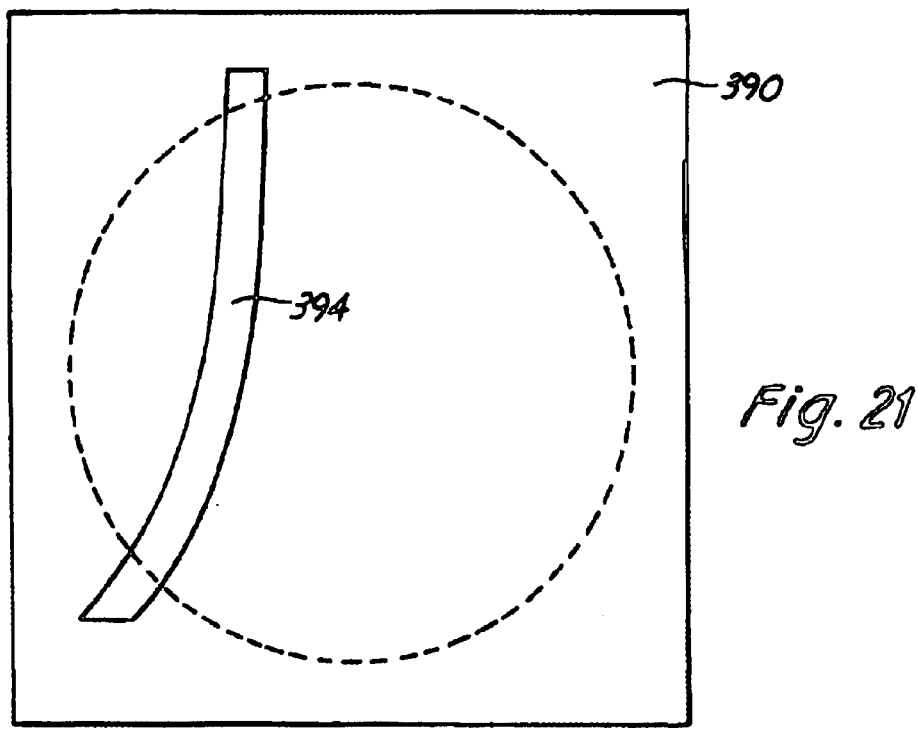
FIG. 21 is a top view of a discrete mask with one opening that is partly complementary with the discrete mask of FIG. 19.
Figure 22:
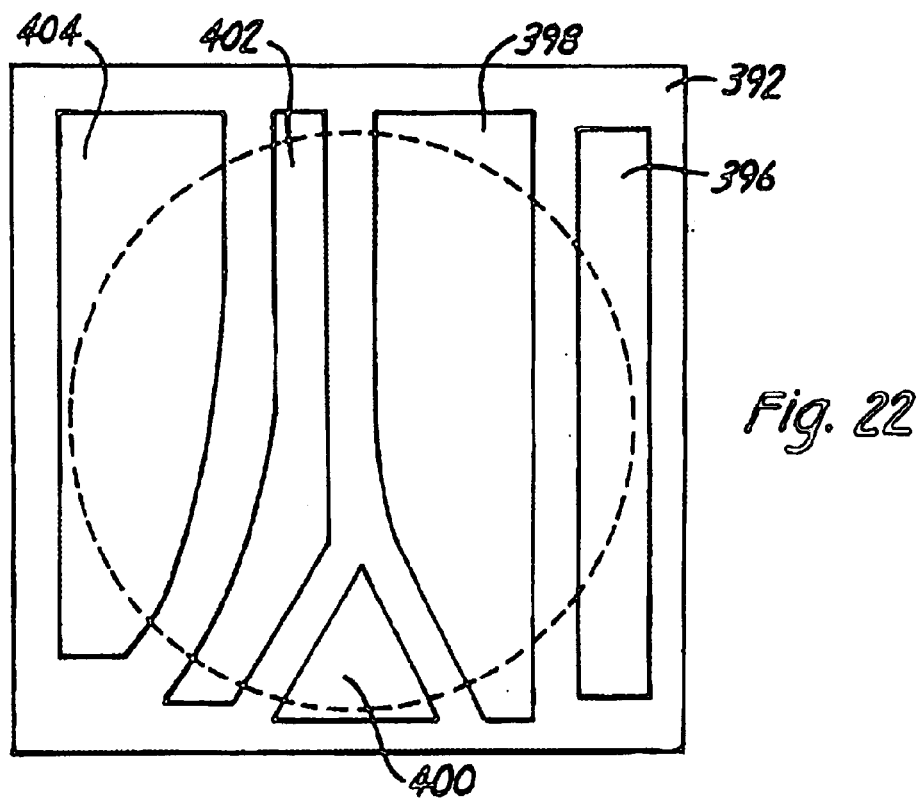
FIG. 22 is a top view of a discrete mask that together with the discrete mask of FIG. 21 is complementary with the discrete mask of FIG. 19.

Alternatively or additionally, it can be useful to use a plurality of masks for the deposition of a single layer. Generally, the two or more masks are complementary in the sense that when aligned with the corresponding substrate, the openings of the masks do not overlap significantly over the substrate. A discrete mask complementary to the discrete mask of FIG. 19 is shown in FIG. 20. Complementary mask 378 comprises four openings 380, 382, 384, 386. Rather than using a single complementary mask as shown in FIG. 20, more than one complementary mask can be used. Referring to FIGS. 21 and 22, together discrete masks 390, 392 are complementary to discrete mask 366 of FIG. 19. However, discrete mask 390 comprises a single opening 394, while discrete mask 392 comprises five openings 396, 398, 400, 402, 404. Using discrete masks 366, 390 and 396 sequentially, three different compositions can easily be deposited along selected location of the substrate. Complementary masks can be produced from a first mask for example using photolithography in which photoresist can be patterned using the first mask and the photoresist protects the appropriate portions of the material during the cutting of the complementary sections. Physical masks can also be stacked during a single deposition process such that only common open areas in the two masks are open to deposition on the surface. By stacking masks more patterns may be available without cutting an additional mask.

Figure 23:
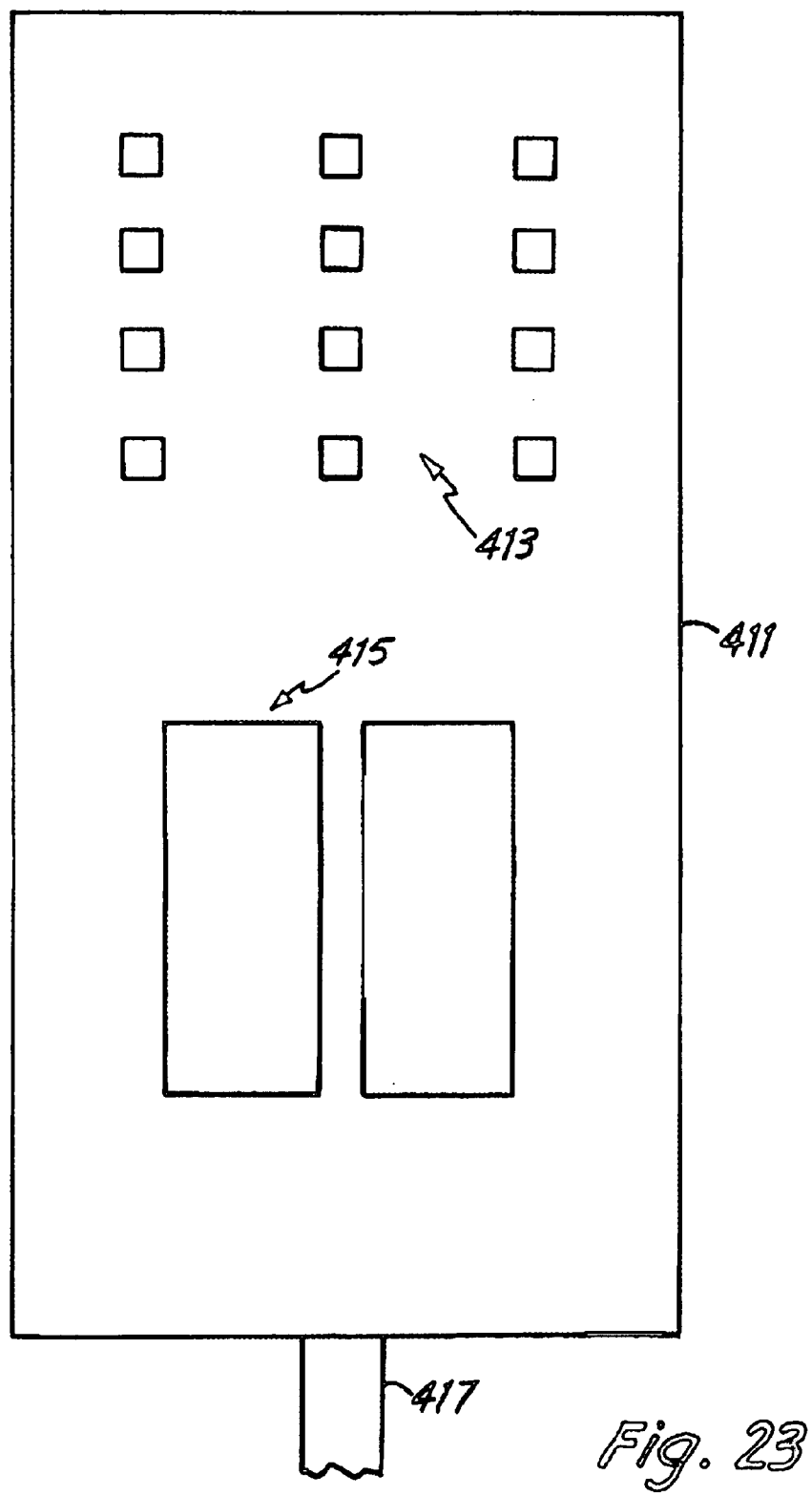
FIG. 23 is a top view of a mask with two separate patterns.

Similarly, a single mask can comprise a plurality of patterns in which the mask is large enough such that a fraction of the mask covers the substrate. In these embodiments, the mask is translated to position the selected portion of the mask over the substrate. An example is shown in FIG. 23. Mask 411 comprises a first pattern 413 and a second pattern 415. Mask 411 is connected to a translator at arm 417. Each of pattern 413, 415 can be separately positioned over the substrate to deposit particles with the particular pattern. Similarly, masks with greater than two distinct patterns can be used. Using a plurality of complementary masks, a single layer can be contoured in complex ways with different compositions placed at different locations on the mask.

To apply partial coatings using the discrete masks, such as the discrete masks in FIGS. 19–22, the mask is placed adjacent the substrate and the combined unit can be swept through a product particle sheet to coat the substrate through the openings of the mask. One or more sweeps of the unit through the product particle stream can be performed prior to removal of the discrete mask, for example by pulling outwardly on the mask relative to the substrate. Once a particular mask is removed another mask can be put into place for subsequent coatings. Alternatively or additionally, the discrete mask can be moved from one position relative to the substrate to another such that a different portion of the substrate is coated when the product particles are directed to the mask. If the discrete mask and substrate unit is placed farther from the reaction zone such that a uniform cloud of product particles reaches the unit, the substrate can be coated through the openings simultaneously without moving the unit relative to the product stream.

The various approaches involving discrete masks can be combined to form desired patterns. For example, a first mask can be used one or more times to deposit a selected pattern after completing the use of the first mask, then another discrete mask complementary to the pattern formed by the multiple depositions through the first mask can be further used to deposit a complementary pattern. This can be repeated appropriately by moving the second mask for subsequent locations and/or through the use of one or more additional complementary masks to complete a desired patterning of the substrate. In this way, various patterns of individual masks can be stitched together to form a desired pattern in an overall approach that provides considerable flexibility.

Various approaches can be used for the alignment of the masks. For example, stepper motors can be used to alignment of the masks along the x-y-z axes. Pins can be used to align complementary masks along the same coordinates. Various alignment approaches can be borrowed from photolithography in which photo masks are aligned for shining light to pattern photoresist. Semiconductor wafer steppers controlled by position-sensing laser interferometers can overlay features on substrates to within 1–2 nm. These steppers can be adapted for discrete mask alignment.

With all of these patterning approaches during deposition, the amount and size of particles deposited at each location can be approximately the same such that a smooth layer is formed even though it is patterned. However, in some embodiments, the mass of particles per unit area at each location is kept approximately constant such that the densified optical material will be approximately smooth. If the materials consolidate, i.e., densify, differently, some adjustment in the particle thickness and/or mass per unit area can be made to form a smooth surface following consolidation. In general, significantly smoother patterned coatings can be formed by deposition using complementary masks than can be formed by etching followed by deposition of an entire cover layer. Thus, if a multilayered monolithic structure with a plurality of patterned layers is to be formed, it is desirable to form the multilayered structure using patterning during the deposition process rather than pattering following deposition to produce smoother, more uniform stacking of layers. In some embodiments, by varying the amount of reaction precursors, the thickness of the consolidated material can be varied at different physical locations to produce a certain thickness that may be different than adjacent material thickness. Thus, at one fixed thickness in the z-direction, the structure can have different compositions in different heights at different heights at the location. Such variation in thickness can be useful, for example, in the production of optical tapers.

Compositions and Properties of Particles and Coatings

A variety of particles can be produced by laser pyrolysis/light reactive deposition. Adaptation of laser pyrolysis for the performance of light reactive deposition can be used to produce coatings of comparable compositions as the particles with selected compositions that can be produced by laser pyrolysis. Powders of particular interest comprise, for example, silicon particles, metal particles, and metal/metalloid compounds, such as, metal/metalloid oxides, metal/metalloid carbides, metal/metalloid nitrides, and metal/metalloid sulfides. For optical materials, some materials of particular interest comprise, for example, silicon oxide (silica), phosphate glasses, InP, lithium niobate, telluride glasses, aluminum oxide, and titanium oxide. The particles can be doped to alter the optical, chemical and/or physical properties of the particles. Generally, the powders comprise fine or ultrafine particles with particle sizes in the submicron or nanometer range. The particles may or may not partly fuse or sinter during the deposition.

Light reactive deposition is particularly suitable for the formation of highly uniform particles, especially nanoscale particles. In particular, light reactive deposition can produce a collection of particles of interest generally with an average diameter for the primary particles of less than about 500 nm, alternatively in the range(s) from about 3 nm to about 100 nm, similarly in the range(s) from about 3 nm to about 75 nm, and also in the range(s) from about 3 nm to about 50 nm. Persons of ordinary skill in the art will recognize that other ranges and subranges within these specific ranges are contemplated and are covered by the present disclosure.

Light reactive deposition, as described above, generally results in primary particles having a very narrow range of particle diameters. With aerosol delivery of reactants for light reactive deposition, the distribution of particle diameters can be particularly sensitive to the reaction conditions. Nevertheless, if the reaction conditions are properly controlled, a very narrow distribution of particle diameters can be obtained with an aerosol delivery system. However, with aerosol and/or vapor reactants broader distributions of primary particles sizes can also be obtained, if desired, by controlling the flow rates, reactant densities and residence times in light reactive deposition or using other flowing reaction systems.

In embodiments with highly uniform particles, effectively no primary particles have an average diameter greater than about 4 times the average diameter and in other embodiments 3 times the average diameter, and in further embodiments 2 times the average diameter. In other words, the particle size distribution effectively does not have a tail indicative of a small number of particles with significantly larger sizes. An effective cut off in the tail of the size distribution indicates that there are less than about 1 particle in $10^6$ have a diameter greater than a specified cut off value above the average diameter. Narrow size distributions, lack of a tail in the distributions and a roughly spherical morphology can be advantageous for obtaining highly uniform coatings and for highly uniform sintering.

Small particle size, spherical morphology and particle uniformity can contribute overall to the uniformity of the resulting coating, for example, with respect to composition as well as the smoothness of the surface and interfaces between materials. In particular, the lack of particles significantly larger than the average, i.e., the lack of a tail in the particle size distribution, leads to a more uniform coating. In addition, the particles can have a very high purity level.

Light reactive deposition can be performed with gas/vapor phase reactants. Many metal/metalloid precursor compounds can be delivered into the reaction chamber as a vapor. Metalloids are elements that exhibit chemical properties intermediate between or inclusive of metals and nonmetals. Metalloid elements comprise, for example, silicon, boron, arsenic, antimony, and tellurium. Appropriate metal/metalloid precursor compounds for gaseous delivery generally comprise metal compounds with reasonable vapor pressures, i.e., vapor pressures sufficient to get desired amounts of precursor gas/vapor into the reactant stream. The vessel holding liquid or solid precursor compounds can be heated to increase the vapor pressure of the metal precursor, if desired. Solid precursors generally are heated to produce a sufficient vapor pressure by sublimation or by melting the solid into a liquid.

A carrier gas can be bubbled through a liquid precursor to facilitate delivery of a desired amount of precursor vapor. Similarly, a carrier gas can be passed over the solid precursor to facilitate delivery of the precursor vapor. In other embodiments, the carrier gas is mixed with the precursor vapor before delivery into the reaction zone. As an example of suitable precursors for optical material formation, representative silicon precursors for vapor delivery comprise, for example, silicon tetrachloride ($SiCl_4$), trichlorosilane ($Cl_3HSi$), trichloromethyl silane $CH_3SiCl_3$, tetramethoxysilane ($Si(OCH_3)_4$) and tetraethoxysilane ($Si(OC_2H_5)_4$, also known as ethyl silane and tetraethyl silane).

Suitable dopants for silicon oxide materials comprise, for example, boron, germanium, phosphorous, titanium, zinc and aluminum. Suitable boron precursors for gas/vapor delivery comprise, for example, boron trichloride ($BCl_3$), diborane ($B_2H_6$), tetraethoxyboride and $BH_3$. Suitable phosphorous precursors for gas/vapor delivery comprise, for example, phosphine ($PH_3$), tetraethoxyphosphide, phosphorus trichloride ($PCl_3$), phosphorus oxychloride ($POCl_3$) and $P(OCH_3)_3$. Suitable germanium precursors for gas/vapor delivery comprise, for example, tetraethoxygermanate, $GeCl_4$. Suitable titanium precursors for gas/vapor delivery comprise, for example, titanium tetrachloride ($TiCl_4$), and titanium isopropoxide ($Ti[OCH(CH_3)_2]_4$). Suitable liquid zinc precursor compounds for gas/vapor delivery comprise, for example, diethyl zinc ($Zn(C_2H_5)_2$) and dimethyl zinc ($Zn(CH_3)_2$). Suitable solid, zinc precursors with sufficient vapor pressure of vapor delivery comprise, for example, zinc chloride ($ZnCl_2$). Suitable liquid, aluminum precursors for gas/vapor delivery comprise, for example, aluminum s-butoxide ($Al(OC_4H_9)_3$). A number of suitable solid, aluminum precursor compounds are available comprising, for example, aluminum chloride ($AlCl_3$), aluminum ethoxide ($Al(OC_2H_5)_3$), and aluminum isopropoxide ($Al[OCH(CH_3)_2]_3$). Precursors for other dopants and host materials can be similarly selected based on analogy with these specific precursors.

The use of exclusively gas phase reactants is somewhat limiting with respect to the types of precursor compounds that can be used conveniently. Thus, techniques can be used to introduce aerosols containing reactant precursors to the reaction zone. Suitable aerosol delivery apparatuses adapted for performing light reactive deposition are described above.

Using aerosol delivery apparatuses, solid precursor compounds can be delivered by dissolving the compounds in a solvent. Alternatively, powdered precursor compounds can be dispersed in a liquid/dispersant for aerosol delivery. Liquid precursor compounds can be delivered as an aerosol from a neat liquid, a multiple liquid dispersion or a liquid solution. A solvent/dispersant can be selected to achieve desired properties of the resulting solution/dispersion. While a particular solvent/dispersant can be selected based on the precursors and other reaction parameters, suitable solvents/dispersants generally comprise water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser absorbing compound may be needed within the reactant stream if a $CO_2$ laser is used as a light source.

If aerosol precursors are used, the liquid solvent/dispersant can be rapidly evaporated by the light beam in the reaction chamber such that a gas phase reaction can take place. Thus, the fundamental features of the laser pyrolysis/light reactive deposition reaction may be unchanged by the presence of an aerosol. Nevertheless, the reaction conditions can be affected by the presence of the aerosol.

A number of suitable solid, metal precursor compounds can be delivered as an aerosol from solution. As an example of suitable aerosol precursors for optical materials, suitable silicon precursors for aerosol production comprise, for example, silicon tetrachloride $Si(Cl_4)$, which is soluble in ether, and trichlorosilane ($Cl_3HSi$), which is soluble in carbon tetrachloride. Suitable silicon oxide dopants also can be delivered in an aerosol. For example, zinc chloride ($ZnCl_2$) and zinc nitrate ($Zn(NO_3)_2$) are soluble in water and some organic solvents, such as isopropyl alcohol. Similarly, a boron dopant can be delivered as an aerosol using ammonium borate ($(NH_4)_2B_4O_7$), which is soluble in water and various organic solvents. Precursors for other dopants and host materials can be similarly selected based on analogy with these specific precursors.

The precursor compounds for aerosol delivery can be dissolved in a solution generally with a concentration greater than about 0.1 molar. For a particular aerosol flow rate, the greater the concentration of precursor in the solution the greater the throughput of reactant through the reaction chamber. As the concentration increases, however, the solution can become more viscous such that the aerosol may have droplets with larger sizes than desired. Thus, selection of solution concentration can involve a balance of factors in the selection of a desired solution concentration.

Several different types of nanoscale particles have been produced by laser pyrolysis. Similar particles can be produced for light reactive deposition based on the description above. In particular, many materials suitable for the production of optical materials can be produced by light reactive deposition.

Such nanoscale particles for light reactive deposition can generally be characterized as comprising a composition comprising a number of different elements that are present in varying relative proportions, where the number and the relative proportions are selected based on the application for the nanoscale particles. Typical numbers of different elements comprise, for example, numbers in the range(s) from about 2 elements to about 15 elements, with numbers of 1, 2, 3, 4, 5, 6, 7, 8, 9, 10, 11, 12, 13, 14, and 15 being contemplated. General numbers of relative proportions comprise, for example, values in the range(s) from about 1 to about 1,000,000, with numbers of about 1, 10, 100, 1000, 10000, 100000, 1000000, and suitable intermediate values thereof being contemplated.

Alternatively or additionally, such nanoscale particles can be characterized as having a chemical composition or a mixture of chemical compositions each represented by the following formula:

$$A_aB_bC_cD_dE_eF_fG_gH_hI_iJ_jK_kL_lM_mN_nO_o,$$

where each A, B, C, D, E, F, G, H, I, J, K, L, M, N, and O is present or absent and at least one of A, B, C, D, E, F, G, H, I, J, K, L, M, N, and O is present and is selected from the group consisting of elements of the periodic table of elements comprising Group 1A elements, Group 2A elements, Group 3B elements (comprising the lanthanide family of elements and the actinide family of elements), Group 4B elements, Group 5B elements, Group 6B elements, Group 7B elements, Group 8B elements (i.e., groups with the first elements of Fe, Co, and Ni), Group 1B elements, Group 2B elements, Group 3A elements, Group 4A elements, Group 5A elements, Group 6A elements, and Group 7A elements; and each a, b, c, d, e, f, g, h, i, j, k, l, m, n, and o is selected from a stoichiometrically appropriate value in the range(s) from about 1 to about 1,000,000, with numbers of about 1, 10, 100, 1000, 10000, 100000, 1000000, and suitable intermediate values thereof being contemplated.

Amorphous submicron and nanoscale powders and glass layers with dopants, such as rare earth dopants and/or other metal dopants, are described in copending and commonly assigned U.S. Provisional Patent Application Ser. No. 60/313,588 to Horne et al., entitled "Doped Glass Materials," incorporated herein by reference. Suitable dopants comprise rare earth metals, which can impart desirable modifications of properties, such as index-of-refraction. Amorphous powders and glass layers can be formed with complex compositions comprising a plurality of selected dopants. The powders can be used to form optical materials and the like. The glass layers can be formed by directly depositing a uniform particle coating using light reactive deposition and subsequently consolidating the powder into a uniform glass layer.

Amorphous submicron and nanoscale particles can be produced with selected dopants using laser pyrolysis and other flowing reactor systems. Using these approaches a variety of new materials can be produced. The dopants can be introduced at desired stoichiometries by varying the composition of the reactant stream. The dopants are introduced into an appropriate host glass forming material. By appropriately selecting the composition in the reactant stream and the processing conditions, submicron particles incorporating one or more metal or metalloid elements as glass-forming hosts with selected dopants, comprising, for example, rare earth dopants and/or complex blends of dopant compositions, can be formed. Since the host amorphous materials generally are oxides, an oxygen source should also be present in the reactant stream. The conditions in the reactor should be sufficiently oxidizing to produce the oxide materials.

Some metal/metalloid oxides are particularly desirable for optical applications and/or for their ability to consolidate the material into uniform glass layers. Suitable glass forming host oxides for doping comprise, for example, $TiO_2$, $SiO_2$, $GeO_2$, $Al_2O_3$, $P_2O_5$, $B_2O_3$, $TeO_2$, and combinations and mixtures thereof While phosphorous is located in the periodic table near the metal elements, it is not generally considered a metalloid element. However, phosphorous in the form of $P_2O_5$ is a good glass former similar to some metalloid oxides, and doped forms of $P_2O_5$ can have desirable optical properties. For convenience, as used herein comprising in the claims, phosphorous is also considered a metalloid element.

Dopants can be introduced to vary properties of the amorphous particles and/or a resulting glass layer. For example, dopants can be introduced to change the index-of-refraction of the glass. For optical applications, the index-of-refraction can be varied to form specific optical devices that operate with light of a selected frequency range. Dopants can also be introduced to alter the processing properties of the material. In particular, some dopants change the flow temperature, i.e., the glass transition temperature, such that the glass can be processed at lower temperatures. In particular, boron and phosphorous dopants can help to lower the viscosity and therefore the flow temperature of silicon oxide. Lowering the flow temperature can be desirable for reducing stress and the attendent birefringence and for improving the consolidation of multiple layers where lower flow temperature materials are placed on top of existing coatings. Boron dopants also lower the index-of-refraction while phosphorous dopants raise the index-of-refraction.

Dopants can also interact within the materials. For example, some dopants are introduced to increase the solubility of other dopants. Using the techniques described herein, doped glasses can be formulated into planar optical devices. Suitable dopants for silicon oxide comprise, for example, titanium oxide, tantalum oxide, tin oxide, niobium oxide, zirconium oxide, aluminum oxide, lanthanum oxide, germanium oxide, boron oxide or combinations thereof.

Particles of interest comprise amorphous compositions that form optical glasses with a plurality of dopants such that the various properties can be selected as desired. In some embodiments, the one or plurality of dopants are rare earth metals or rare earth metals with one or more other dopant elements. Rare earth metals comprise the transition metals of the group IIIb of the periodic table. Specifically, the rare earth elements comprise Sc, Y and the Lanthanide series. Other suitable dopants comprise elements of the actinide series. For optical glasses, the rare earth metals of particular interest as dopants comprise, for example, Ho, Eu, Ce, Th, Dy, Er, Yb, Nd, La, Y, Pr and Tm. Generally, the rare earth ions of interest have a +3 ionization state, although $Eu^{+2}$ and $Ce^{+4}$ are also of interest. Suitable non-rare earth metal dopants for optical glasses comprise, for example, Bi, Sb, Zr, Pb, Li, Na, K, Ba, W, Ca, Cr, Ga, Al, Mg, Sr, Zn, Ti, Ta, Nb, Mo, Th, Cd and Sn.

Rare earth dopants are desirable for their modification of optical properties of the resulting doped material. If the particles are consolidated into a glass layer, the resulting material can have an index-of-refraction influenced by the rare earth dopants as well as other dopants. In addition, the rare earth dopants influence the optical absorption properties that can alter the application of the materials for the production of optical amplifiers and other optical devices. Rare earth doped glasses are particularly suitable for use in the formation of optical amplifiers. The amplifier material is excited by a pump light signal coupled into the amplifier material, where it excites the rare-earth ions. The pump light excites the rare earth doped materials. An optical input passing through the optical material at a lower frequency than the pump signal is then amplified by stimulated emission. Thus, energy from the pump light is used to amplify the input light signal. $Cr^{+4}$ ions can also be used to form optical amplifiers. In addition, rare-earth ions can be used to improve pump efficiency as a pump sensitizer or to provide another pumping band for a rare-earth emitter. For example $Yb^{+3}$ can be a sensitizer for $Er^{+3}$, and $Ho^{+3}$ can provide a pump band for a $Tm^{+3}$ emitter.

To form a uniform glass layer, a layer of amorphous particles can be consolidated. To consolidate the glass, the powders are heated to a temperature above their flow temperature to form a uniform layer of glass material. Incorporation of the dopants into the particles results in a distribution of the dopants through the densified material directly as a result of the powder deposition. Consolidation is described further below.

Material processing remains a significant consideration in the design of desired optical devices. For example, the composition and properties, such as density, of a material are adjusted to obtain materials with a desired index-of-refraction. Similarly, the thermal expansion and flow temperatures of a material have to be consistent with a reasonable processing approach for forming the materials into a monolithic, integrated structure without excessive stress that can introduce undesirable optical properties such as unintentional birefringence. The consolidated optical materials can provide high transparency and homogeneity at the operating wavelength such that light transmission through the materials does not result in undesirable amount of loss. In addition, the materials have to be processable under reasonable conditions to form the integrated devices of the integrated optical circuit or electro-optical circuit. Suitable crystalline optical material and doped optical materials can be produced using the approaches described herein. Similar material constraints can be problematic for the formation of state-of-the-art integrated electronic devices.

With respect to specific examples, the production of silicon oxide nanoparticles is described in copending and commonly assigned U.S. patent application Ser. No. 09/085,514, now U.S. Pat. No. 6,726,990 to Kumar et al., entitled "Silicon Oxide Particles," incorporated herein by reference. This patent application describes the production of amorphous $SiO_2$. The production of titanium oxide nanoparticles and crystalline silicon dioxide nanoparticles is described in copending and commonly assigned, U.S. patent application Ser. No. 09/123,255, now U.S. Pat. No. 6,387,531 to Bi et at, entitled "Metal (Silicon) Oxide/Carbon Composites," incorporated herein by reference. In particular, this application describes the production of anatase and nitile $TiO_2$.

In addition, nanoscale manganese oxide particles have been formed. The production of these particles is described in copending and commonly assigned U.S. patent application Ser. No. 09/188,770, now U.S. Pat. No. 6,506,493 to Kumar et al., entitled "Metal Oxide Particles," incorporated herein by reference. This application describes the production of MnO, $Mn_2O_3$, $Mn_3O_4$ and $Mn_5O_8$.

Also, the production of vanadium oxide nanoparticles is described in U.S. Pat. No. 6,106,798 to Bi et al., entitled "Vanadium Oxide Nanoparticles," incorporated herein by reference. Similarly, silver vanadium oxide nanoparticles have been produced, as described in U.S. Pat. No. 6,225,007 to Horne et al., and copending and commonly assigned U.S. patent application Ser. No. 09/311,506, now U.S. Pat. No. 6,391,494 to Reitz et al., both entitled "Metal Vanadium Oxide Particles," both of which are incorporated herein by reference.

Furthermore, lithium manganese oxide nanoparticles have been produced by laser pyrolysis along with or without subsequent heat processing, as described in copending and commonly assigned U.S. patent applications Ser. No. 09/188,768, now U.S. Pat. No. 6,607,706 to Kumar et al., entitled "Composite Metal Oxide Particles," and Ser. No. 09/334,203, now U.S. Pat. No. 6,482,374 to Kumar et al., entitled "Reaction Methods for Producing Ternary Particles," and U.S. Pat. No. 6,136,287 to Horne et al., entitled "Lithium Manganese Oxides and Batteries," all three of which are incorporated herein by reference.

The production of aluminum oxide nanoparticles is described in copending and commonly assigned, U.S. patent application Ser. No. 09/136,483 to Kumar et al., entitled "Aluminum Oxide Particles," incorporated herein by reference. In particular, this application disclosed the production of γ-$Al_2O_3$. The formation of delta-$Al_2O_3$ and theta-$Al_2O_3$ by laser pyrolysis/light reactive deposition along with doped-crystalline and amorphous alumina is described in copending and commonly assigned U.S. patent application Ser. No. 09/969,025 to Chiruvolu et al., entitled "Aluminum Oxide Powders," incorporated herein by reference. Amorphous aluminum oxide materials can be combined with other glass formers, such as $SiO_2$ and/or $P_2O_3$. For example, suitable metal oxide dopants for aluminum oxide for optical glass formation comprise cesium oxide ($Cs_2O$), rubidium oxide ($Rb_2O$), thallium oxide ($Tl_2O$), lithium oxide ($Li_2O$), sodium oxide ($Na_2O$), potassium oxide ($K_2O$), beryllium oxide (BeO), magnesium oxide (MgO), calcium oxide (CaO), strontium oxide (SrO) and barium oxide (BaO). Aluminum oxide dopants can affect, for example, the index-of-refraction, consolidation temperature and/or the porosity of the glass. Suitable metal oxide dopants for infrared emitters comprise, for example, cobalt oxide ($Co_3O_4$), $Er_2O_3$, $CrO_2$, $Tm_2O_3$, $Nd_2O_3$, $Yb_2O_3$, $Pr_2O_3$, $Dy_2O_3$, and $Ho_2O_3$.

In addition, tin oxide nanoparticles have been produced by laser pyrolysis, as described in copending and commonly assigned U.S. Pat. No. 6,200,674 to Kumar et al., entitled "Tin Oxide Particles," incorporated herein by reference. The production of zinc oxide nanoparticles is described in copending and commonly assigned U.S. patent application Ser. No. 09/266,202 to Reitz, entitled "Zinc Oxide Particles," incorporated herein by reference. In particular, the production of ZnO nanoparticles is described.

Rare earth dopants can be introduced into metal compositions using light reactive deposition and laser pyrolysis. In particular, submicron and nanoscale particles and corresponding coatings of rare earth metal oxide particles, rare earth doped metal/metalloid oxide particles, rare earth metal/metalloid sulfides and rare earth doped metal/metalloid sulfides, especially crystalline powders and coatings, are described in copending and commonly assigned U.S. patent application Ser. No. 09/843,195, now U.S. Pat. No. 6,692,660 to Kumar et al. entitled "High Luminescence Phosphor Particles," incorporated herein by reference. Suitable host materials for the formation of phosphors comprise, for example, ZnO, ZnS, $Zn_2SiO_4$, SrS, $YBO_3$, $Y_2O_3$, $Al_2O_3$, $Y_3Al_5O_{12}$ and $BaMgAl_{14}O_{23}$. Exemplary non-rare earth metals for activating phosphor particles as dopants comprise, for example, manganese, silver and lead. Exemplary rare earth metals for forming metal oxide phosphors comprise, for example, europium, cerium, terbium and erbium. Generally, heavy metal ions or rare earth ions are used as activators in phosphors. For phosphor applications, the particles are generally crystalline. The incorporation of rare earth and other dopants into amorphous particles and coating is described above.

The production of iron, iron oxide and iron carbide is described in a publication by Bi et al., entitled "Nanocrystalline α-Fe, $Fe_3C$, and $Fe_7C_3$ produced by $CO_2$ laser pyrolysis," J. Mater. Res. Vol. 8, No. 7 1666–1674 (July 1993), incorporated herein by reference. The production of nanoparticles of silver metal is described in copending and commonly assigned U.S. patent application Ser. No. 09/311,506, now U.S. Pat. No. 6,391,494 to Reitz et al., entitled "Metal Vanadium Oxide Particles," incorporated herein by reference. Nanoscale carbon particles produced by laser pyrolysis is described in a reference by Bi et al., entitled "Nanoscale carbon blacks produced by $CO_2$ laser pyrolysis," J. Mater. Res. Vol. 10, No. 11, 2875–2884 (Nov. 1995), incorporated herein by reference.

The production of iron sulfide ($Fe_{1-x}S$) nanoparticles by laser pyrolysis is described in Bi et al., Material Research Society Symposium Proceedings, vol. 286, p. 161–166 (1993), incorporated herein by reference. Precursors for laser pyrolysis production of iron sulfide were iron pentacarbonyl (Fe(CO)$_5$) and hydrogen sulfide (H$_2$S).

Cerium oxide can be produced using the laser pyrolysis and light reactive deposition apparatuses described above. Suitable precursors for aerosol delivery comprise, for example, cerous nitrate (Ce(NO$_3$)$_3$), cerous chloride (CeCl$_3$) and cerous oxalate (Ce$_2$(C$_2$O$_4$)$_3$). Similarly, zirconium oxide can be produced using the light reactive deposition apparatuses described above. Suitable zirconium precursors for aerosol delivery comprise, for example, zirconyl chloride (ZrOCl$_2$) and zirconyl nitrate (ZrO(NO$_3$)$_2$).

The deposition of coatings of dielectric materials for chip capacitors is described in copending and commonly assigned U.S. Provisional Patent Application Ser. No. 60/312,234 to Bryan, entitled "Reactive Deposition For The Formation Of Chip Capacitors," incorporated herein by reference. Particularly suitable dielectric materials comprise a majority of barium titanate (BaTiO$_3$), optionally mixed with other metal oxides. Other dielectric oxides suitable for incorporation into ceramic chip capacitors with appropriate dopants comprise, for example, SrTiO$_3$, CaTiO$_3$, SrZrO$_3$, CaZrO$_3$, Nd$_2$O$_3$-2TiO$_3$ and La$_2$O$_3$-2TiO$_2$.

The production of ternary nanoparticles of aluminum silicate and aluminum titanate can be performed by laser pyrolysis following procedures similar to the production of silver vanadium oxide nanoparticles described in copending and commonly assigned U.S. patent application Ser. No. 09/311,506, now U.S. Pat. No. 6,391,494 to Reitz et al., entitled "Metal Vanadium Oxide Particles," incorporated herein by reference. Suitable precursors for the production of aluminum silicate comprise, for vapor delivery, a mixture of aluminum chloride (AlCl$_3$) and silicon tetrachloride (SiCl$_4$) and, for aerosol delivery, a mixture of tetra(N-butoxy) silane and aluminum isopropoxide (Al(OCH(CH$_3$)$_2$)$_3$). Similarly, suitable precursors for the production of aluminum titanate comprise, for aerosol delivery, a mixture of aluminum nitrate (Al(NO$_3$)$_3$) and titanium dioxide (TiO$_2$) powder dissolved in sulfuric acid or a mixture of aluminum isopropoxide and titanium isopropoxide (Ti(OCH(CH$_3$)$_2$)$_4$).

The formation of submicron and nanoscale particles along with coatings of metal/metalloid compounds with complex anions is described in copending and commonly assigned U.S. patent application Ser. No. 09/845,985 to Chaloner-Gill et al., entitled "Phosphate Powder Compositions And Methods For Forming Particles With Complex Anions," incorporated herein by reference. Suitable complex anions comprise, for example, phosphates, silicates and sulfates. The compositions can comprise multiple metal/metalloid elements.

The synthesis by laser pyrolysis of silicon carbide and silicon nitride is described in copending and commonly assigned U.S. patent application Ser. No. 09/433,202 to Reitz et al., entitled "Particle Dispersions," incorporated herein by reference. For the production of silicon nitride, ammonia (NH$_3$) was the nitrogen source. For the production of silicon carbide particles, diethoxysilane was decomposed to form the particles.

To obtain particular objectives, the features of the coating can be varied with respect to composition of layers of the powders as well as location of materials on the substrate. Methods for patterning a layer during the deposition process are described above and methods for patterning a layer following deposition are described further below. Generally, to form an optical device the uniform optical material is localized to a particular location on the substrate. In addition, multiple layers of particles can be deposited in a controlled fashion to form layers with different compositions and/or optical properties. Similarly, the coating can be made a uniform thickness, or different portions of the substrate can be coated with different thicknesses of particles. Different coating thicknesses can be applied by varying the sweep speed of the substrate relative to the particle nozzle, by making multiple sweeps of portions of the substrate that receive a thicker particle coating or by patterning the layer with a mask.

Thus, layers of materials, as described herein, may comprise particular layers that do not have the same planar extent as other layers. Thus, some layers may cover the entire substrate surface or a large fraction thereof while other layers cover a smaller fraction of the substrate surface. In this way, the layers can form one or more localized devices. At any particular point along the planar substrate, a sectional view through the structures may reveal a different number of identifiable layers than at other point along the surface. However, to form a three dimensional structure with many layers, it is generally desirable to form a large stack of layers with each layer having a uniform thickness such that subsequent layers can be added as a flat layer. Generally, for optical applications, the particle coatings have a thickness less than about 500 microns, in other embodiments, less than about 250 microns, in additional embodiments in the range(s) from about 50 nanometers to about 100 microns and in further embodiments in the range(s) from about 100 nanometers to about 50 microns. A person of ordinary skill in the art will recognize that additional range(s) within these explicit ranges are contemplated and are within the present disclosure.

Consolidation to Form Optical Materials

Heat treatment can melt and fuse the particles and lead to compaction, i.e., densification, of the powders to form the desired material, especially optical material. This fusing of the particles is generally referred to as consolidation. To consolidate, i.e., density, the optical materials, the materials can be heated to a temperature above the melting point or the flow temperature, i.e., softening point, of the material to consolidate the coating into a smooth uniform material. Consolidation can be used to form amorphous or crystalline phases in layers. In general, consolidation can be performed before or after patterning of a layer. A preliminary heat treatment can be applied with the reactor flame to reduce dopant migration during the consolidation process.

Generally, the heating is performed under conditions to melt the particles into a viscous liquid. To form the viscous liquid, crystalline particles are heated above their melting point and amorphous particles are heated above their softening point. Because of the high viscosity, the material does not flow significantly on the substrate surface. Processing at higher temperatures to reduce the viscosity of the melt can result in undesirable melting of the substrate, migration of compositions between layers or in flow from a selected area of the substrate. The heating and quenching times can be adjusted to change the properties of the consolidated coatings, such as density. In addition, heat treatment can remove undesirable impurities and/or change the stoichiometry and crystal structure of the material.

Following deposition of the powder layer, the precursors can be shut off such that the reactant stream only comprises a fuel and an oxygen source that reacts to form a product without particles. The flame resulting from the reaction of the fuel and oxygen source can be used to heat the coated substrate. Such a heating step is observed to reduce dopant migration upon full consolidation of a doped silica glass. A flame heating step can be perform between coating steps for several layers prior to a heat treatment to fully consolidate the material.

Suitable processing temperatures and time generally depend on the composition of the particles. Small particles on the nanometer scale generally can be processed at lower temperatures and/or for shorter times relative to powders with larger particles due to lower melting points for the nanoparticles in comparison with bulk material. However, it may be desirable to use a comparable melting temperature to obtain greater surface smoothness from improved melting of the nanoparticles.

For the processing of silicon oxide nanoparticles, the particle coatings can be heated to a temperature from about 800° C. to 1700° C., although with silicon substrates the upper limit is about 1350° C. Higher temperatures can be reached with appropriate ceramic substrates. Dopants in the silicon oxide particles can lower the appropriate consolidation temperatures. Thus, the dopant can be selected to flow into a uniform optical material at a lower temperature. Suitable dopants to lower the flow temperature when placed into silicon oxide ($SiO_2$) comprise, for example, boron, phosphorous, germanium, and combinations thereof. The amount and composition of one or more dopants can be selected to yield a desired flow temperature and index-of-refraction.

Heat treatments can be performed in a suitable oven. It may be desirable to control the atmosphere in the oven with respect to pressure and/or the composition of the gases. Suitable ovens comprise, for example, an induction furnace or a tube furnace with gas flowing through the tube. The heat treatment can be performed following removal of the coated substrates from the coating chamber. In alternative embodiments, the heat treatment is integrated into the coating process such that the processing steps can be performed sequentially in the apparatus in an automated fashion.

For many applications, it is desirable to apply multiple particle coatings with different compositions. In general, these multiple particle coatings can be arranged adjacent to each other across the x-y plane of the substrate being coated (e.g., perpendicular to the direction of motion of the substrate relative to the product stream), or stacked one on top of the other across the z plane of the substrate being coated, or in any suitable combination of adjacent and stacked layers. Each coating can be applied to a desired thickness. Silica glasses can be used for optical applications. Crystalline aluminum oxide, e.g., sapphire, and crystalline $SiO_2$, e.g., quartz, may be suitable for optical applications at certain light wavelengths.

For optical applications in some embodiments, silicon oxide and doped silicon oxide can be deposited adjacent each other and/or in alternating layers. Similarly, distinct layers of silicon oxide with different dopants can be deposited in alternating layers. Specifically, two layers with different compositions can be deposited with one on top of the other, and or additionally or alternatively, with one next to the other, such as layer A and layer B formed as AB. In other embodiments, more than two layers each with different compositions can be deposited, such as layer A, layer B and layer C deposited as three sequential (e.g., stacked one on top of the other, or adjacent to the other, or adjacent and stacked) layers ABC. Similarly, alternating sequences of layers with different compositions can be formed, such as ABABAB . . . or ABCABCABC . . . .

Individual uniform layers after consolidation generally have an average thickness of less than 100 microns, in many embodiments from about 1 micron to about 50 microns, in other embodiments from about 3 microns to about 20 microns. A person of skill in the art will recognize that ranges within these specific ranges are contemplated and are within the scope of the present disclosure. Thicknesses are measured perpendicular to the projection plane in which the structure has a maximum surface area.

The material with multiple particle coatings can be heat treated after the deposition of each layer or following the deposition of multiple layers or some combination of the two approaches. The optimal processing order generally would depend on the melting point of the materials. Generally, however, it is desirable to heat treat and consolidate a plurality of layers simultaneously. Specifically, consolidating multiple layers simultaneously can reduce the time and complexity of the manufacturing process and, thus, reduce manufacturing costs. If the heating temperatures are picked at reasonable values, the melted materials remain sufficiently viscous that the layers do not merge undesirable amounts at the interface. Slight merging of the layers generally does not affect performance unacceptable amounts. As noted above, particles can be deposited with changing particle size in the z-direction within a single layer or between layers. Thus, smaller particles can be deposited on top of larger particles. Since the smaller particles generally soften at lower temperatures, the consolidation of the upper layer can be less likelyu to damage the lower layers during the consolidation step.

Three Dimensional Optical Structures

The three dimensional optical structures comprise a plurality of layers of optical material in a stacked configuration with a plurality of layers having optical property variation and generally composition variation within the layer. Composition variation within a layer can be accomplished by patterning the composition during the deposition process, as described above, or by patterning the layer following deposition. For example, conventional approaches from integrated circuit manufacturing, such as photolithography and etching, can be used to pattern the coating following deposition. Consolidation is performed for individual layers, groups of layer or for all the layers simultaneously. Following patterning and consolidation, a complex optical structure is formed with optical paths within a plurality of layers and possibly between layers.

For many applications, the desirability of applying multiple particle coatings with different compositions (e.g., adjacent to each other, or stacked one on top of the other) can be suggested by functional requirement(s) for the coated substrate. Thus, for example, in optical applications, it can be desirable to apply multiple coatings with different compositions to form particular optical devices or integration of optical devices at particular locations within the structure. While the multilayered optical coatings described herein can have a variety of applications, optical devices formed on a substrate surface are of particular interest. The control of light propagation along the optical devices requires variation in the index-of-refraction in adjacent materials. A basic feature of the optical devices is that they are produced from a crystalline (single crystalline or polycrystalline) or amorphous material that is transparent to the electromagnetic radiation within a particular wavelength range to be transmitted through the device.

In general, the optical structure comprises one or more optical paths (or light paths, each used interchangeably throught this application) through the material. Light paths are identified as localized materials with different optical properties, generally index-of-refraction, than adjacent materials. The difference in optical properties confines light propagation along the light path through the structure. Similarly, optical devices can be distinguished by boundaries along a light path of a material with one or more optical properties that are different from adjacent materials along the light path.

In particular, light encountering an interface of a material with a lower index-of-refraction at a predictable range of incident angles will be totally reflected back into the higher index-of-refraction medium. If properly configured, e.g., the material does not bend too sharply based on the differences in index-of-refraction, total internal reflection confines light within the material with the higher index-of-refraction. In some suitable embodiments, the planar waveguides have a thickness roughly on the order of the wavelength of the light, i.e., electromagnetic radiation, to be transmitted along the waveguide. The selection of the thickness in a particular embodiment may depend on the acceptance angle, which is a function of the difference in refractive index between the core and the cladding. The sine of the acceptance angle is the numerical aperture. For example, for 1.55 micron light, a single mode waveguide would have a thickness of about 9.5 microns with a numerical aperture of 0.13 and a thickness of about 3 microns with a numerical aperture of 0.3. In general, the thickness of optical layers can be selected based on the desired light propagating properties. In some embodiments, waveguides do not significantly attenuate the light transmitted through the material over moderate distances.

As a particular example, to produce a planar optical waveguide by particle coating technology, generally three layers are deposited. A core layer forms a light channel surrounded by an under-cladding layer, and an over-cladding layer. The under-cladding layer generally is applied between a substrate or underlying optical material and the core layer. In other words, the core layer generally is formed between two other optical materials to provide suitable optical transmission through the core material.

Selective deposition of powder material and/or selective removal of powder and/or consolidated material can be used to form desired structures within a layer of optical material. Based on the disclosure above, suitable selective deposition can involve, for example, selective deposition through a mask, movement of the substrate through the product particle stream to form coatings over only a portion of the substrate, varying the composition during the formation of a single coating layer or a combination thereof. These approaches result in the selective placement of particular compositions at selective positions within a layer while other compositions can be placed at other locations. In addition, the optical layer can be etched to form patterns of the optical material. In particular, to form patterned structures, patterning approaches, such as photolithography, along with etching, such as chemical etching or radiation-based etching, can be used to form desired patterns in one or more layers by the selective removal of material. Thus, the composition and optical properties can very within a layer and between layers.

Figure 24:
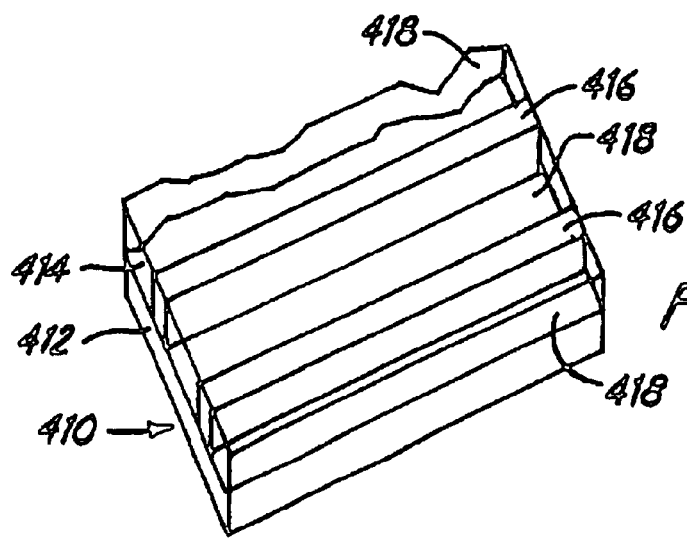
FIG. 24 is a perspective view of a patterned layer of optical material.
Figure 25:
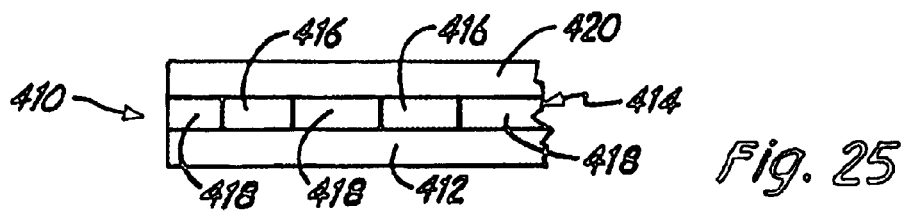
FIG. 25 is a side view of the material of FIG. 24.

For example, after the deposition of two or more layers, controlled deposition or an etching step can be performed to create a structure shown schematically in FIG. 24. The layers can be deposited using light reactive deposition. Contoured optical structure 410 comprises one or more support layers 412, which generally comprise an optical cladding layer adjacent the remaining portions of the structure, and one or more contoured optical path layers 414 on support layers 412. Optical path layer 414 comprises optical structures 416 with interspersed optical cladding 418. An additional optical material 420, such as a cladding material, is generally placed over optical path layer 414, as shown in FIG. 25. The composition of the cladding layer of support layer 412, optical cladding 418 and cladding components of optical material 420 can be the same or different materials to accomplish the cladding function. Heat treatments can be performed at appropriate points comprising before and/or after patterning. Additional planarization, such as chemical-mechanical polishing, can be performed also after the formation of one or more layers.

Optical devices of interest comprise, for example, optical waveguide devices, such as optical couplers, splitters, arrayed waveguide grating (AWG) and the like. Waveguides manufactured on a substrate surface are referred to as planar waveguides. Planar waveguides are useful in the production of integrated optical circuits for optical communication and other opto-electronics applications. Other optical devices of interest comprise, for example, three dimensional optical memory device, Bragg grating, optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical phase-retarder, and optical detector.

Other devices of particular interest comprise photonic crystals. Photonic crystals are ordered arrays of crystalline domains having a unit cell size of the photonic crystal ranging from about one quarter to about one optical wavelength. For example, visible light has a wavelength of about 380 nm to about 780 nm. Generally, photonic crystals of interest have size from about 100 nm to about 1000 nm. The appropriate domains can be patterned using the approaches described herein. The photonic crystals can be integrated into circuits with other optical devices. The photonic crystals can be formed from an ordered array of crystalline domains of, for example, silica, titania, zinc oxide and doped versions thereof. Due to the size of the ordered arrays, the photonic crystals can have a photonic band gap that prevents propagation of light in any direction. Thus, photonic crystals can be used for control of spontaneous emission and for very sharp bending of light.

Figure 26:
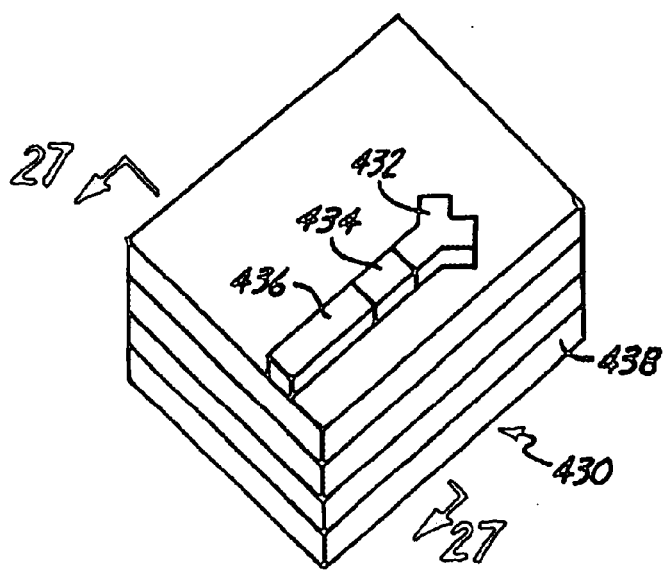
FIG. 26 is a perspective view of an optical circuit.
Figure 27:
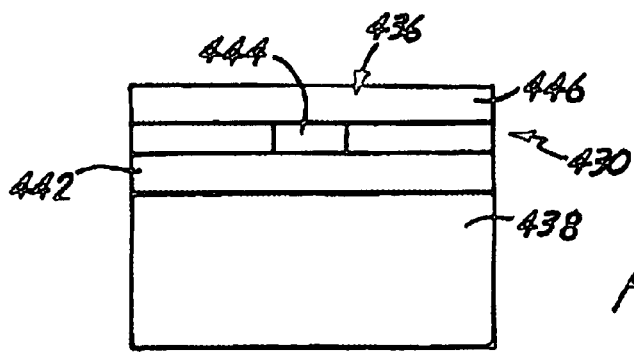
FIG. 27 is a sectional view of the optical circuit of FIG. 26 taken along line 27—27.

An optical circuit on a substrate is shown schematically in FIGS. 26 and 27. As shown in FIG. 26, optical circuit 430 comprises optical devices 432, 434, 436 on substrate 438. A sectional view comprising optical device 432 is shown in FIG. 27. Optical device 432 comprises an under-cladding optical material 442, a core optical material 444 and an over-cladding optical material 446. In general, core optical material 444 can be different from undercladding optical material 442 and over-cladding optical material 446 in any optical property, such as index-of-refraction, which may be the result of, for example, a compositional difference, a density difference, or a crystal structure difference. Under-cladding optical material 442 may or may not be different from over-cladding optical material 446 in composition and/or optical properties.

Substrate 438 can be formed from silicon, alumina or other convenient flat materials. Common substrates are round wafers, although substrates that are square or other shapes can be used. Substrateless planar structures are also contemplated, as described further below. For these embodiments, a projection of the planar device to obtain a maximum area provides a planar extent of the device. This projected planar extent establishes a plane analogous to the substrate surface for orienting a position along the planar surface.

In some embodiments, the optical materials are formed from silica-based glasses. In these embodiments, an undercladding layer of doped silicon dioxide is deposited over the substrate. A core layer of different doped silicon dioxide powder is then deposited over the cladding layer. The under-cladding layer generally is consolidated prior to the addition of an additional layer, although both layers can be consolidated simultaneously if the heat treatment is performed under suitable conditions. A convenient approach to the production of a core layer with a higher index of refraction is to use a doped silicon oxide. Suitable dopants comprise, for example, titanium oxide, tantalum oxide, tin oxide, lead oxide, lithium oxide, sodium oxide, bismuth oxide, potassium oxide, antimony oxide, calcium oxide, barium oxide, tungsten oxide, niobium oxide, zirconium oxide, aluminum oxide, lanthanum oxide, other rare earth dopants, such as, Er, Yb, Nd, Y, Pr and Tm, germanium oxide, boron oxide or combinations thereof. Generally, the under-cladding layer and the over-cladding layer can be produced with doped silicon dioxide with a lower index of refraction than the doped core layer.

For a given cladding index-of-refraction, increasing the core index-of-refraction will increase the numerical aperture, i.e., the sine of the maximum angle at which light will be confined to the core, which depends on the difference between the core and cladding refractive indices. The number of modes supported by a waveguide depends on the wavelength of light, the core dimensions and the numerical aperture. Therefore, if a waveguide is intended to transmit a single-mode of light, e.g., the desired fundamental mode, an increase in numerical aperture can be compensated by a decrease in core dimensions, comprising the core layer thickness. The correlation between these parameters should be controlled accordingly. The use of excessive amounts of certain dopants should be avoided since excessive amounts of certain dopants can result in the loss of transparency of the material with respect to the light. The upper limit on the amount of these dopants depends on the specific dopant, although for most materials there would generally be less than about 40% by weight of these dopants.

Core layers with the same or different optical properties and compositions can be deposited over selected portions of the substrate in the same or different layers to form separate optical structures. Alternatively, after consolidation of core layer material, the material can be contoured to produce one or more desired devices in a particular layer. After the formation of the desired structures from the core material, an over-cladding layer generally is applied. The formation of planar waveguides by flame hydrolysis deposition is described further in U.S. Pat. No. 3,934,061 to Keck et al., entitled "Method of Forming Planar Optical Waveguides," incorporated herein by reference. The formation of coupling elements with etching is described further in U.S. Pat. No. 4,735,677 to Kawachi et al., entitled "Method For Fabricating Hybrid Optical Integrated Circuit," incorporated herein by reference.

Integrated Optical Structures in Three Dimensions

Using the approaches described herein a plurality of optical materials can be deposited in a stacked configuration to form a multilayered optical structure in three dimensions. The three dimensional optical structure comprises a plurality of layers with optical properties differing between materials in different layers and for some layers within different portions of the layer. In some embodiments, by varying the optical properties of the materials within a layer, particular optical devices can be localized within a specific portion of an individual layer. Thus, the three dimensional optical structures can be used as a multilayered stack of planar optical devices. By aligning different optical devices such that light is transmitted between the optical devices, integrated optical circuits can be formed. In further embodiments, optical devices are also integrated between different layers with optical pathways between the layers. Turning elements can be used to transmit light from one layer with an optical pathway to another layer with an optical pathway such that the integrated optical pathway spans a plurality of layers.

The numbers of layers can be varied to form a desired three dimensional optical structure generally with light pathways in multiple layers of the structure. In some embodiments, the structure has in the range(s) of two or more layers, in additional embodiments in the range(s) of five or more layers, in further embodiments at least in the range(s) of 10 layers, in other embodiments in the range(s) at least 20 layers and in still other embodiments at least in the range(s) of 30 layers and generally in the range(s) of less than about one thousand layers. A person of ordinary skill in the art will recognize that numbers of layers and subranges within these specific range(s) are contemplated and are encompassed within the present disclosure. In addition, the three dimensional structure can comprise gradient layers with continuously changing composition or step-wise varying composition such that the concept of layers can be flexible. Furthermore, adjacent "layers" formed partly from the same material may not have an identifiable boundary separating the identical material at different levels in the planar structure. As the concept of layer becomes somewhat flexible, another meaningful concept becomes the level within the generally planar structure since the top and bottom surfaces generally define planes that orient the structure and provide reference points for evaluating levels within the structure as a distance through the thickness of the structure. However, with the planar orientation of the structure, the concept of layers retains functional significance with respect to the relationship between optical devices and pathways since a large majority of the optical devices and corresponding optical pathways will remain positioned within layers.

A layer can be identified by one or more boundaries or portions thereof along a particular planar interface. The thickness of a layer can be identified by the thickness perpendicular to the planar surface of the substrate or the plane defining the extent of a substrateless structure as described below. The total average thickness of individual optical layers is generally in the range(s) of no more than about 1 millimeter, in many embodiments in the range(s) of no more than about 250 microns, in other embodiments in the range(s) from about 100 nanometers to about 150 microns, in still other embodiments in the range(s) from about 1 microns to about 100 microns and in further embodiments in the range(s) from about 3 microns to about 20 microns. A person of ordinary skill in the art will recognize that ranges and subranges within these explicit ranges are contemplated and are encompassed within the present disclosure.

The three dimensional optical structure can be substrateless. Substrates can be identified as materials that can be optically isolated from materials that transmit light, i.e., non-optical materials. Thus, cladding layers generally are not part of substrates since their optical properties help to confine light within core layers and, therefore, are not optically isolated. While light is not transmitted through the cladding material, the optical properties of the cladding and the interfaces with the cladding are significant with respect to the qualities of the light transmission through adjoining core materials. Alternatively, the three dimensional optical structures can comprise a plurality of substrates in which further non-optical layers provide buffers between optical layers.

Generally, light reactive deposition involves the deposition of materials onto a substrate. However, it has been discovered that a release layer can be formed such that separation at the release layer separates an optical structure from the substrate on which it was formed. The release layer generally comprises powders with significantly higher flow temperatures than the materials deposited above. The composition of the powder can change gradually or abruptly from one composition to another by adjusting the precursor composition in the deposition apparatus. Conditions and compositions can be selected to produce a desirable segregation such that a release layer is formed upon heat treatment. Alternatively, the release layer can be formed by a thermal exposure from the top to consolidate only a portion of the thickness of material, leaving the release layer intact. Formation of release layers and the use of release layers to form substrateless optical structures is described further in copending and commonly assigned U.S. patent application Ser. No. 09/931,977 now U.S. Pat. No. 6,788,866 to Bryan, entitled "Layer Materials On Substrates," incorporated herein by reference.

In general, one or more of the layers of optical material within the optical structure will have non-uniform optical properties across the layer. Generally, the optical properties can be varied by changing the composition across the layer, although optical properties can be varied by altering other properties of the material. For example, the index-of-refraction of some materials changes following exposure of the material to high energy light, e.g., blue light or ultraviolet light. Variations in the optical properties can be used to form optical channels/pathways, other passive devices, such as beam splitters, and/or active devices through the layer such that the light is localized within the optical channels and the corresponding devices.

The multilayered optical structures are suitable for the formation of stacked planar optical circuits. Selected layers of the multilayered optical structure are formed to provide optical channels/pathways through the layer. In some embodiments, the optical channels through the layer comprise planar optical devices for optical processing/manipulations. In alternative or additional embodiments, one or more integrated optical circuits are located on a single layer with one or more optical channels.

Figure 28:
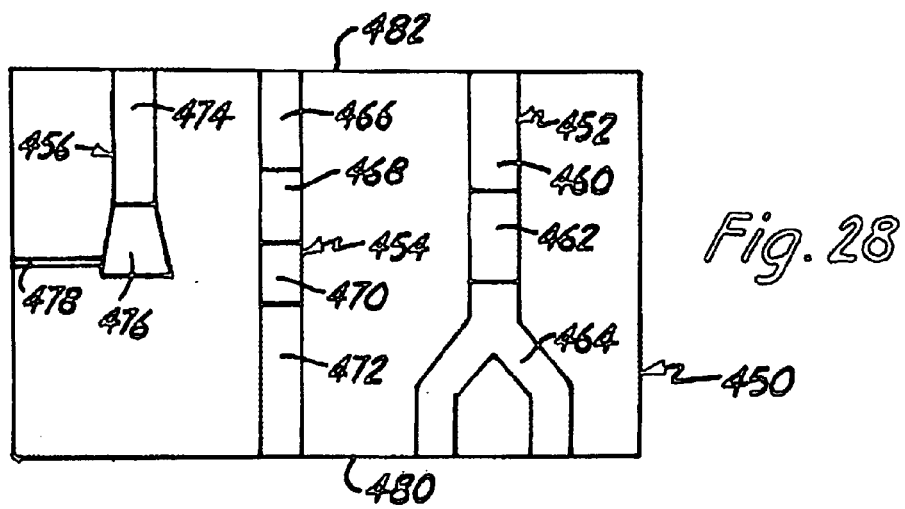
FIG. 28 is a top view of a layer of optical material with three integrated optical circuits.

A representative cross section through a layer with planar optical devices is shown in FIG. 28. Layer 450 comprises integrated optical circuits 452, 454, 456. Optical circuit 452 comprises optical devices 460, 462, 464 while optical circuit 454 comprises optical devices 466, 468, 470, 472. Optical circuit 456 comprises an optical device 474, such as a planar waveguide, and an electro-optical device 476, such as a photodetector, e.g., a photodiode, with an electrical conducting guide 478, such as an electrical contact or electrode for generating an electrical field. Electrical conducting guide 478 can be formed by light reactive deposition with silver particles or semiconductor processing approaches, such as chemical vapor deposition. While layer 450 is shown with three optical circuits, layers generally can comprise one or two optical circuits or more than three optical circuits. Similarly, the number of optical devices within an optical circuit can vary as desired within the spatial limits of the layer. Generally, one or more edges of the layer, such as edges 480 and 482 in FIG. 28, are suitable for connection to an optical interconnect, such as a connection to an optical fiber or to other optical devices and/or electro-optical devices.

Regardless of whether or not a substrate is present, the planar optical structures have a planar aspect that is distinctly different from elongated optical fibers and the like. The planar aspect of the planar optical structures can be evaluated based on a planar projection of the structure having the largest projected surface area. This planar projection can be evaluated without complications due to surface features or the like. Generally, the planar structure has a maximum area planar projection with a surface area in the range(s) of at least about 1 cm$^2$, in other embodiments in the range(s) of at least about 10 cm$^2$, in further embodiments in the range(s) of at least about 25 cm$^2$, in additional embodiments in the range(s) of at least about 50 cm$^2$, and in some embodiments in the range(s) from about 1 cm$^2$ to about 1 m$^2$. A person of ordinary skill in the art will recognize that ranges and subranges within these explicit ranges are contemplated and are within the present disclosure. For example, a five inch diameter wafer substrate would result in a structure having a maximum projected area of 6.25 $\pi$ inches$^2$ (126.7 cm$^2$).

In addition, the planar optical structures generally have planar projections with an aspect ratio in the range(s) of no more than about 20, in other embodiments in the range(s) of no more than about 10 and in other embodiments, in the range(s) of no more than about 5. A person of ordinary skill in the art will recognize that other ranges and subranges within these explicit ranges are contemplated and are encompassed within the present disclosure. The aspect ratio is the ratio of the length to width, where the length is the distance along the longest segment in the planar projection connecting two edge points and the width is the distance along the longest segment perpendicular to the length segment connecting two edge points. The aspect ratio can be about 1, which is the lowest value. The planar nature of the layer can also be expressed in terms of the minimum edge-to-edge distance in the maximum area projection for segments passing through the center of the projected area. Generally, the minimum edge-to-edge distance is in the range(s) of at least about 1 cm, in many embodiments in the range(s) of at least about 2 cm, in other embodiments in the range(s) of at least about 5 cm and in some embodiments in the range(s) from about 1 cm to about 1 meter. A person of ordinary skill in the art will recognize that ranges and subranges within these explicit ranges are contemplated and are encompassed within the present disclosure. Rectangular structures are convenient with respect to placement of optical structures along the planar surface. Circular structures are convenient because of the availability of circular shaped substrates with very smooth surfaces.

Figure 29:
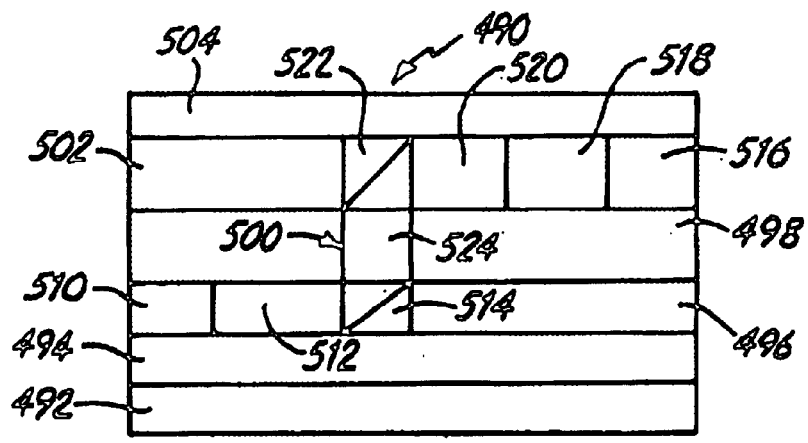
FIG. 29 is a sectional side view of a turning element connecting two layers with integrated optical devices.

The ability to form complex manipulations of optical material within a three dimensional monolithic optical structure imparts the ability to integrate optical devices between layers. Referring to a cross sectional view in FIG. 29, a three dimensional optical structure 490 comprises an optical substrate 492, an under-cladding layer 494, a first transmission layer 496, a middle-cladding layer 498, a turning element 500, a second transmission layer 502 and an over-cladding layer 504. Turning element 500 transmits light from first transmission layer 496 to second transmission layer 502, or vice versa. First transmission layer 496 comprises optical device 510, optical device 512 and bend element 514 of turning element 500. Second transmission layer 502 comprises optical device 516, optical device 518, optical device 520 and bend element 522 of turning element 500. Turning element 500 comprises bend element 514, bend element 522 and waveguide element 524 within middle cladding layer 498. Thus, in this embodiment, turning element 500 spans three layers.

In other embodiments, turning element can spans two layers or a greater number of layers, for example, by expanding waveguide element 524 to span more than one layer. In this way, more distant layers can be coupled. In further embodiments, turning element can only comprise a single bend element such that the light is transmitted perpendicular to the plane of the structure to an element that receives light in that orientation, for example, a detector or the like at which the light path terminates to a surface element, such as a surface light source, e.g., a light emitting diode or a laser, or an optical fiber coupler for coupling light into or out from a fiber. In alternative embodiments, a bend element is oriented to bend light from the plane at an angle, either greater or less than 90 degrees, rather than perpendicular to the plane of the layer.

Figure 30:
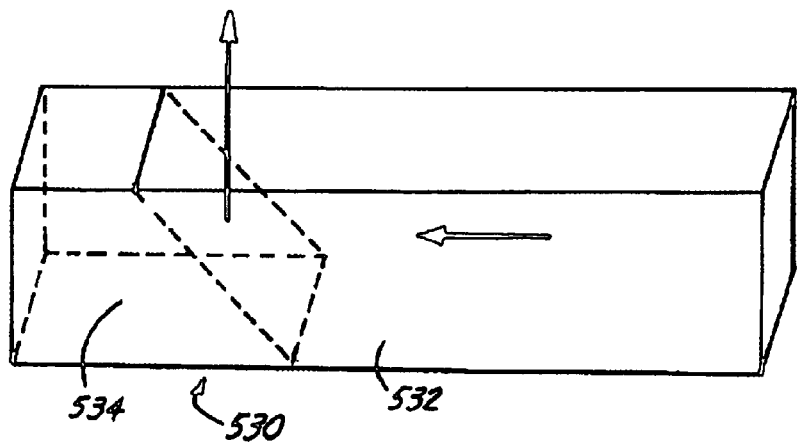
FIG. 30 is perspective view of an isolated waveguide core optically connected with a turning mirror.

Bend elements can be, for example, a turning mirror, which can be formed by the end of a waveguide. In particular, the mirror can be formed by an angled interface between two materials with differing indices-of-refraction. Referring to FIG. 30, turning mirror 530 comprises a core 532 of a waveguide with an angled interface with a low index-of-refraction material 534. To reflect the light perpendicular to the plane of the waveguide, the angled interface is approximately 45 degrees, while other angles of the interface can be used to reflect the light at other angles. For angles between 24° and 67°, the ratio between the index-of-refraction of the core 530 and the index-of-refraction of low index material 534 can be in the range(s) of at least about 1.3. Low index material 534 can be residual gas within a void, such that the index is about 1. The void would generally have a gas, which can be at a low pressure, within the void. The use of a void to form a turning mirror is described further in U.S. Pat. No. 5,966,478 to Marcuse et al., entitled "Integrated Optical Circuit Having Planar Waveguide Turning Mirrors," incorporated herein by reference. To assist with the addition of other layers, a void can be filled with thermally stable polymers that generally have relatively low indices of refraction, in particular lower than typical glasses. Aromatic polymers generally have relatively high thermal stability. For example, poly(p-phenylene) has a decomposition temperature of about 660° C. Fluids, e.g., liquids, with an appropriate index of refraction can also be placed within the void.

In place of using a low index-of-refraction material to reflect the light traveling through the waveguide, metal can be deposited at the same location. Elemental metal, such as silver, gold, nickel and the like, can be used to form a more standard mirror surface with high reflectivity. Elemental metal refers to metal in its un-ionized, elemental form. Metal can be deposited by light reactive deposition, as described above. If a thin layer of metal is applied to the angled surface of the waveguide, the mirror can be partly reflecting.

Furthermore, the mirror can be a dielectric mirror. A dielectric mirror can be formed by depositing alternating layers of index-of-refraction on the sloped edge of a waveguide. High reflectivity mirrors can be obtained by controlling the index-of-refraction and the thickness of the individual layers. Crystalline silicon can be used as a high index-of-refraction material. The appropriate indices-of-refraction and thickness can be determined based on the wavelength of light using known optical principles. The desired number of layers can be formed on top of the sloped core surface by sequentially depositing the compositions on the particular location on the surface. The quality of the mirror generally increases with the number of layers. For reasonable materials and mirror structures, appropriate thickness for the layers can range from about 0.01 microns to about 0.5 microns.

As with other optical structures described herein, turning mirrors can be formed during deposition or following deposition. As an example, to deposit a turning mirror during deposition, a thin opening in a mask can be sequentially positioned along the turning mirror. At each position, the composition of the product stream is changed at the determined point in time to produce the desired amounts of each material, i.e., core materials and corresponding low index material, stacked in the desired configuration. Then, the mask is moved slightly, and the deposition is repeated with the timing for the change in composition altered appropriately for the shift in position and the approximately linear slope of the transition. The step-wise movement of the mask continued until the approximately linear sloped interface between the core material and the low index material is formed. Elemental metal, such as silver, can be deposited in the same way as a low index-of-refraction material to form a metal reflector surface within the mirror. Deposition of the remaining portions of the layer can be performed following the approaches described above. Alternatively, each material of a turning mirror can be deposited at one time by sweeping the product particle stream across the substrate surface. The production rate can be varied at that region to form the linear variation in thickness across the mirror. The same effect can be achieved by varying the speed of the relative translation of the substrate through the product particle stream. The effective deposition at a location on the substrate is inversely proportional to the speed such that speed can be adjusted to create the desired slope. Thus, the sloped interface can be formed with the angles and thickness of the films being controlled. If desired, the total thickness can be approximately uniform to form a flat layer along the top of the turning mirror.

In addition, a switchable turning mirror can be constructed from sloped material. For example, the turning mirror can be formed from thermally sensitive material or electro-optical material. Several materials exhibit significant modulations in index-of-refraction due to an applied electric field. First order electro-optical effects are called Pockels effect while second order effects are called the Kerr effect. The electro-optical material can be broadly interpreted to comprise magneto-optical materials. The electro-optical material can be placed in the mirror, for example, in place of the elemental metal or the low index material. One or more electrodes/electromagnets can be placed adjacent the electro-optical material in the same layer. Suitable electro-optical materials comprise, for example, lanthanum doped polycrystalline lead zirconate titanate, lithium niobate ($LiNbO_3$), $LiTaO_3$, $BaTiO_3$, $AgGaS_2$, $ZnGeP_2$ and combinations thereof and doped compositions thereof.

Similarly, a thermo-optical material can be deposited in place of the electro-optical material. Suitable thermo-optical materials comprise, for example, quartz. Controlled heating can be performed with an electrically resistive material, such as well known electrically resistive materials, connected to electrical conductor. The electrically resistive material can be placed adjacent the electro-optical material. Controlling the amount of current can control the heating to turn the mirror on and off. Alternatively, a parallel control waveguide can placed adjacent the thermally controlled mirror. The control waveguide can have an absorbing material near the thermo-optical material. The light transmission through the control waveguide then controls the amount of heating of the absorbing material and the thermo-optical material such that the mirror can be turned on and off in a controlled way.

For the formation of a void as the low index material, the void can be formed by etching. The etching, for example radiation etching, can be aligned to etch at the appropriate angle. The subsequent surfaces can be deposited at an opposite angle such that the void is not filled in next to the free waveguide surface. Alternatively, or in addition, the thermally stable polymer can be filled in the void, such as after consolidation to stabilize the void with a relatively low index polymer material during the deposition of the remaining layers. Furthermore, metal can be placed within the void by a particle deposition process, chemical vapor deposition or the like. During a heat treatment, the metal powder will fuse to form a high quality metal surface. Since the etching process can form a smooth surface, the resulting metal surface can have a very high quality reflecting surface.

In alternative embodiments, a rectangular structure can be deposited which is then etched to form the angle. For example, the structure can be etched with a laser to form the angle. Silica glass absorbs light approximately in the wavelength range(s) from about 5 microns to about 12 microns. Absorption of the intense laser light vaporizes the glass. If the laser is directed along the desired angle, the rectangular edge will be etched approximately to form a face perpendicular to the laser beam. The principle of using a laser beam to etch an angled waveguide edge is described further in U.S. Pat. No. 5,966,478 to Marcuse et al., entitled "Integrated Optical Circuit Having Planar Waveguide Turning Mirrors," incorporated herein by reference.

Figure 31:
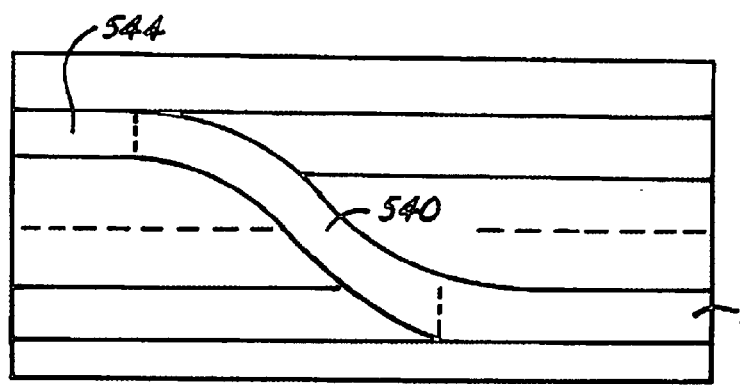
FIG. 31 is a sectional side view of a gradient taper optically connecting two optical transmission layers.
Figure 32:
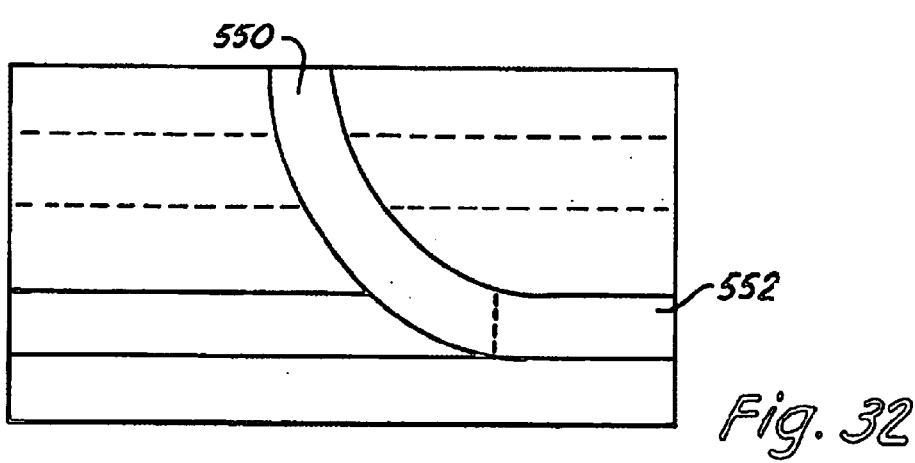
FIG. 32 is a sectional side view of a gradient taper connecting a planer transmission layer with the top surface of a multilayer optical structure.

Similar to a turning mirror, a gradient taper can be used to direct light from a particular plane. A gradient taper is essentially a waveguide out of the plane of a particular layer of the planar optical structure. A first embodiment of a gradient taper is shown in FIG. 31. Gradient taper 540 connects a first waveguide core 542 on a first layer with second waveguide core 544 on a second layer. Taper 540 is formed from a high index-of-refraction material generally with a similar index-of-refraction as cores 542, 544. Taper 540 can span one or more layers between the core layers. A second embodiment of a gradient taper is shown in FIG. 32. Gradient taper 550 connects with a waveguide core 552 in a layer and creates a light pathway perpendicular to core 552. Gradient taper 550 can be used to connect with a surface element or a perpendicular waveguide that eventually reaches another turning element that forms a later light path through a planar layer. Gradient taper 550 is a gradual version of bending mirror of FIG. 30. Gradient tapers, comprising those of FIGS. 31 and 32, generally can be formed by the same approaches as bending mirrors, such as the bending mirror in FIG. 30.

With integration of optical elements within layers and between layers and inclusion of a plurality of turning elements and a plurality of layer with in plane integration of optical devices, very complex optical pathways can be formed with increased functionality. Optical pathways can be extended without increasing the planar extent of the structure. Also, a larger number of optical devices can be packed within an equivalent volume.

While the discussion has focused on the integration of planar devices, the planar structures can also be coupled to free space optical elements that are inserted into the planar structures. In particular, microlenses and other micro-optical elements can be inserted into slots formed in the multilayered optical structure. Any of the various free space optical elements can be used for insertion into the slot. A free space optical element bridges between planar optical pathways of the slot. The slot can be made during deposition or following deposition of the particular layer(s). For example, the slot can be made during deposition by leaving a gap in the deposited material or by blocking deposition at the particular location, for example, with a mask or die. Following deposition, before or after consolidation, the slot can be formed by etching. The free space optical element is inserted into the slot prior to the application of additional layers of planar optical material. If the free space optical element fits snugly into the slot, the presence of the optical element can inhibit particles deposited subsequent to the insertion of the optical element from filling the free portions of the slot. The free space optical element can be mounted on a rectangular frame to more filly occupy the slot. Alternatively or additionally, the remaining portions of the slot can be filled with a liquid with an index-of-refraction selected to yield desired optical properties. A variety of liquids with a range of index-of-refraction are commercially available. The slot and liquid can be applied following the deposition and consolidation of all the layers. Similarly, the slot can be filled with a polymer with a desired index-of-refraction. In some embodiments, a thermally stable polymer, such as aromatic polymers, e.g., poly(p-phenylene), can be used such that the polymer can tolerate some heat processing.

Figure 33:
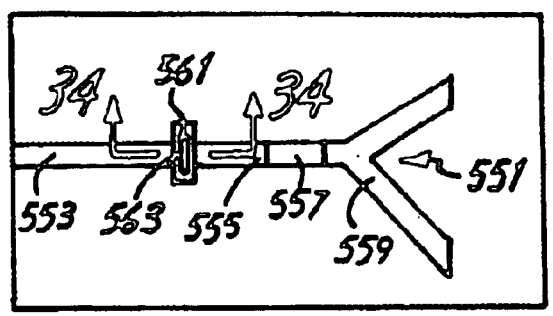
FIG. 33 is a top view of an integrated planar optical circuit with a free space optical element.
Figure 34:
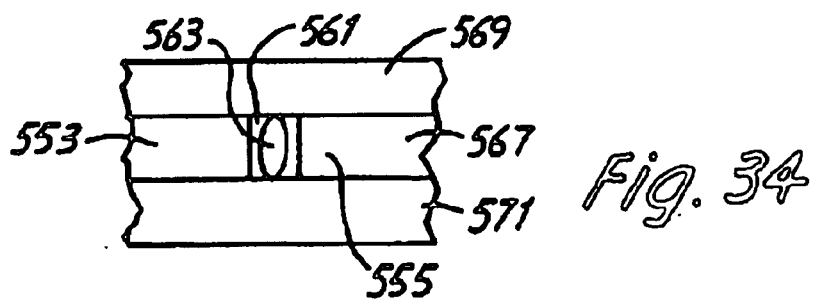
FIG. 34 is a sectional view of the optical circuit in FIG. 33 taken along line 34—34 of FIG. 33.

Referring to FIG. 33, a planar optical circuit 551 is shown with planar devices 553, 555, 557, 559. A slot 561 is located between planar devices 553, 555. A free space optical element 563 forms an optical bridge between devices 553, 555. A sectional view is shown in FIG. 34. In this embodiment, slot 561 and free space optical element 563 are located within core layer 567 between over-cladding layer 569 and under-cladding layer 571.

Optical Devices with Multiple Patterned Layers

The ability to engineer multiple layered optical structures in three dimensions with improved versatility in composition placement introduces the ability to form more intricate optical devices. Specifically, the geometry and placement of optical materials with specific optical properties can be selected between different layers to accomplish particular objectives involving particular interaction between layers of the structure. Several specific improved structures are described above and below.

As a particular example, transmission loss in a planar waveguide can be reduced by introducing a planar gradient in the cladding layer such that a low index-of-refraction is placed adjacent the core forming the waveguide. Computations performed with commercial modeling codes, comprising GLAD from Applied Optics Research, Woodland, Wash. and software packages from Rsoft Inc., Ossining, N.Y., predict that a thin region of lower gradient index-of-refraction next to the waveguide core reduces transmission loss in the planar waveguide while preserving single-mode operation of the core. If the index-of-refraction was comparably reduced for the entire cladding layer, the waveguide would no longer be a single mode waveguide. With appropriate thicknesses and index for the gradient layer, the light encounters the nominal index of the remaining portions of the cladding layer to keep the waveguide in a single mode geometry.

Figure 35:
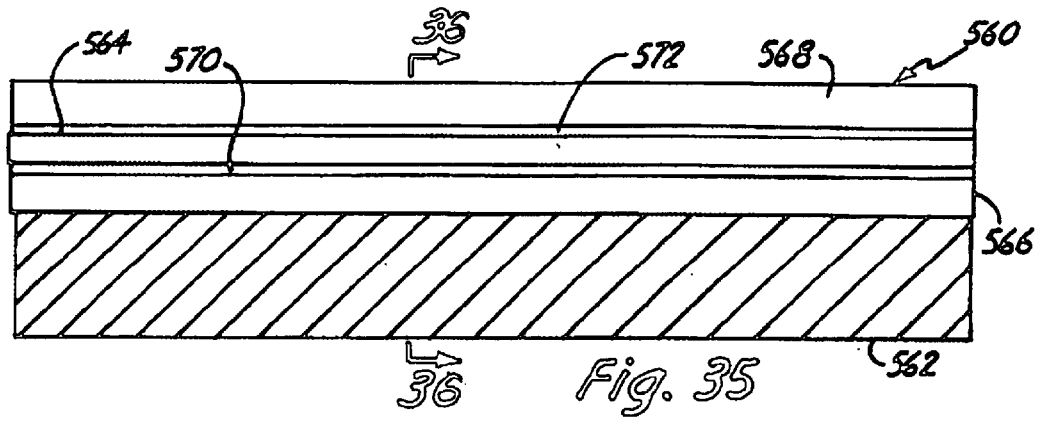
FIG. 35 is a sectional side view of a planar waveguide with cladding layers having a gradient in refractive index placing a lower index-of-refraction material adjacent the core.
Figure 36:
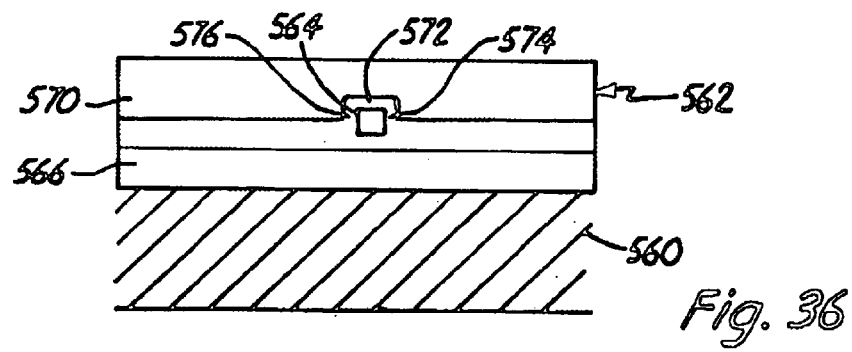
FIG. 36 is a sectional view of the embodiment in FIG. 35 taken along line 36—36.

A particular embodiment is shown in FIGS. 35 and 36. Waveguide 560 is placed on substrate 562. Waveguide 560 comprises core 564, under-cladding 566 and over-cladding 568. Under-cladding 566 comprises a layer 570 of lower index-of-refraction material adjacent core 564. As shown in FIGS. 35 and 36, over-cladding comprises a band 572 of lower index-of-refraction material over core 564. In this embodiment, the cladding within the core layer also has vertical bands 574, 576 of lower index-of-refraction material on either side of core 564. Generally, the lower index-of-refraction material placed around the core can have a thickness relative to the core from about 7% to about 25%, and in other embodiments in the range(s) of about 10% to about 17% of the core diameter. The appropriate difference in index-of-refraction between core and cladding materials generally depends on the desired performance of the waveguide. Good coupling compatibility can be obtained for a single mode waveguide with an index difference in the range(s) from at least about 0.004, optionally in the range(s) of at least about 0.005 units. Higher differences in index-of-refraction in the range(s) of at least about 0.02 units can provide the ability to bend the light paths at a smaller radius of curvature without a penalty in light loss. The appropriate magnitude of the optical gradient depends on the baseline index values of the core and the cladding and can be evaluated with modeling and/or prototype development. For waveguide designed to couple well with single mode optical fibers, an index-of-refraction gradient of at least about 0.002 units less than the nominal cladding index-of-refraction exhibited a reduction in loss. Suitable dopants to raise and lower the index-of-refraction for silica glass comprise, for example, boron, phosphorous, germanium, aluminum, zinc, and titanium.

While some of the advantages may be diminished, various variations on the embodiment shown in FIGS. 35 and 36 are possible. For example, in the embodiment of FIGS. 35 and 36, core 564 is surrounded on all four sides with lower index-of-refraction material. However, some of the index gradients in the cladding layers can be eliminated such that the core is only surrounded on one, two or three sides by a gradient in cladding index-of-refraction. Thus, the cladding adjacent any side of the core may or may not comprise the gradient in index-of-refraction such that at least one side of the core is adjacent a cladding material with a gradient in index-of-refraction. In addition, over-cladding 568 may comprise a layer of lower index-of-refraction material rather than a band of lower-index-of-refraction material.

An optical structure with a gradient layer adjacent the core can also be used to form optical fibers with a gradient layer adjacent the core. The optical structure is used as a preform from which the optical fiber is pulled by beating the preform to a softening point. Generally, for the pulling of fibers, the optical structure/preform is formed as an elongated structure. Preforms can be produced by light reactive deposition in the same way as other optical structures. The dimensions for the various layers can be adjusted to account for dimensional changes when the fiber is pulled. The resulting optical fiber will exhibit a reduction in light loss analogous to the waveguide. The formation of fiber preforms and corresponding optical fibers by light reactive deposition is described further in copending and commonly assigned PCT application designating the U.S. PCT/01/45762 to Bryan et al. filed on Oct. 26, 2001, entitled "Multilayered Optical Structures," incorporated herein by reference.

Optical power taps can be used to monitor optical transmission. In particular, optical power taps are used in splitters and combiners for monitoring and fault tracing. Optical power taps provide for the leakage of a small portion of the power from optical waveguides into the tap such that the amount of power in the tap can be measured with a detector to provide a calculation of the power transmission in the waveguide that is tapped. Improved taps can be formed by placing the taps within a cladding layer, either an under-cladding or an over-cladding. The tap is formed from a moderate index-of-refraction material within the cladding layer that intersects the core of the waveguide. The tap has an intermediate index-of-refraction between the core material and the remainder of the cladding material. Since the tap has an intermediate index, some of the light in the core leaks into the tap. The amount of light leaking into the tap generally depends on the geometry and the particular values of the index-of-refraction. The index-of-refraction of the tap material can be selected to yield the desired degree of leakage into the tap, and the selection generally depends on the values of index-of-refraction for the core and cladding materials. As an example, for a core index of 1.461 and a cladding index of 1.455, the tap could have an index from about 1.457 to about 1.459. The indices-of-refraction can be selected to leak about 5% to about 15% of the core light transmission into the tap, although with more sensitive detectors the leaked amount can be reduced further. For selected embodiments, the amount of light within the tap can be correlated with the light intensity in the core. Thus, by measuring the light in the tap, the amount of light in the core can be calculated.

Figure 37:
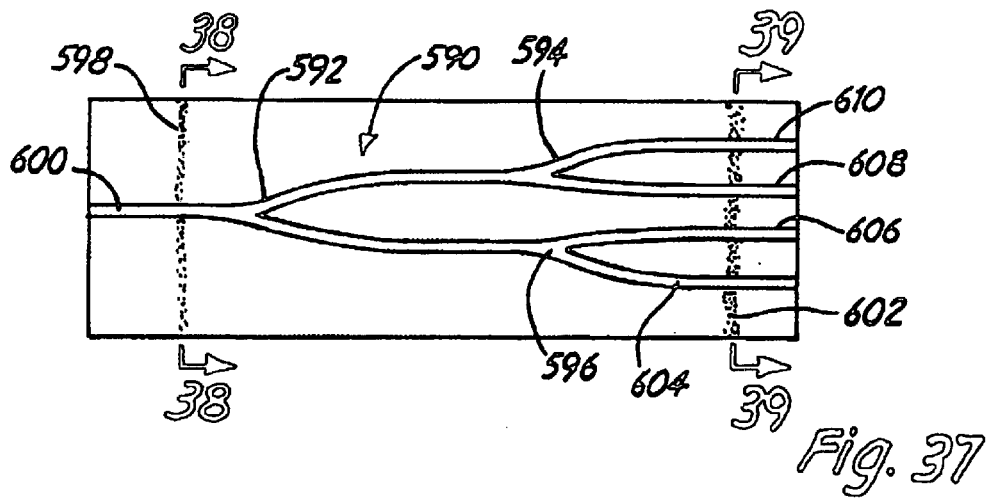
FIG. 37 is a top view showing a branched optical path with two taps connected to the optical path.
Figure 38:
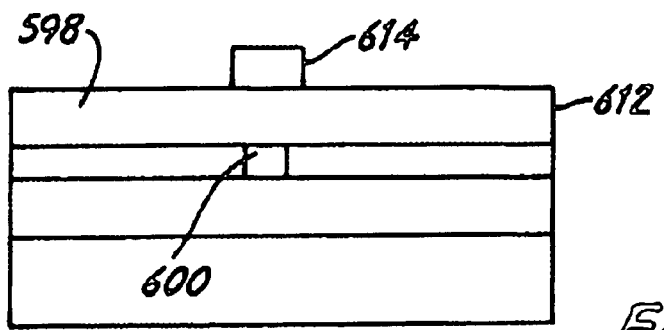
FIG. 38 is a sectional side view of the embodiment in FIG. 37 taken along line 38—38.
Figure 39:
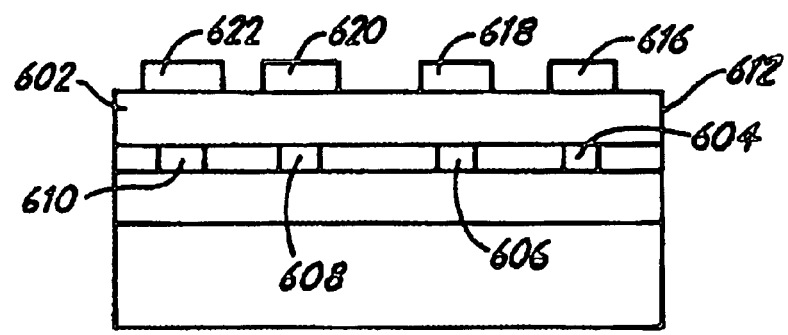
FIG. 39 is a sectional side view of the embodiment in FIG. 37 taken along line 39—39.

A particular embodiment with a tap is shown in FIGS. 37 and 38. In the embodiment of FIG. 37, an optical pathway 590 comprises three splitters/couplers 592, 594, 596. A first tap 598 intersects pathway 590 at a point with a single core channel 600. A second tap 602 intersects the four split pathways 604, 606, 608, 610 that branch off from the input pathway 590 via the splitters. Optical tap 602 obtains light intensity from all of pathways 604, 606, 608, 610. As shown in the sectional view of FIG. 38, tap 598 is within over-cladding layer 612. Optical tap 598 is optically connected to detector 614, which can be a diode detector, or other convenient detector for the selected wavelength of light. Referring to FIG. 39, tap 602 is also within over-cladding layer 612. Individual detectors 616, 618, 620, 622 are positioned in optical contact with tap 602. While detectors 614, 616, 618, 620, 622 are shown in contact with the respective tap, they can be positioned with intervening optical layer as long as appropriate optical waveguides direct the light from the respective portion of the corresponding tap to a detector. Vertically extending waveguides are discussed above.

While FIGS. 37–39 are not shown to scale, the physical spacing between splitter channels is generally at least about 14 core diameters, to accommodate appropriate coupling into other devices, although in principle this spacing can be reduced. The over-cladding layer generally has a thickness in the range(s) of less than about 5 core diameters and can be in the range(s) from about 2 to about 3 core diameters. With these parameters, the propagation distance through the tap will be too short for the light leaking from a core layer to strike detectors positioned to receive light from other core branches. In other words, for example, light leaking from core 610 into tap 602 strikes detector 622 and generally does not significantly produce a signal at detectors 620, 618 and 616. Thus, there is little cross-talk between the measurements relating to the different channels even though the tap structure overlaps with all of the branches. The detector elements can have matched index-of-refraction and an anti-reflective coating to reduce back-reflections. Also, the tap and detector materials can have an index-of-refraction that is relatively temperature insensitive such that out-coupling efficiencies of the taps will not be highly temperature sensitive.

Furthermore, devices with improved interlayer pump light coupling can be formed. The devices comprise a pump guide core and a signal guide core separated by a mid-cladding layer. The signal guide core comprises a gain region with an absorbing compound that absorbs light at the pump frequency. The signal light is amplified by stimulated emission of the excited absorbing compound. The signal guide core can function as a laser with appropriate reflectors around the gain region. The mid-cladding layer comprises a high index transmission region that overlaps with the gain region. Less power loss generally results if the transmission region of the mid-cladding layer overlaps over a corresponding area with the pump guide core and the signal guide core. The transmission region provides for light transmission from the pump guide core to the signal guide core. In some embodiments, the index-of-refraction of the transmission region is approximately the same as the pump-guide core index such that the light efficiently is transmitted between pump guide core and the signal guide core. The index-of-refraction of the signal guide core is generally higher than the index of the transmission region such that signal light does not leak out. The indices-of-refraction can be manipulated to provide a roughly even distribution of light transmission across the gain region to generate more efficient and stable gain with an even distribution of heat dissipation by the gain medium to reduce or eliminate thermal gradients that can compromise performance. To obtain a more even transmission, the index-of-refraction of the transmission region can gradually change along the transmission direction from a lower index to a higher index, such as the index of the pump-guide core materials.

Figure 40:
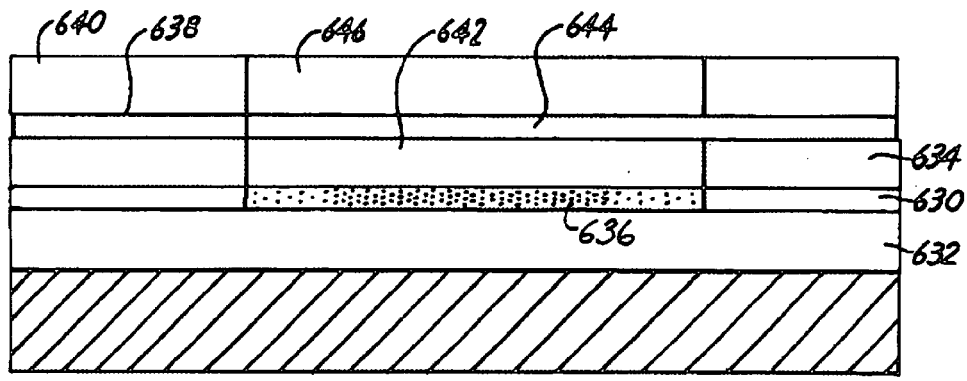
FIG. 40 is a sectional side view showing interlayer light pumping.
Figure 41:
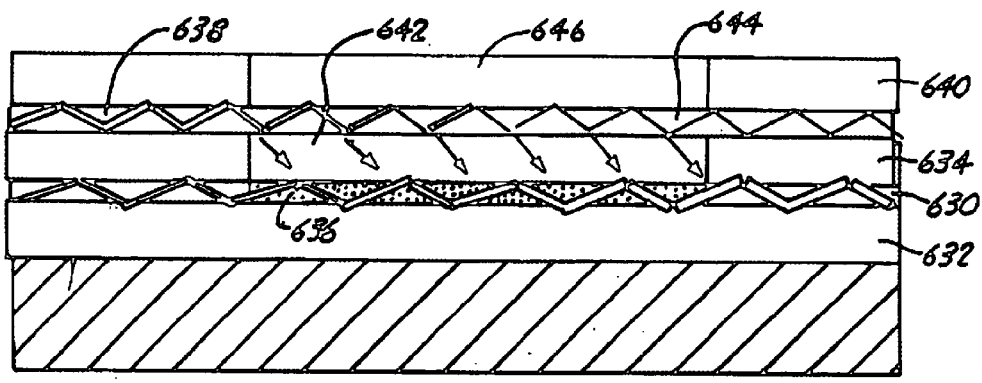
FIG. 41 is a cartoon depicting the transfer of pump light energy in the embodiment of FIG. 40.

An embodiment of a device with improved interlayer coupling is shown in FIG. 40. Signal guide core 630 is located between under-cladding layer 632 and mi-cladding layer 634. Signal guide core 630 comprises gain region 636, which comprises an absorbing compound/element, such as a rare earth metal. Pump guide core 638 is located between middle-cladding layer 634 and upper-cladding layer 640. Middle-cladding layer comprises a higher index-of-refraction transmission region 642. The transmission region, however, has a lower index-of-refraction than signal guide core such that signal light remains confined on all sides. Referring to FIG. 41, higher energy light within pump guide core 638 is transmitted through transmission region 642 to gain region 636 within signal guide core 630 at which the high energy light is absorbed. Signal light is amplified by stimulated emission. In some embodiments, pump guide core 638 can comprise an optional low index-of-refraction drain 644 that overlaps with transmission region 642 to facilitate leakage of light from pump guide core 638 through transmission region 642 to gain region 636. For embodiments in which pump guide core 638 comprises a drain 644, over-cladding layer 640 can comprise a low index-of-refraction barrier 646 to reduce leakage of light through over-cladding layer 640 due to the reduction of index-of-refraction at drain 644.

A switch or optical attenuator can be formed from a Mach-Zehnder interferometer with thermo-optical index modulation. The interferometer comprises a splitter that divides a signal into two paths with fixed lengths, such as equal lengths, that are subsequently recombined. One branch core of a split optical pathway overlaps with a thermal transfer region. If the index-of-refraction of the branch core material is sensitive to temperature, the amount of heat transferred to the branch core can be used to phase shift the signal in the branch core since the velocity of light in the branch core is altered by the index-of-refraction. The phase shift results in a modulation of the recombined signal. Detection of the recombined signal provides a continuously adjustable switch or optical attenuator.

Figure 42:
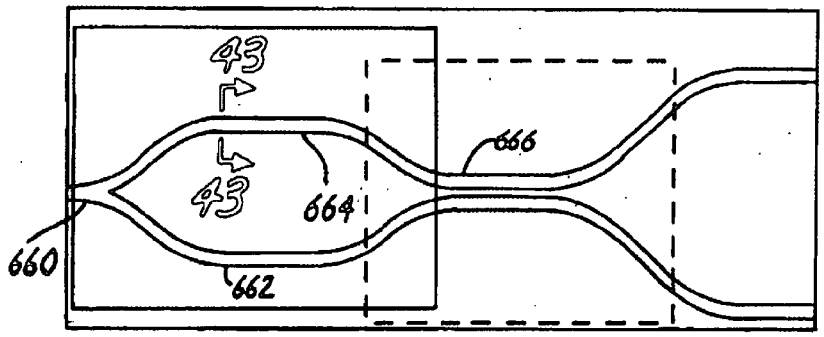
FIG. 42 is a top view of a variable attenuator based on a Mach-Zehnder interferometer.
Figure 43:
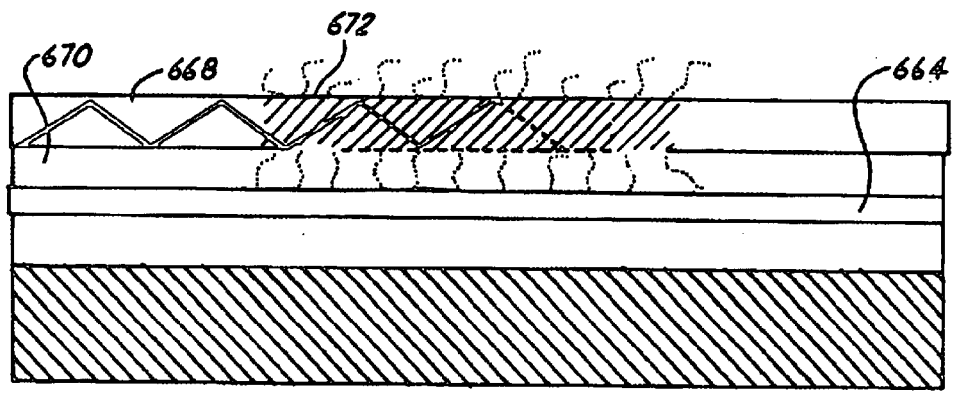
FIG. 43 is a sectional side view of the embodiment in FIG. 42 taken along line 43—43.

Referring to a specific embodiment in FIG. 42, interferometer 660 comprises a first branch core 662 and second branch core 664 that recombine at coupler 666. Second branch core 664 interacts with a thermal transfer region. Referring to FIG. 43, thermal pump core 668 is separated from second branch core by a cladding layer 670. Cladding layer or a portion thereof is thermally conductive. Silicon oxide glass material may be sufficiently thermally conductive as a cladding material. Thermal pump core 668 comprises an absorption region 672 that absorbs light transmitted within the thermal pump core. The amount of heat transmitted from the absorption to the second branch core can be adjusted by the amount of light transmitted through thermal pump core 668. Furthermore, all or a relevant portion of second branch core 668 has an index-of-refraction that is sensitive to temperature. Standard glass compositions for planar waveguides can have sufficient sensitivity of index-of-refraction for these applications. In general, a wider range of attenuation suggests a higher sensitivity to temperature while higher resolution and stability of the attenuation suggests a less sensitive material. Germanium dopant in a silicon oxide glass tends to increase the change in index-of-refraction as a function of temperature. Particular changes in index-of-refraction of a certain length of the core will result in a predictable phase shift of the light transmitted within second branch core 668. A particular phase shift results in a predictable modulation in the signal at coupler 666. Thus, the amount of light transmitted through thermal pump core 668 can be used as a continuous switch or attenuator by producing a known modulation of a signal.

Figure 44:
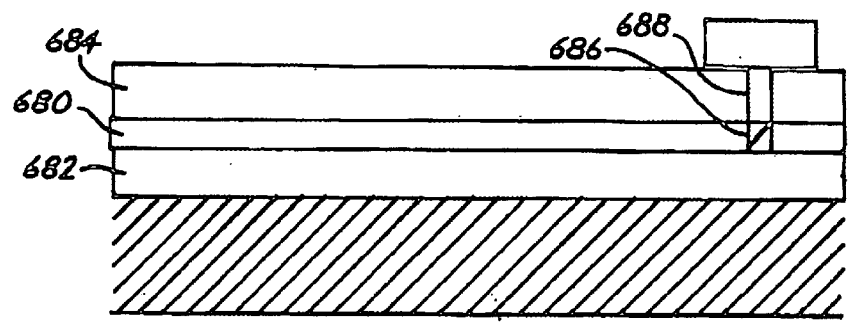
FIG. 44 is a sectional side view of a planar waveguide optically connected to a surface optical device through a turning element and a vertical optical waveguide.

Turning devices are described above with respect to generally bending light transmission from a plane to another plane or in a direction at an angle to a plane. A specific description can be provided of embodiments utilizing turning elements to couple planar waveguides and integrated forms thereof with devices that manipulate light in a direction perpendicular to the plane orienting a planar optical structure. One specific embodiment is shown in FIG. 44. Core 680 is located between under-cladding layer 682 and over-cladding layer 684. Turning element 686, such as a turning mirror, is optically coupled to core 680 such that core 680 has an optical path to vertical core 688. Vertical core 688 leads to surface device 690. Surface device 690 can be, for example, a fiber connector, a detector, such as a diode detector, or a light source, such as a light emitting diode, a diode laser, or the like.

Figure 45:
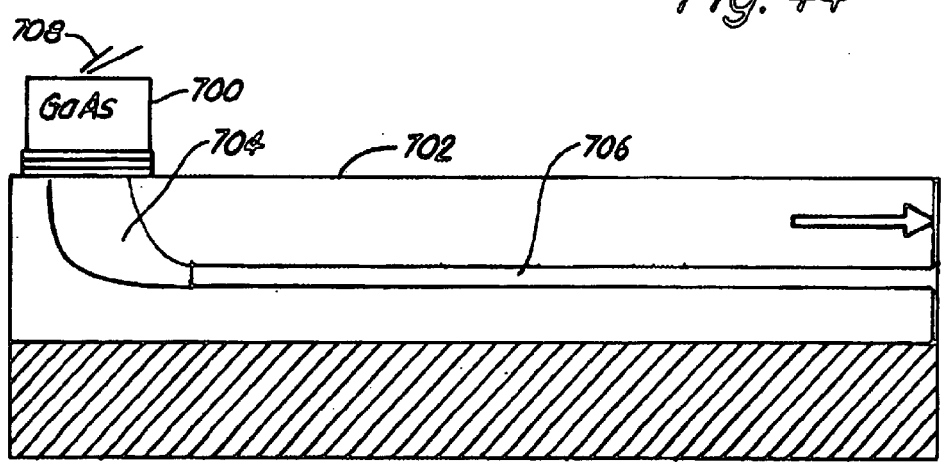
FIG. 45 is a sectional side view of a vertical cavity surface-emitting laser optically connected to a planar waveguide through a gradient taper turning element.

Referring to FIG. 45, this embodiment has a vertical cavity surface-emitting laser coupled through a gradient taper turning device to a planar waveguide. Vertical cavity surface-emitting laser (VCSEL) 700 is located on the top surface of over-cladding layer 702. Gradient taper 704 forms a light channel between VCSEL 700 and guide core 706. Vertical cavity surface-emitting lasers comprise stacks of semiconductor materials. VCSEL has an electrical contact 708 for providing the electrical drive signal. VCSEL's are described further generally, for example, in U.S. Pat. No. 6,160,830 to Kiely et al., entitled "Semiconductor Laser Device And Method Of Manufacture," incorporated herein by reference.

Figure 46:
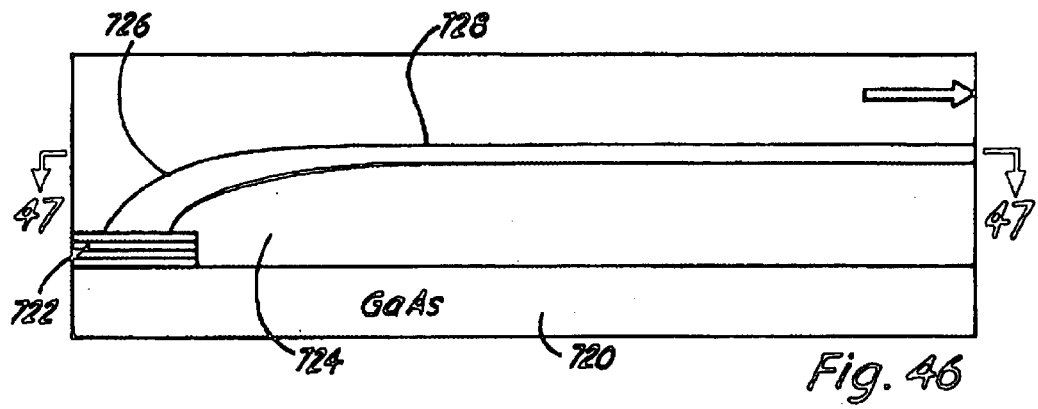
FIG. 46 is a sectional side view of a vertical cavity surface-emitting laser embedded within an under-cladding layer on a semiconductor substrate, with the laser connected to a planar waveguide through a gradient taper.
Figure 47:
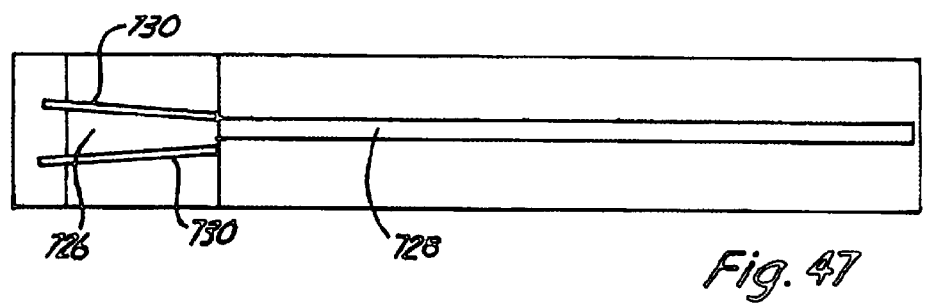
FIG. 47 is a sectional top view of the embodiment in FIG. 46 along line 47—47.

An alternative embodiment of a VCSEL coupled into a planar device is shown in FIG. 46. The planar optical structure is assembled on top of a semiconductor substrate 720 that forms part of the vcsel. The semiconductor stacks 722 of the vcsel is embedded within under-cladding layer 724. Gradient taper 726 functions as a turning device that couples the output of semiconductor stacks 722 with a guide core 728. As shown in the sectional view of FIG. 47, trenches 730 can be etched into the taper band to confine the light from the laser laterally. Alternatively, the optical material forming the taper can be conformed in the x-y plane as the taper is formed and surrounded by suitable cladding material to similarly confine the light laterally.

As utilized herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

Figure 48:
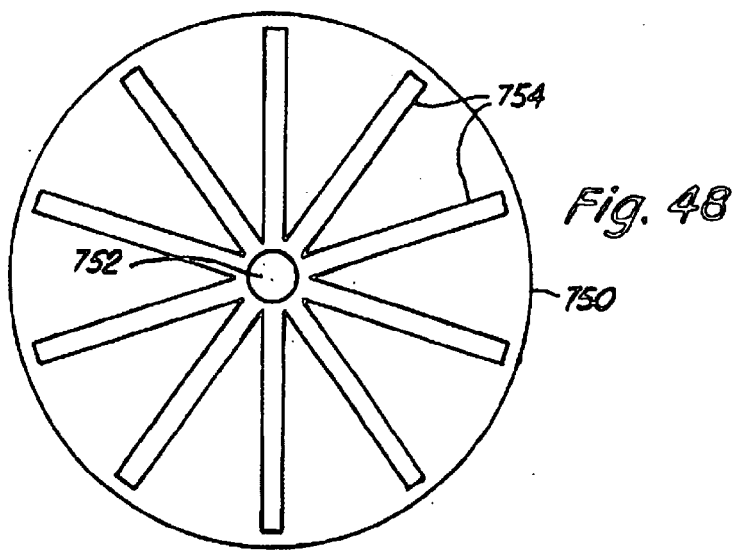
FIG. 48 is a top view of a substrate with roughly radial arranged waveguides projecting from a central light source.

Referring to FIG. 48, an optical structure 750 comprises a central light source 752 and radial arranged waveguides 754. The central light source can be a turning element, such as a mirror with a face corresponding to each of the waveguides. The waveguides and the light source can be produced with a mask or another contouring approaches described above. The substrate can be rotated to facilitate the production of waveguides.

Figure 49:
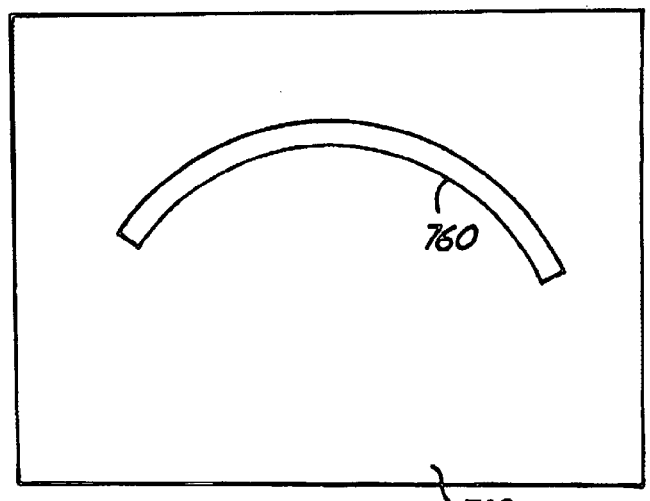
FIG. 49 is a top view of a substrate with a curved optical element.
Figure 50:
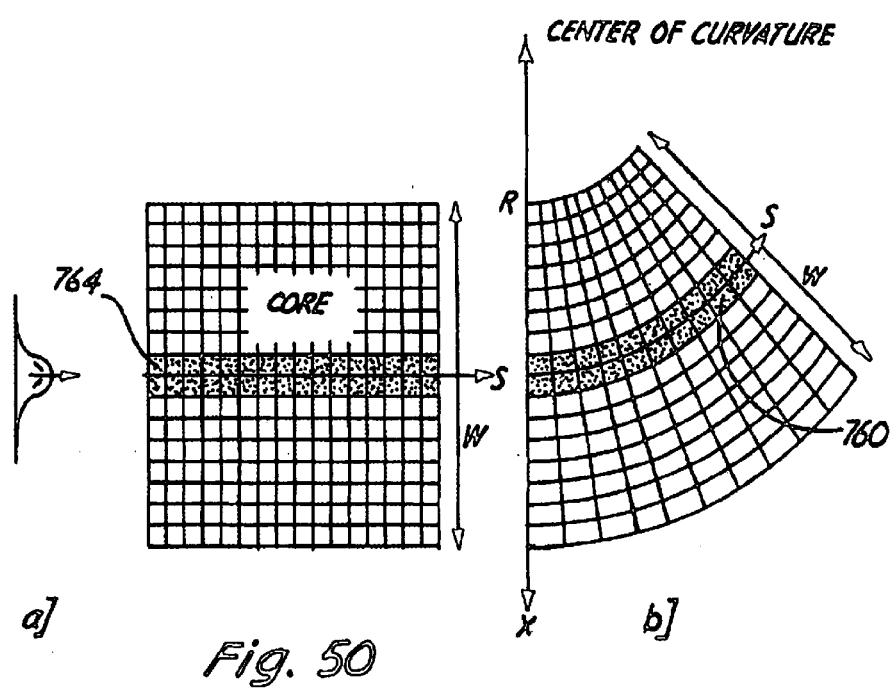
FIG. 50 is a top view of a curved optical element and a corresponding linear optical element.

It may be desirable to form more compact optical integrated circuits to have curved optical structures. These curved optical structures can be formed with a mask and/or by rotating the substrate during the deposition process. An example is shown in FIG. 49. Optical element 760 is located on a substrate 762. Optical element 760 is curved such that it extends over a shorter distance across the substrate. Optical element 760, for example, can be an amplifier. The relationship between a curved element 760 and a corresponding linear element 764 is shown in FIG. 50.

The embodiments described above are intended to be illustrative and not limiting. Additional embodiments are within the claims below. Although the present invention has been described with reference to specific embodiments, workers skilled in the art will recognize that changes may be made in form and detail without departing from the spirit and scope of the invention.

What we claim is:

1. An optical structure comprising a plurality of layers with at least two layers having composition variation within each layer, the at least two layers comprising a first layer and a second layer and the plurality of layers comprising a first turning element being at least partially located within the first layer and the second layer wherein the first turning clement reflects light between a confined optical pathway within the plane of the first layer and a confined optical pathway within the plane of the second layer wherein the first layer comprises a plurality of optical devices integrated within the first layer, wherein the confined optical pathway within the plane of the first layer comprises an inorganic optical glass.

2. An optical structure comprising a plurality of layers with at least two layers having composition variation within each layer, the at least two layers comprising a first layer and a second layer and the plurality of layers comprising a turning element being at least partially located within the first layer wherein the turning element comprises an optical taper forming an optical pathway of a higher index-of-refraction material surrounded by a cladding material with a lower index-of-refraction wherein the optical pathway involves a gradual turn from the first layer out of the plane of the first layer.

3. An optical device comprising a first cladding layer of optical material, a second cladding layer of optical material end a core of optical material, which is adjacent tile first cladding layer and the second cladding layer and which has a higher index-of-refraction than the cladding layers, wherein one of the cladding layers bus a localized band of tap material having an index-of-refraction intermediate between the core layer and the average index-of-refraction of the cladding layer with the localized band intersecting the core material, the tap material providing for the leakage of some light intensity into the tap material when light is transmitted through the core, wherein the core comprises an inorganic optical glass.

4. An integrated optical circuit comprising a vertical cavity surface emitting laser, a planer waveguide and a turning element optically connecting the planar waveguide and the vertical cavity surface emitting laser with emissions being directed approximately perpendicular to the plane of the waveguide.

5. A continuously variable optical attenuator comprising a first cladding layer; a second cladding layer that is thermally conductive; a third cladding layer; a pump-core adjacent to the second cladding layer and the third cladding layer, the pump core having an index-of-refraction higher than the second cladding layer and the third cladding layer and the pump-core comprising an absorption region that absorbs a selected region of the electromagnetic spectrum, and an active-core between the first cladding layer and the second cladding layer, the active core comprising a thermally sensitive region adjacent at least a portion of the absorption region, the thermally sensitive region comprising a material having an index-of-refraction that varies with temperature.

6. A planar optical circuit comprising a monolithic optical structure having a first optical device and a second optical device, the first optical device and second optical device being optically connected by a free space optical element embedded within the monolithic optical structure wherein the first optical device comprises an inorganic optical glass.

7. The optical structure of claim 1 wherein at least one of the plurality of layers comprises silicon oxide glass.

8. The optical structure of claim 7 wherein the silicon oxide glass comprises at least one dopant.

9. The optical structure of claim 1 wherein at least one of the plurality of layers comprises aluminum oxide, titanium oxide, telluride glasses, phosphate ($P_2O_5$) glass, InP, lithium niobate, combinations thereof and doped compositions thereof.

10. The optical structure of claim 1 wherein the second layer comprising a plurality of optical devices integrated within the second layer.

11. The optical structure of claim 1 wherein at least one of the integrated optical devices of the first layer is selected from the group consisting of optical waveguide/conduit, optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical phase-retarder, optical detector, an electrode contact, an optical grating and combinations thereof.

12. The optical stricture of claim 1 wherein the plurality of layers further comprises a thermal conductive layer, a stress reducing layer, an electrical conducting guide or a combination thereof.

13. The optical structure of claim 1 wherein the at least two layers form an integrated optical circuit comprising a plurality of optical devices located on different layers comprising the first layer and the second layer, the first turning element forming a light pathway from the first layer to the second layer and the optical devices being functionally integrated between the different layers by the first turning element.

14. The optical structure of claim 13 wherein the at least two layers comprises a third layer, the at least three layers comprising a second turning element, the second turning element deflecting light from within the second layer to the third layer to functionally integrate optical devices within the second layer and the third layer.

15. The optical structure of claim 13 wherein the first turning element optically connects a first planar waveguide in the first plane with a second planar waveguide in a second plane.

16. The optical structure of claim 1 wherein the first turning element comprises an angled mirror.

17. The optical structure of claim 16 wherein the angled mirror is formed by an angled surface of a waveguide forming an interface with a lower index-of-refraction material.

18. The optical structure of claim 17 wherein the lower index-of-refraction material comprises a fluid.

19. The optical structure of claim 17 wherein the lower index-of-refraction material comprises a glass.

20. The optical structure of claim 17 wherein the lower index-of refraction material has an index-of-refraction at least about a factor of 1.3 lower than the index-refraction of the waveguide material.

21. The optical structure of claim 17 wherein the lower index-of-refraction material comprises an electro-optical material that has an index-of-refraction that is controlled by one or more electrodes that correspondingly turn the mirror on and off.

22. The optical structure of claim 17 wherein the lower index-of-reaction material comprises a thermo-optical material, the structure further comprising a thermal transmission region adjacent the thermo-optical material.

23. The optical structure of claim 16 wherein the angled mirror comprises an angled surface of a waveguide having an interface with a metal.

24. The optical structure of claim 16 wherein the angled mirror comprises alternating layers of material with different indices-of-refraction.

25. The optical structure of claim 16 wherein the first turning element further comprises a second angled mirror along an optical pathway formed from the first angled mirror wherein the second angled mirror optically connects an optical pathway in a second layer with the first angled mirror.

26. The optical structure of claim 1 wherein the first turning element comprises an optical taper forming an optical pathway of a higher index-of-refraction materials surrounded by a cladding material with a lower index-of-refraction wherein the optical pathway involves a gradual turn from the first layer out of the plane of the first layer.

27. The optical structure of claim 2 wherein the taper is optically connected to a first planar waveguide in the first layer and a second planar waveguide in the second layer.

28. The optical structure of claim 27 wherein the optical taper, the first planar waveguide and the second planar waveguide have approximately the same index-of-refraction.

29. The optical device of claim 3 wherein the core forms a coupler/splitter with one optical path being optically coupled to a plurality of optical paths.

30. The optical device of claim 29 wherein the tap material intersects the plurality of optical paths.

31. The optical device of claim 3 wherein the tap material is optically integrated with an optical detector.

32. The integrated optical circuit of claim 4 wherein the turning element is a mirror.

33. The integrated optical circuit of claim 4 wherein the turning element is a taper.

34. The integrated optical circuit of claim 4 wherein the turning element is a photonic crystal.

35. A continuously variable optical switch comprising an interferometer having two coupled waveguides that join at a directional coupler, one of the coupled waveguides comprising a continuously variable optical attenuator of claim 5.

36. The planar optical circuit of claim 6 wherein the free space optical element is located in a trench within the monolithic structure between the first optical device and the second optical device.

37. The planar optical circuit of claim 36 wherein the trench is filled with a liquid.

38. The planar optical circuit of claim 36 wherein the trench is filled with a polymer.

39. The optical structure of claim 2 wherein at least one of the plurality of layers comprises silicon oxide glass.

40. The optical structure of claim 36 wherein the silicon oxide glass comprises at least one dopant.

41. The optical structure of claim 2 wherein at least one of the plurality of layers comprises aluminum oxide, titanium oxide, telluride glasses, phosphate ($P_2O_5$) glass, InP, lithium niobate, combinations thereof and doped compositions thereof.

42. The optical structure of claim 2 wherein the higher index-of-refraction material comprises a silicon oxide glass.

43. The optical structure of claim 2 wherein the first layer comprises a plurality of optical devices integrated within the first layer.

44. The optical structure of claim 42 wherein at least one of the integrated optical devices of the first layer is selected from the group consisting of optical waveguide/conduit optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical base-retarder, optical detector, an electrode contact, an optical grating and combinations thereof.

45. The optical structure of claim 2 wherein the plurality of layers further comprises a thermal conductive layer, a stress reducing layer, an electrical conducting guide or a combination thereof.

46. The optical structure of claim 2 wherein the at least two layers form an integrated optical circuit comprising a plurality of optical devices located on different layers comprising the first layer and the second layer, the turning element forming a light pathway from the first layer to the second layer and the optical devices being functionally integrated between the different layers by the turning element.

47. The optical structure of claim 2 wherein the cladding material has an index-of-refraction at least about a factor of 1.3 lower than the index-of-refraction of the higher index-of-refraction material.

48. The optical device of claim 3 wherein at least one of the layers comprises silicon oxide glass.

49. The optical device of claim 48 wherein the silicon oxide glass comprises at least one dopant.

50. The optical device of claim 3 wherein at least one of the plurality of layers comprises aluminum oxide, titanium oxide, telluride glasses, phosphate ($P_2O_5$) glass, InP, lithium niobate, combinations thereof and doped compositions thereof.

51. The optical device of claim 3 wherein the core layer comprises a silicon oxide glass.

52. The optical device of claim 3 wherein the core layer further plurality of optical devices integrated within the layer.

53. The optical device of claim 52 wherein at least one of the integrated optical devices of the core layer is selected from the group consisting of optical waveguide/conduit, optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical phase-retarder, optical detector, an electrode contact, an optical grating and combinations thereof.

54. The optical device of claim 3 further comprising a thermal conductive layer, a stress reducing layer, an electrical conducting guide or a combination thereof.

55. The optical device of claim 3 wherein the average index-of-refraction of the cladding layer has an index-of-refraction at least about a factor of 1.3 lower than the index-of-refraction of the index-of-refraction of the core layer.

56. The integrated optical circuit of claim 4 wherein the planar waveguide comprises silicon oxide glass.

57. The integrated optical circuit of claim 56 wherein the silicon oxide glass comprises at least one dopant.

58. The integrated optical circuit of claim 4 wherein the planar waveguide comprises aluminum oxide, titanium oxide, telluride glasses, phosphate ($P_2O_5$) glass, InP, lithium niobate, combinations thereof and doped compositions thereof.

59. The integrated optical circuit of claim 4 wherein the turning element comprises a silicon oxide glass.

60. The integrated optical circuit of claim 4 further comprising a plurality of optical devices integrated with the planar waveguide.

61. The integrated optical circuit of claim 60 wherein at least one of the integrated optical devices is selected from the group consisting of optical waveguide/conduit, optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical phase-retarder, optical detector, an electrode contact, an optical grating and combinatons thereof.

62. The integrated optical circuit of claim 4 further comprising a thermal conductive layer, a stress reducing layer, an electrical conducting guide or a combination thereof.

63. The continuously variable optical attenuator of claim 5 wherein the pump core comprises silicon oxide glass.

64. The continuously variable optical attenuator of claim 63 wherein the silicon oxide glass comprises at least one dopant.

65. The continuously variable optical attenuator of claim 5 wherein pump core comprises aluminum oxide titanium oxide, telluride glasses, phosphate ($P_2O_5$) glass, InP, lithium niobate, combinations thereof and doped compositions thereof.

66. The continuously variable optical attenuator of claim 5 wherein the active core comprises a silicon oxide glass.

67. The continuously variable optical attenuator of claim 5 further comprising a plurality of optical devices integrated with the pump core.

68. The continuously variable optical attenuator of claim 67 wherein at least one of the integrated optical devices of the first layer is selected from the group consisting of optical waveguide/conduit, optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical phase-retarder, optical detector, an electrode contact, an optical grating and combinations thereof.

69. The continuously variable optical attenuator of claim 5 further comprising a thermal conductive layer, a stress reducing layer, an electrical conducting guide or a combination thereof.

70. The continuously variable optical attenuator of claim 5 wherein the pump core has an index-of-refraction at least about a factor of 1.3 higher than the index-of-refraction of the second cladding layer and the third cladding layer.

71. The planar optical circuit of claim 6 wherein the first optical device comprises silicon oxide glass.

72. The planar optical circuit of claim 71 wherein the silicon oxide glass comprises at least one dopant.

73. The planar optical circuit of claim 6 wherein the first optical device comprises aluminum oxide, titanium oxide, telluride glasses, phosphate ($P_2O_5$) glass, InP, lithium niobate, combinations thereof and doped compositions thereof.

74. The planar optical circuit of claim 6 wherein the first optical device is selected from the group consisting of optical waveguide/conduit, optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical phase-retarder, optical detector, an electrode contact, an optical grating and combinations thereof.

75. The planar optical circuit of claim 6 further comprising a thermal conductive layer, a stress reducing layer, an electrical conducting guide or a combination thereof.

76. The optical structure of claim 1 wherein the confined optical pathway within the plane of the second layer comprises an inorganic optical glass.

77. The optical structure of claim 76 wherein the confined optical pathway within the plane of the first layer and the confined optical pathway within the plane of the second layer are within a monolithic structure.

* * * * *